US011528503B2

(12) United States Patent
Ma et al.

(10) Patent No.: US 11,528,503 B2
(45) Date of Patent: Dec. 13, 2022

(54) PICTURE PREDICTION METHOD AND APPARATUS, AND CODEC

(71) Applicant: HUAWEI TECHNOLOGIES CO., LTD., Guangdong (CN)

(72) Inventors: Xiang Ma, Shenzhen (CN); Haitao Yang, Shenzhen (CN); Huanbang Chen, Shenzhen (CN); Shan Gao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/915,678

(22) Filed: Jun. 29, 2020

(65) Prior Publication Data

US 2020/0396478 A1 Dec. 17, 2020

Related U.S. Application Data

(63) Continuation of application No. PCT/CN2018/124275, filed on Dec. 27, 2018.

(30) Foreign Application Priority Data

Dec. 31, 2017 (CN) .......................... 201711494274.0

(51) Int. Cl.
*H04N 19/52* (2014.01)
*H04N 19/176* (2014.01)
*H04N 19/182* (2014.01)

(52) U.S. Cl.
CPC ........... *H04N 19/52* (2014.11); *H04N 19/176* (2014.11); *H04N 19/182* (2014.11)

(58) Field of Classification Search
CPC ..... H04N 19/52; H04N 19/176; H04N 19/182
See application file for complete search history.

(56) References Cited

U.S. PATENT DOCUMENTS 6,195,389 B1   2/2001  Rodriguez et al.
8,693,543 B2   4/2014  Kamp et al.
(Continued)

FOREIGN PATENT DOCUMENTS

CN    1658673 A    8/2005
CN  101557514 A   10/2009
(Continued)

OTHER PUBLICATIONS

Yi-jen Chiu et al., Decoder-side Motion Estimation and Wiener filter for HEVC. 2013 Visual Communications and Image Processing (VCIP), Jan. 9, 2014, 6 pages.
(Continued)

*Primary Examiner* — Leron Beck
*Assistant Examiner* — Shanika M Brumfield

(57) ABSTRACT

A picture prediction method is provided, which includes: obtaining initial motion information of a current picture block; determining, based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; and for the positions of each pair of reference blocks, a first position offset and a second position offset are in a mirror relationship; and obtaining a predicted value of a pixel value of the current picture block based on a pixel value of the target forward reference block and a pixel value of the target backward reference block.

31 Claims, 18 Drawing Sheets

(56) References Cited

U.S. PATENT DOCUMENTS

| | | |
|---|---|---|
| 8,929,449 B2 | 1/2015 | Sakamoto |
| 2011/0002389 A1 | 1/2011 | Xu et al. |
| 2012/0027095 A1 | 2/2012 | Sakamoto |
| 2015/0304682 A1 | 10/2015 | Xu et al. |
| 2018/0098087 A1* | 4/2018 | Li .................. H04N 19/159 |
| 2018/0184117 A1* | 6/2018 | Chen ................ H04N 19/513 |
| 2018/0192071 A1* | 7/2018 | Chuang ............. H04N 19/517 |
| 2020/0137416 A1* | 4/2020 | Esenlik ............. H04N 19/523 |

FOREIGN PATENT DOCUMENTS

| | | | |
|---|---|---|---|
| CN | 104427347 A | 3/2015 | |
| CN | 107409225 A | 11/2017 | |
| RU | 2589402 C2 | 7/2016 | |
| TW | 201620301 A | 6/2016 | |
| WO | 2016160609 A1 | 10/2016 | |
| WO | 2017201678 A1 | 11/2017 | |
| WO | WO-2019072370 A1 * | 4/2019 | ........... H04N 19/533 |

OTHER PUBLICATIONS

Xu Chen et al.,"Decoder-Side Motion Vector Refinement Based on Bilateral Template Matching",Joint Video Exploration Team (JVET) of ITU-T SG 16 WP 3 and ISO/IEC JTC 1/SC 29/WG 11,4th Meeting: Chengdu, CN, Oct. 15-21, 2016,JVET-D0029,total:total:4pages.

Jianle Chen et al., Algorithm Description of Joint Exploration Test Model 7 (JEM7), Joint Video Exploration Team (JVET), Aug. 19, 2017, [JVET-G1001-v1] (version 1), pp. 27-28.

Document: JCTVC-A106, Yi-Jen Chiu et al., Description of video coding technology proposal: self derivation of motion estimation and adaptive (Wiener) loop filtering, Joint Collaborative Team on Video Coding (JCT-VC) ofITU-T SG16 WP3 and ISO/IEC JTC1/SC29/WG11, 1st Meeting: Dresden, DE, Apr. 15-23, 2010, 28 pages, XP030232994.

\* cited by examiner

Original merge candidate list

| Merge_idx | L0 | L1 |
|---|---|---|
| 0 | mvL0_A, ref0 | mvL1_A, ref1 |
| 1 | mvL0_B, ref0 | mvL1_B, ref1 |
| 2 | - | mvL1_C, ref1 |
| | | |

Fc: current picture
Fr1: forward reference picture
Fr2: backward reference picture

PICTURE PREDICTION METHOD AND APPARATUS, AND CODEC

CROSS-REFERENCE TO RELATED APPLICATIONS

This application is a continuation of International Application No. PCT/CN2018/124275, filed on Dec. 27, 2018, which claims priority to Chinese Patent Application No. 201711494274.0, filed on Dec. 31, 2017. The disclosures of the aforementioned applications are hereby incorporated by reference in their entireties.

TECHNICAL FIELD

This application relates to the field of video coding technologies, and in particular, to a picture prediction method and apparatus, and a codec.

BACKGROUND

By using video compression technologies, such as MPEG-2, MPEG-4, ITU-TH.263, ITU-TH.264/MPEG-4 Part 10 advanced video coding (advanced video coding, AVC), ITU-TH.265 high efficiency video coding (high efficiency video coding, HEVC), and video compression technologies described in extended parts of these standards, digital video information can be efficiently transmitted and received between devices. Generally, a picture of a video sequence is divided into picture blocks for encoding or decoding.

In a video compression technology, spatial prediction (intra prediction, intra prediction) and/or temporal prediction (inter prediction, inter prediction) based on a picture block are/is introduced to reduce or remove redundant information in a video sequence. Inter prediction modes may include but are not limited to a merge mode (Merge Mode), a non-merge mode (for example, an advanced motion vector prediction mode (AMVP mode)), and the like, and all inter predictions are performed by using a multi-motion information contention method.

In an inter prediction process, a candidate motion information list (a candidate list for short) including a plurality of groups of motion information (also referred to as a plurality of pieces of candidate motion information) is introduced. For example, an encoder may use a group of motion information selected from the candidate list as or to predict motion information (for example, a motion vector) of a current to-be-coded picture block, to obtain a reference picture block (namely, a reference sample) of the current to-be-coded picture block. Correspondingly, a decoder may decode a bitstream to obtain indication information, to obtain a group of motion information. Because coding overheads (namely, bit overheads of an occupied bitstream) of the motion information are limited in the inter prediction process, this affects accuracy of the motion information to some extent and further affects picture prediction accuracy.

To improve the picture prediction accuracy, an existing decoder-side motion vector refinement (Decoder-side motion vector refinement, DMVR) technology can be used to refine the motion information. However, when a DMVR solution is used to perform picture prediction, a template matching block needs to be calculated, and the template matching block needs to be used to separately perform a search matching process in a forward reference picture and a backward reference picture, resulting in relatively high search complexity. Therefore, how to reduce complexity during picture prediction while improving the picture prediction accuracy is a problem that needs to be resolved.

SUMMARY

Embodiments of this application provide a picture prediction method and apparatus, and a corresponding encoder and decoder, to improve picture prediction accuracy, reduce picture prediction complexity to some extent, and further improve coding performance.

According to a first aspect, an embodiment of this application provides a picture prediction method. The method includes: obtaining initial motion information of a current picture block; determining positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1; determining, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N; and obtaining a predicted value of a pixel value of the current picture block based on a pixel value (sample) of the target forward reference block and a pixel value (sample) of the target backward reference block.

It should be particularly noted that, in this embodiment of this application, the positions of the N forward reference blocks include a position of one initial forward reference block and positions of (N−1) candidate forward reference blocks, and the positions of the N backward reference blocks include a position of one initial backward reference block and positions of (N−1) candidate backward reference blocks. Therefore, an offset of the position of the initial forward reference block relative to the position of the initial forward reference block is 0, and an offset of the position of the initial backward reference block relative to the position of the initial backward reference block is 0. The offset 0 and the offset 0 also meet the mirror relationship.

It can be learned that, in this embodiment of this application, the positions of the N forward reference blocks in the forward reference picture and the positions of the N backward reference blocks in the backward reference picture form positions of N pairs of reference blocks. For positions of each pair of reference blocks in the positions of the N pairs of reference blocks, the mirror relationship exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity.

In addition, it should be understood that the current picture block (referred to as a current block) herein may be understood as a picture block that is currently being processed. For example, in an encoding process, the current picture block is a coding block (encoding block). In a decoding process, the current picture block is a coding block (decoding block).

In addition, it should be understood that the reference block herein is a block that provides a reference signal for the current block. In a search process, a plurality of reference blocks need to be traversed to find an optimal reference block. A reference block located in the forward reference picture is referred to as a forward reference block. A reference block located in the backward reference picture is referred to as a backward reference block.

In addition, it should be understood that a block providing prediction for the current block is referred to as a prediction block. For example, after a plurality of reference blocks are traversed, an optimal reference block is found. The optimal reference block provides prediction for the current block, and is referred to as the prediction block. A pixel value, a sampling value, or a sampling signal in the prediction block is referred to as a prediction signal.

In addition, it should be understood that the matching cost criterion herein may be understood as a criterion for considering a matching cost between paired forward and backward reference blocks. The matching cost may be understood as a difference between two blocks, and may be considered as an accumulated difference of samples at corresponding positions in the two blocks. A difference is usually calculated based on an SAD (sum of absolute difference, sum of absolute difference) criterion or another criterion, for example, an SATD (Sum of Absolute Transform Difference, sum of absolute transform difference), an MR-SAD (mean-removed sum of absolute difference, mean-removed sum of absolute difference), or an SSD (sum of squared differences, sum of squared differences).

In addition, it should be noted that the initial motion information of the current picture block in this embodiment of this application may include a motion vector MV and reference picture indication information. Certainly, the initial motion information may alternatively include one of the motion vector or the reference picture indication information, or both the motion vector and the reference picture indication information. For example, when an encoder side and a decoder side agree on a reference picture together, the initial motion information may include only the motion vector MV. The reference picture indication information is used to indicate which reconstructed picture or reconstructed pictures are used as the reference picture for the current block. The motion vector indicates an offset of a position of a reference block in a used reference picture relative to the position of the current block, and generally includes a horizontal component offset and a vertical component offset. For example, (x,y) is used to represent the MV, x represents a position offset in a horizontal direction, and y represents a position offset in a vertical direction. The position of the reference block of the current block in the reference picture can be obtained by adding the MV to the position of the current block. The reference picture indication information may include a reference picture list and/or a reference picture index corresponding to the reference picture list. A reference picture index is used to identify a reference picture corresponding to a used motion vector in a specified reference picture list (RefPicList0 or RefPicList1). A picture may be referred to as a frame, and the reference picture may be referred to as a reference frame.

In this embodiment of this application, the initial motion information of the current picture block is initial bidirectional-prediction motion information, that is, includes motion information used in a forward prediction direction and motion information used in a backward prediction direction. Herein, the forward and backward prediction directions are two prediction directions of a bidirectional prediction mode. It may be understood that "forward" and "backward" respectively correspond to a reference picture list 0 (RefPicList0) and a reference picture list 1 (RefPicList1) of the current picture.

In addition, it should be noted that the position of the initial forward reference block in this embodiment of this application is a position that is of the reference block in the forward reference picture and that is obtained by adding the position of the current block to an offset which is represented by an initial MV. The position of the initial backward reference block in this embodiment of this application is a position that is of the reference block in the backward reference picture and that is obtained by adding the position of the current block to the an offset which is represented by an initial MV.

It should be understood that the method in this embodiment of this application may be performed by a picture prediction apparatus. For example, the method may be performed by a video encoder, a video decoder, or an electronic device having a video coding function. For example, the method may be specifically performed by an inter prediction unit in a video encoder, or a motion compensation unit in a video decoder.

With reference to the first aspect, in some implementations of the first aspect, that a first position offset and a second position offset are in a mirror relationship may be understood as that a first position offset value is the same as a second position offset value. For example, a direction (also referred to as a vector direction) of the first position offset is opposite to a direction of the second position offset, and an amplitude value of the first position offset is the same as an amplitude value of the second position offset.

In an example, the first position offset includes a first horizontal component offset and a first vertical component offset, and the second position offset includes a second horizontal component offset and a second vertical component offset. A direction of the first horizontal component offset is opposite to a direction of the second horizontal component offset, and an amplitude value of the first horizontal component offset is the same as an amplitude value of the second horizontal component offset. A direction of the first vertical component offset is opposite to a direction of the second vertical component offset, and an amplitude value of the first vertical component offset is the same as an amplitude value of the second vertical component offset.

In another example, both the first position offset and the second position offset are 0.

With reference to the first aspect, in some implementations of the first aspect, the method further includes: obtaining updated motion information of the current picture block, where the updated motion information includes an updated forward motion vector and an updated backward motion vector, the updated forward motion vector points to the position of the target forward reference block, and the updated backward motion vector points to the position of the target backward reference block.

In a different example, the updated motion information of the current picture block is obtained based on the position of the target forward reference block, the position of the target backward reference block, and the position of the current picture block; or is obtained based on a first position offset and a second position offset that are corresponding to the determined positions of the pair of reference blocks.

It can be learned that the refined motion information of the current picture block can be obtained in this embodiment of this application. This improves accuracy of the motion information of the current picture block, and also facilitates prediction of another picture block, for example, improves prediction accuracy of motion information of the another picture block.

With reference to the first aspect, in some implementations of the first aspect, the positions of the N forward reference blocks include a position of one initial forward reference block and positions of (N−1) candidate forward reference blocks, and an offset of a position of each candidate forward reference block relative to the position of the initial forward reference block is an integer pixel distance or a fractional pixel distance; or the positions of the N backward reference blocks include a position of one initial backward reference block and positions of (N−1) candidate backward reference blocks, and an offset of a position of each candidate backward reference block relative to the position of the initial backward reference block is an integer pixel distance or a fractional pixel distance.

It should be noted that the positions of the N pairs of reference blocks include positions of paired initial forward and backward reference blocks, and positions of paired candidate forward and backward reference blocks. An offset of a position of a candidate forward reference block relative to a position of an initial forward reference block in the forward reference picture is in the mirror relationship with an offset of a position of a candidate backward reference block relative to a position of an initial backward reference block in the backward reference picture.

With reference to the first aspect, in some implementations of the first aspect, the initial motion information includes forward prediction motion information and backward prediction motion information; and the determining positions of N forward reference blocks and positions of N backward reference blocks based on the initial motion information and a position of the current picture block includes:

determining the positions of the N forward reference blocks in the forward reference picture based on the forward prediction motion information and the position of the current picture block, where the positions of the N forward reference blocks include the position of the initial forward reference block and the positions of the (N−1) candidate forward reference blocks, and the offset of the position of each candidate forward reference block relative to the position of the initial forward reference block is the integer pixel distance or the fractional pixel distance; and determining the positions of the N backward reference blocks in the backward reference picture based on the backward prediction motion information and the position of the current picture block, where the positions of the N backward reference blocks include the position of the initial backward reference block and the positions of the (N−1) candidate backward reference blocks, and the offset of the position of each candidate backward reference block relative to the position of the initial backward reference block is the integer pixel distance or the fractional pixel distance.

With reference to the first aspect, in some implementations of the first aspect, the initial motion information includes a first motion vector and a first reference picture index in the forward prediction direction, and a second motion vector and a second reference picture index in the backward prediction direction; and the determining positions of N forward reference blocks and positions of N backward reference blocks based on the initial motion information and a position of the current picture block includes:

determining, based on the first motion vector and the position of the current picture block, the position of the initial forward reference block of the current picture block in the forward reference picture corresponding to the first reference picture index, using the position of the initial forward reference block as a first search start point, and determining the positions of the (N−1) candidate forward reference blocks in the forward reference picture, where the positions of the N forward reference blocks include the position of the initial forward reference block and the positions of the (N−1) candidate forward reference blocks; and determining, based on the second motion vector and the position of the current picture block, the position of the initial backward reference block of the current picture block in the backward reference picture corresponding to the second reference picture index, using the position of the initial backward reference block as a second search start point, and determining the positions of the (N−1) candidate backward reference blocks in the backward reference picture, where the positions of the N backward reference blocks include the position of the initial backward reference block and the positions of the (N−1) candidate backward reference blocks.

With reference to the first aspect, in some implementations of the first aspect, the determining, from positions of M pairs of reference blocks based on a matching cost criterion, that positions of a pair of reference blocks are a position of a target forward reference block of the current picture block and a position of a target backward reference block of the current picture block includes:

determining, from the positions of the M pairs of reference blocks, that positions of a pair of reference blocks with a minimum matching error are the position of the target forward reference block of the current picture block and the position of the target backward reference block of the current picture block; or determining, from the positions of the M pairs of reference blocks, that positions of a pair of reference blocks with a matching error less than or equal to a matching error threshold are the position of the target forward reference block of the current picture block and the position of the target backward reference block of the current picture block, where M is less than or equal to N.

In an example, the matching cost criterion is a matching cost minimization criterion. For example, for the positions of the M pairs of reference blocks, a difference between a pixel value of a forward reference block and a pixel value of a backward reference block is calculated for each pair of reference blocks; and from the positions of the M pairs of reference blocks, positions of a pair of reference blocks whose pixel values are of a minimum difference are determined as the position of the forward target reference block of the current picture block and the position of the backward target reference block of the current picture block.

In another example, the matching cost criterion is a matching cost minimization and early termination criterion. For example, for positions of an $n^{th}$ pair of reference blocks (one forward reference block and one backward reference block), a difference between a pixel value of the forward reference block and a pixel value of the backward reference block is calculated, where n is an integer greater than or equal to 1 and less than or equal to N; and when the pixel value difference is less than or equal to the matching error threshold, the positions of the $n^{th}$ pair of reference blocks (one forward reference block and one backward reference block) are determined as the position of the forward target reference block of the current picture block and the position of the backward target reference block of the current picture block.

With reference to the first aspect, in some implementations of the first aspect, the method is used to code the current picture block; and the obtaining initial motion information of a current picture block includes: obtaining the initial motion information from a candidate motion information list of the current picture block; or the method is used to decode the current picture block; and before the obtaining initial motion information of a current picture block, the method further includes: obtaining indication information from a bitstream of the current picture block, where the indication information is used to indicate the initial motion information of the current picture block.

It can be learned that the picture prediction method in this embodiment of this application is not only applicable to a merge (Merge) prediction mode and/or an advanced motion vector prediction (advanced motion vector prediction, AMVP) mode, but also applicable to another mode in which a spatial reference block, a temporal reference block and/or an inter-view reference block are/is used to predict the motion information of the current picture block. This improves coding performance.

A second aspect of this application provides a picture prediction method, including: obtaining initial motion information of a current picture block; and determining positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1; determining, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N; and obtaining a predicted value of a pixel value of the current picture block based on a pixel value of the target forward reference block and a pixel value of the target backward reference block.

It should be particularly noted that, in this embodiment of this application, an offset of the position of the initial forward reference block relative to the position of the initial forward reference block is 0, and an offset of the position of the initial backward reference block relative to the position of the initial backward reference block is 0. The offset 0 and the offset 0 also meet a mirror relationship or meet the proportional relationship based on the time domain distance. In other words, in positions of (N−1) pairs of reference blocks, for positions of each pair of reference blocks, the first position offset and the second position offset are in the proportional relationship based on the time domain distance or in the mirror relationship. Herein, the positions of the (N−1) pairs of reference blocks do not include the position of the initial forward reference block or the position of the initial backward reference block.

It can be learned that, in this embodiment of this application, the positions of the N forward reference blocks in the forward reference picture and the positions of the N backward reference blocks in the backward reference picture form positions of N pairs of reference blocks. For positions of each pair of reference blocks in the positions of the N pairs of reference blocks, the proportional relationship based on the time domain distance (also referred to as the mirror relationship based on the time domain distance) exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity.

With reference to the second aspect, in some implementations of the second aspect, for each pair of reference blocks, that a first position offset and a second position offset are in a proportional relationship based on a time domain distance includes:

for each pair of reference blocks, the proportional relationship between the first position offset and the second position offset is determined based on a proportional relationship between a first time domain distance and a second time domain distance, where the first time domain distance represents a time domain distance between a current picture to which the current picture block belongs and the forward reference picture, and the second time domain distance represents a time domain distance between the current picture and the backward reference picture.

With reference to the second aspect, in some implementations of the second aspect, that a first position offset and a second position offset are in a proportional relationship based on a time domain distance includes:

if the first time domain distance is the same as the second time domain distance, a direction of the first position offset is opposite to a direction of the second position offset, and an amplitude value of the first position offset is the same as an amplitude value of the second position offset; or if the first time domain distance is different from the second time domain distance, a direction of the first position offset is opposite to a direction of the second position offset, and a proportional relationship between an amplitude value of the first position offset and an amplitude value of the second position offset is based on the proportional relationship between the first time domain distance and the second time domain distance; where the first time domain distance represents the time domain distance between the current picture to which the current picture block belongs and the forward reference picture, and the second time domain distance represents the time domain distance between the current picture and the backward reference picture.

With reference to the second aspect, in some implementations of the second aspect, the method further includes: obtaining updated motion information of the current picture block, where the updated motion information includes an updated forward motion vector and an updated backward motion vector, the updated forward motion vector points to the position of the target forward reference block, and the updated backward motion vector points to the position of the target backward reference block.

It can be learned that the refined motion information of the current picture block can be obtained in this embodiment of this application. This improves accuracy of the motion information of the current picture block, and also facilitates prediction of another picture block, for example, improves prediction accuracy of motion information of the another picture block.

With reference to the second aspect, in some implementations of the second aspect, the positions of the N forward reference blocks include a position of one initial forward reference block and positions of (N−1) candidate forward reference blocks, and an offset of a position of each candidate forward reference block relative to the position of the initial forward reference block is an integer pixel distance or a fractional pixel distance; or the positions of the N backward reference blocks include a position of one initial backward reference block and positions of (N−1) candidate backward reference blocks, and an offset of a position of each candidate backward reference block relative to the position of the initial backward reference block is an integer pixel distance or a fractional pixel distance.

With reference to the second aspect, in some implementations of the second aspect, the positions of the N pairs of reference blocks include positions of paired initial forward and backward reference blocks, and positions of paired candidate forward and backward reference blocks. The proportional relationship based on the time domain distance exists between an offset of a position of a candidate forward reference block relative to a position of an initial forward reference block in the forward reference picture and an offset of a position of a candidate backward reference block relative to a position of an initial backward reference block in the backward reference picture.

With reference to the second aspect, in some implementations of the second aspect, the initial motion information includes forward prediction motion information and backward prediction motion information; and the determining positions of N forward reference blocks and positions of N backward reference blocks based on the initial motion information and a position of the current picture block includes:

determining the positions of the N forward reference blocks in the forward reference picture based on the forward prediction motion information and the position of the current picture block, where the positions of the N forward reference blocks include the position of the initial forward reference block and the positions of the (N−1) candidate forward reference blocks, and the offset of the position of each candidate forward reference block relative to the position of the initial forward reference block is the integer pixel distance or the fractional pixel distance; and determining the positions of the N backward reference blocks in the backward reference picture based on the backward prediction motion information and the position of the current picture block, where the positions of the N backward reference blocks include the position of the initial backward reference block and the positions of the (N−1) candidate backward reference blocks, and the offset of the position of each candidate backward reference block relative to the position of the initial backward reference block is the integer pixel distance or the fractional pixel distance.

With reference to the second aspect, in some implementations of the second aspect, the initial motion information includes a first motion vector and a first reference picture index in a forward prediction direction, and a second motion vector and a second reference picture index in a backward prediction direction; and the determining positions of N forward reference blocks and positions of N backward reference blocks based on the initial motion information and a position of the current picture block includes:

determining, based on the first motion vector and the position of the current picture block, the position of the initial forward reference block of the current picture block in the forward reference picture corresponding to the first reference picture index, using the position of the initial forward reference block as a first search start point, and determining the positions of the (N−1) candidate forward reference blocks in the forward reference picture, where the positions of the N forward reference blocks include the position of the initial forward reference block and the positions of the (N−1) candidate forward reference blocks; and determining, based on the second motion vector and the position of the current picture block, the position of the initial backward reference block of the current picture block in the backward reference picture corresponding to the second reference picture index, using the position of the initial backward reference block as a second search start point, and determining the positions of the (N−1) candidate backward reference blocks in the backward reference picture, where the positions of the N backward reference blocks include the position of the initial backward reference block and the positions of the (N−1) candidate backward reference blocks.

With reference to the second aspect, in some implementations of the second aspect, the determining, from positions of M pairs of reference blocks based on a matching cost criterion, that positions of a pair of reference blocks are a position of a target forward reference block of the current picture block and a position of a target backward reference block of the current picture block includes:

determining, from the positions of the M pairs of reference blocks, that positions of a pair of reference blocks with a minimum matching error are the position of the target forward reference block of the current picture block and the position of the target backward reference block of the current picture block; or determining, from the positions of the M pairs of reference blocks, that positions of a pair of reference blocks with a matching error less than or equal to a matching error threshold are the position of the target forward reference block of the current picture block and the position of the target backward reference block of the current picture block, where M is less than or equal to N.

In an example, the matching cost criterion is a matching cost minimization criterion. For example, for the positions of the M pairs of reference blocks, a difference between a pixel value of a forward reference block and a pixel value of a backward reference block is calculated for each pair of reference blocks; and from the positions of the M pairs of reference blocks, positions of a pair of reference blocks whose pixel values are of a minimum difference are determined as the position of the forward target reference block of the current picture block and the position of the backward target reference block of the current picture block.

In another example, the matching cost criterion is a matching cost minimization and early termination criterion. For example, for positions of an $n^{th}$ pair of reference blocks (one forward reference block and one backward reference block), a difference between a pixel value of the forward reference block and a pixel value of the backward reference block is calculated, where n is an integer greater than or equal to 1 and less than or equal to N; and when the pixel value difference is less than or equal to the matching error threshold, the positions of the $n^{th}$ pair of reference blocks (one forward reference block and one backward reference block) are determined as the position of the forward target reference block of the current picture block and the position of the backward target reference block of the current picture block.

With reference to the second aspect, in some implementations of the second aspect, the method is used to code the current picture block; and the obtaining initial motion information of a current picture block includes: obtaining the initial motion information from a candidate motion information list of the current picture block; or the method is used to decode the current picture block; and before the obtaining initial motion information of a current picture block, the method further includes: obtaining indication information from a bitstream of the current picture block, where the indication information is used to indicate the initial motion information of the current picture block.

A third aspect of this application provides a picture prediction method, including: obtaining $i^{th}$-round motion information of a current picture block; and determining positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1; determining, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to a position of an $(i-1)^{th}$-round target forward reference block, and the second position offset represents an offset of the position of the backward reference block relative to a position of an $(i-1)^{th}$-round target backward reference block; and M is an integer greater than or equal to 1, and M is less than or equal to N; and obtaining a predicted value of a pixel value of the current picture block based on a pixel value of the $j^{th}$-round target forward reference block and a pixel value of the $j^{th}$-round target backward reference block, where j is greater than or equal to i, and both i and j are integers greater than or equal to 1.

It should be particularly noted that, in this embodiment of this application, an offset of a position of an initial forward reference block relative to the position of the initial forward reference block is 0, and an offset of a position of an initial backward reference block relative to the position of the initial backward reference block is 0. The offset 0 and the offset 0 also meet the mirror relationship.

It can be learned that, in this embodiment of this application, the positions of the N forward reference blocks in the forward reference picture and the positions of the N backward reference blocks in the backward reference picture form positions of N pairs of reference blocks. For positions of each pair of reference blocks in the positions of the N pairs of reference blocks, the mirror relationship exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as a position of a target forward reference block (namely, an optimal forward reference block/forward prediction block) of the current picture block and a position of a target backward reference block (namely, an optimal backward reference block/backward prediction block) of the current picture block, to obtain the predicted value of the pixel value of the current picture block based on a pixel value of the target forward reference block and a pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity. In addition, in this embodiment of this application, accuracy of refining a motion vector MV can be further improved by using an iteration method, to further improve coding performance.

With reference to the third aspect, in some implementations of the third aspect, if i=1, the $i^{th}$-round motion information is initial motion information of the current picture block; and correspondingly, the positions of the N forward reference blocks include a position of one initial forward reference block and positions of (N−1) candidate forward reference blocks, and an offset of a position of each candidate forward reference block relative to the position of the initial forward reference block is an integer pixel distance or a fractional pixel distance; or the positions of the N backward reference blocks include a position of one initial backward reference block and positions of (N−1) candidate backward reference blocks, and an offset of a position of each candidate backward reference block relative to the position of the initial backward reference block is an integer pixel distance or a fractional pixel distance.

If i>1, the $i^{th}$-round motion information includes a forward motion vector pointing to the position of the $(i-1)^{th}$-round target forward reference block and a backward motion vector pointing to the position of the $(i-1)^{th}$-round target backward reference block; and correspondingly, the positions of the N forward reference blocks include a position of one $(i-1)^{th}$-round target forward reference block and positions of (N−1) candidate forward reference blocks, and an offset of a position of each candidate forward reference block relative to the position of the $(i-1)^{th}$-round target forward reference block is an integer pixel distance or a fractional pixel distance; or the positions of the N backward reference blocks include a position of one $(i-1)^{th}$-round target backward reference block and positions of (N−1) candidate backward reference blocks, and an offset of a position of each candidate backward reference block relative to the position of the $(i-1)^{th}$-round target backward reference block is an integer pixel distance or a fractional pixel distance.

It should be noted that, if the method is used to code the current picture block, the initial motion information of the current picture block is obtained by using the following method: determining the initial motion information from a candidate motion information list of the current picture block; or if the method is used to decode the current picture block, the initial motion information of the current picture block is obtained by using the following method: obtaining indication information from a bitstream of the current picture block, where the indication information is used to indicate the initial motion information of the current picture block.

With reference to the third aspect, in some implementations of the third aspect, the obtaining a predicted value of a pixel value of the picture block based on a pixel value of the $j^{th}$-round target forward reference block and a pixel value of the $j^{th}$-round target backward reference block, where j is greater than or equal to i, and both i and j are integers greater than or equal to 1, includes:

when an iteration termination condition is met, obtaining the predicted value of the pixel value of the picture block based on the pixel value of the $j^{th}$-round target forward reference block and the pixel value of the $j^{th}$-round target backward reference block, where j is greater than or equal to i, and both i and j are integers greater than or equal to 1.

With reference to the third aspect, in some implementations of the third aspect, that a first position offset and a second position offset are in a mirror relationship includes: a direction of the first position offset is opposite to a direction of the second position offset, and an amplitude value of the first position offset is the same as an amplitude value of the second position offset.

With reference to the third aspect, in some implementations of the third aspect, the $i^{th}$-round motion information includes a forward motion vector, a forward reference picture index, a backward motion vector, and a backward reference picture index; and the determining positions of N forward reference blocks and positions of N backward reference blocks based on the $i^{th}$-round motion information and a position of the current picture block includes:

determining, based on the forward motion vector and the position of the current picture block, the position of the $(i-1)^{th}$-round target forward reference block of the current picture block in the forward reference picture corresponding to the forward reference picture index, using the position of the $(i-1)^{th}$-round target forward reference block as an $i_f^{th}$ search start point, and determining the positions of the (N−1) candidate forward reference blocks in the forward reference picture, where the positions of the N forward reference blocks include the position of the $(i-1)^{th}$-round target forward reference block and the positions of the (N−1) candidate forward reference blocks; and determining, based on the backward motion vector and the position of the current picture block, the position of the $(i-1)^{th}$-round target backward reference block of the current picture block in the backward reference picture corresponding to the backward reference picture index, using the position of the $(i-1)^{th}$-round target backward reference block as an $i_b^{th}$ search start point, and determining the positions of the (N−1) candidate backward reference blocks in the backward reference picture, where the positions of the N backward reference blocks include the position of the $(i-1)^{th}$-round target backward reference block and the positions of the (N−1) candidate backward reference blocks.

With reference to the third aspect, in some implementations of the third aspect, the determining, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block includes:

determining, from the positions of the M pairs of reference blocks, that positions of a pair of reference blocks with a minimum matching error are the position of the $i^{th}$-round target forward reference block of the current picture block and the position of the $i^{th}$-round target backward reference block of the current picture block; or determining, from the positions of the M pairs of reference blocks, that positions of a pair of reference blocks with a matching error less than or equal to a matching error threshold are the position of the $i^{th}$-round target forward reference block of the current picture block and the position of the $i^{th}$-round target backward reference block of the current picture block, where M is less than or equal to N.

A fourth aspect of this application provides a picture prediction method, including: obtaining $i^{th}$-round motion information of a current picture block; and determining positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1; determining, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an $(i-1)^{th}$-round target forward reference block in the forward reference picture, and the second position offset represents an offset of the position of the backward reference block relative to a position of an $(i-1)^{th}$-round target backward reference block in the backward reference picture; and M is an integer greater than or equal to 1, and M is less than or equal to N; and obtaining a predicted value of a pixel value of the current picture block based on a pixel value of the $j^{th}$-round target forward reference block and a pixel value of the $j^{th}$-round target backward reference block, where j is greater than or equal to i, and both i and j are integers greater than or equal to 1.

It should be particularly noted that, in this embodiment of this application, an offset of a position of an initial forward reference block relative to the position of the initial forward reference block is 0, and an offset of a position of an initial backward reference block relative to the position of the initial backward reference block is 0. The offset 0 and the offset 0 also meet a mirror relationship or the proportional relationship based on the time domain distance. In other words, in positions of (N−1) pairs of reference blocks, for positions of each pair of reference blocks, the first position offset and the second position offset are in the proportional relationship based on the time domain distance or in the mirror relationship. Herein, the positions of the (N−1) pairs of reference blocks do not include the position of the initial forward reference block or the position of the initial backward reference block.

It can be learned that, in this embodiment of this application, the positions of the N forward reference blocks in the forward reference picture and the positions of the N backward reference blocks in the backward reference picture form positions of N pairs of reference block. For positions of each pair of reference blocks in the positions of the N pairs of reference blocks, the proportional relationship based on the time domain distance exists between a first position offset of the forward reference block relative to the initial forward reference block, and a second position offset of the backward reference block relative to the initial backward reference block. On such a basis, positions of a pair of reference blocks (for example, a pair of reference blocks with a minimum matching cost) are determined from the positions of the N pairs of reference blocks as a position of a target forward reference block (namely, an optimal forward reference block/forward prediction block) of the current picture block and a position of a target backward reference block (namely, an optimal backward reference block/backward prediction block) of the current picture block, to obtain the predicted value of the pixel value of the current picture block based on a pixel value of the target forward reference block and a pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity. In addition, in this embodiment of this application, accuracy of refining a motion vector MV can be further improved by using an iteration method, to further improve coding performance.

With reference to the fourth aspect, in some implementations of the fourth aspect, if i=1, the $i^{th}$-round motion information is initial motion information of the current picture block; or if i>1, the $i^{th}$-round motion information includes a forward motion vector pointing to the position of the $(i-1)^{th}$-round target forward reference block and a backward motion vector pointing to the position of the $(i-1)^{th}$-round target backward reference block.

With reference to the fourth aspect, in some implementations of the fourth aspect, the obtaining a predicted value of a pixel value of the picture block based on a pixel value of the $j^{th}$-round target forward reference block and a pixel value of the $j^{th}$-round target backward reference block, where j is greater than or equal to i, and both i and j are integers greater than or equal to 1, includes:

when an iteration termination condition is met, obtaining the predicted value of the pixel value of the picture block based on the pixel value of the $j^{th}$-round target forward reference block and the pixel value of the $j^{th}$-round target backward reference block, where j is greater than or equal to i, and both i and j are integers greater than or equal to 1.

With reference to the fourth aspect, in some implementations of the fourth aspect, that a first position offset and a second position offset are in a proportional relationship based on a time domain distance includes:

if a first time domain distance is the same as a second time domain distance, a direction of the first position offset is opposite to a direction of the second position offset, and an amplitude value of the first position offset is the same as an amplitude value of the second position offset; or if a first time domain distance is different from a second time domain distance, a direction of the first position offset is opposite to a direction of the second position offset, and a proportional relationship between an amplitude value of the first position offset and an amplitude value of the second position offset is based on a proportional relationship between the first time domain distance and the second time domain distance; where the first time domain distance represents a time domain distance between a current picture to which the current picture block belongs and the forward reference picture, and the second time domain distance represents a time domain distance between the current picture and the backward reference picture.

With reference to the fourth aspect, in some implementations of the fourth aspect, the $i^{th}$-round motion information includes a forward motion vector, a forward reference picture index, a backward motion vector, and a backward reference picture index; and the determining positions of N forward reference blocks and positions of N backward reference blocks based on the $i^{th}$-round motion information and a position of the current picture block includes:

determining, based on the forward motion vector and the position of the current picture block, the position of the $(i-1)^{th}$-round target forward reference block of the current picture block in the forward reference picture corresponding to the forward reference picture index, using the position of the $(i-1)^{th}$-round target forward reference block as an $i_f^{th}$ search start point, and determining positions of (N−1) candidate forward reference blocks in the forward reference picture, where the positions of the N forward reference blocks include the position of the $(i-1)^{th}$-round target forward reference block and the positions of the (N−1) candidate forward reference blocks; and determining, based on the backward motion vector and the position of the current picture block, the position of the $(i-1)^{th}$-round target backward reference block of the current picture block in the backward reference picture corresponding to the backward reference picture index, using the position of the $(i-1)^{th}$-round target backward reference block as an $i_b{}^{th}$ search start point, and determining positions of (N−1) candidate backward reference blocks in the backward reference picture, where the positions of the N backward reference blocks include the position of the $(i-1)^{th}$-round target backward reference block and the positions of the (N−1) candidate backward reference blocks.

With reference to the fourth aspect, in some implementations of the fourth aspect, the determining, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block includes:

determining, from the positions of the M pairs of reference blocks, that positions of a pair of reference blocks with a minimum matching error are the position of the $i^{th}$-round target forward reference block of the current picture block and the position of the $i^{th}$-round target backward reference block of the current picture block; or determining, from the positions of the M pairs of reference blocks, that positions of a pair of reference blocks with a matching error less than or equal to a matching error threshold are the position of the $i^{th}$-round target forward reference block of the current picture block and the position of the $i^{th}$-round target backward reference block of the current picture block, where M is less than or equal to N.

A fifth aspect of this application provides a picture prediction apparatus, including several functional units configured to implement any method in the first aspect. For example, the picture prediction apparatus may include: a first obtaining unit, configured to obtain initial motion information of a current picture block; a first search unit, configured to: determine positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1; determine, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N; and a first prediction unit, configured to obtain a predicted value of a pixel value of the current picture block based on a pixel value of the target forward reference block and a pixel value of the target backward reference block.

In different application scenarios, the picture prediction apparatus is, for example, applied to a video coding apparatus (a video encoder) or a video decoding apparatus (a video decoder).

A sixth aspect of this application provides a picture prediction apparatus, including several functional units configured to implement any method in the second aspect. For example, the picture prediction apparatus may include: a second obtaining unit, configured to obtain initial motion information of a current picture block; a second search unit, configured to: determine positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1; determine, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N; and a second prediction unit, configured to obtain a predicted value of a pixel value of the current picture block based on a pixel value of the target forward reference block and a pixel value of the target backward reference block.

In different application scenarios, the picture prediction apparatus is, for example, applied to a video coding apparatus (a video encoder) or a video decoding apparatus (a video decoder).

A seventh aspect of this application provides a picture prediction apparatus, including several functional units configured to implement any method in the third aspect. For example, the picture prediction apparatus may include: a third obtaining unit, configured to obtain $i^{th}$-round motion information of a current picture block; a third search unit, configured to: determine positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1; determine, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to a position of an $(i-1)^{th}$-round target forward reference block, and the second position offset represents an offset of the position of the backward reference block relative to a position of an $(i-1)^{th}$-round target backward reference block; and M is an integer greater than or equal to 1, and M is less than or equal to N; and a third prediction unit, configured to obtain a predicted value of a pixel value of the current picture block based on a pixel value of the $j^{th}$-round target forward reference block and a pixel value of the $j^{th}$-round target backward reference block, where j is greater than or equal to i, and both i and j are integers greater than or equal to 1.

In different application scenarios, the picture prediction apparatus is, for example, applied to a video coding apparatus (a video encoder) or a video decoding apparatus (a video decoder).

An eighth aspect of this application provides a picture prediction apparatus, including several functional units configured to implement any method in the fourth aspect. For example, the picture prediction apparatus may include: a fourth obtaining unit, configured to obtain $i^{th}$-round motion information of a current picture block; a fourth search unit, configured to: determine positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1; determine, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an $(i-1)^{th}$-round target forward reference block in the forward reference picture, and the second position offset represents an offset of the position of the backward reference block relative to a position of an $(i-1)^{th}$-round target backward reference block in the backward reference picture; and M is an integer greater than or equal to 1, and M is less than or equal to N; and a fourth prediction unit, configured to obtain a predicted value of a pixel value of the current picture block based on a pixel value of the $j^{th}$-round target forward reference block and a pixel value of the $j^{th}$-round target backward reference block, where j is greater than or equal to i, and both i and j are integers greater than or equal to 1.

In different application scenarios, the picture prediction apparatus is, for example, applied to a video coding apparatus (a video encoder) or a video decoding apparatus (a video decoder).

A ninth aspect of this application provides a picture prediction apparatus, and the apparatus includes a processor and a memory coupled to the processor. The processor is configured to perform the method in the first aspect, the second aspect, the third aspect, the fourth aspect, or the implementations of the foregoing aspects.

A tenth aspect of this application provides a video encoder. The video encoder is configured to code a picture block and includes: an inter prediction module, where the inter prediction module includes the picture prediction apparatus according to the fifth aspect, the sixth aspect, the seventh aspect, or the eighth aspect, and the inter prediction module is configured to obtain a predicted value of a pixel value of the picture block through prediction; an entropy coding module, configured to code indication information into a bitstream, where the indication information is used to indicate initial motion information of the picture block; and a reconstruction module, configured to reconstruct the picture block based on the predicted value of the pixel value of the picture block.

An eleventh aspect of this application provides a video decoder. The video decoder is configured to decode a bitstream to obtain a picture block and includes: an entropy decoding module, configured to decode the bitstream to obtain indication information, where the indication information is used to indicate initial motion information of the picture block that is currently obtained through decoding; an inter prediction module, including the picture prediction apparatus according to the fifth aspect, the sixth aspect, the seventh aspect, or the eighth aspect, where the inter prediction module is configured to obtain a predicted value of a pixel value of the picture block through prediction; and a reconstruction module, configured to reconstruct the picture block based on the predicted value of the pixel value of the picture block.

A twelfth aspect of this application provides a video coding device, including a non-volatile storage medium and a processor. The non-volatile storage medium stores an executable program. The processor and the non-volatile storage medium are coupled to each other, and the processor executes the executable program to implement the method in the first, second, third, or fourth aspect, or the implementations of the first, second, third, or fourth aspect.

A thirteenth aspect of this application provides a video decoding device, including a non-volatile storage medium and a processor. The non-volatile storage medium stores an executable program. The processor and the non-volatile storage medium are coupled to each other, and the processor executes the executable program to implement the method in the first, second, third, or fourth aspect, or the implementations of the first, second, third, or fourth aspect.

A fourteenth aspect of this application provides a computer-readable storage medium. The computer-readable storage medium stores an instruction. When the instruction is run on a computer, the computer is enabled to perform the method in the first, second, third, or fourth aspect, or the implementations of the first, second, third, or fourth aspect.

A fifteenth aspect of this application provides a computer program product including an instruction. When the instruction is run on a computer, the computer is enabled to perform the method in the first, second, third, or fourth aspect, or the implementations of the first, second, third, or fourth aspect.

A sixteenth aspect of this application provides an electronic device, including the video encoder in the tenth aspect, the video decoder in the eleventh aspect, or the picture prediction apparatus in the fifth, sixth, seventh, or eighth aspect.

It should be understood that beneficial effects achieved in the aspects and corresponding implementable design manners are similar, and are not repeated.

DESCRIPTION OF EMBODIMENTS

The following clearly describes the technical solutions in the embodiments of this application with reference to the accompanying drawings in the embodiments of this application.

Figure 1:
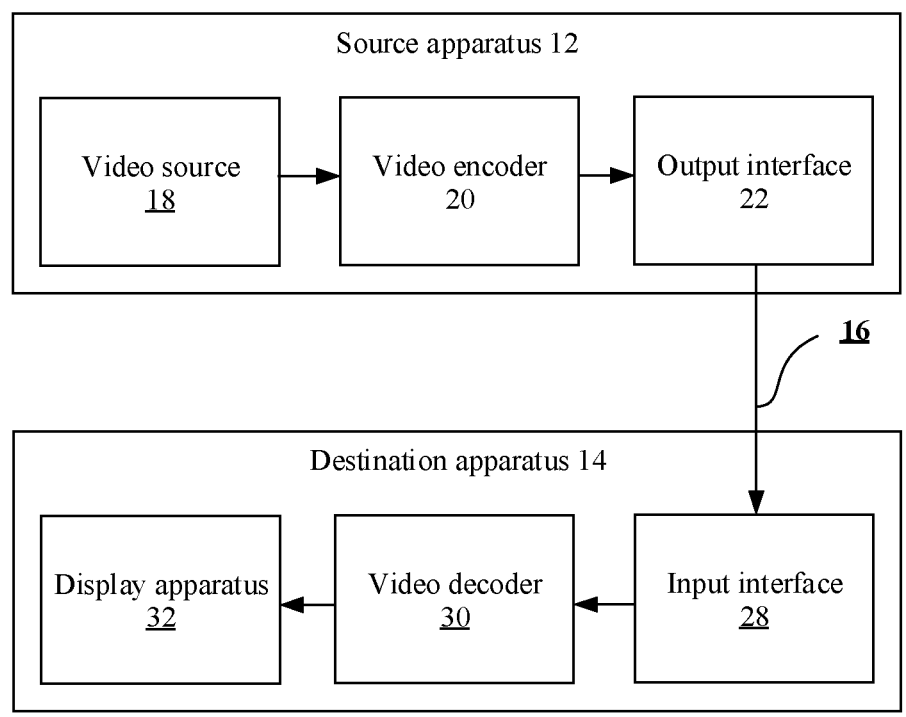
FIG. 1 is a schematic block diagram of a video coding system according to an embodiment of this application.

FIG. 1 is a schematic block diagram of a video coding system according to an embodiment of this application. In the system, a video encoder 20 and a video decoder 30 are configured to predict a predicted value of a pixel value of a picture block based on various picture prediction method examples provided in this application, and refine motion information, such as a motion vector, of a current coded or decoded picture block, to further improve coding performance. As shown in FIG. 1, the system includes a source apparatus 12 and a destination apparatus 14. The source apparatus 12 generates coded video data that is to be decoded by the destination apparatus 14. The source apparatus 12 and the destination apparatus 14 may include any one of a wide range of apparatuses, including a desktop computer, a notebook computer, a tablet computer, a set-top box, a telephone handset such as a "smart" phone, a "smart" touchpad, a television, a camera, a display apparatus, a digital media player, a video game console, a video streaming transmission apparatus, or the like.

The destination apparatus 14 may receive the to-be-decoded coded video data by using a link 16. The link 16 may include any type of medium or apparatus capable of moving the coded video data from the source apparatus 12 to the destination apparatus 14. In a feasible implementation, the link 16 may include a communications medium capable of enabling the source apparatus 12 to directly transmit the coded video data to the destination apparatus 14 in real time. A communications standard (for example, a wireless communications protocol) may be followed to modulate the coded video data and transmit modulated video data to the destination apparatus 14. The communications medium may include any wireless or wired communications medium, for example, a radio spectrum or one or more physical transmission lines. The communications medium may form a part of a packet-based network (for example, a local area network, a wide area network, or a global network of the internet). The communications medium may include a router, a switch, a base station, or any other devices that may be configured to facilitate communication from the source apparatus 12 to the destination apparatus 14.

Alternatively, the coded data may be output from an output interface 22 to a storage apparatus 24. Similarly, the coded data may be accessed from the storage apparatus 24 through an input interface. The storage apparatus 24 may include any of a plurality of scattered or local data storage media, for example, a hard disk drive, a Blu-ray disc, a DVD, a CD-ROM, a flash memory, a volatile or non-volatile memory, or any other appropriate digital storage medium used for storing the coded video data. In another feasible implementation, the storage apparatus 24 may correspond to a file server or another intermediate storage apparatus capable of storing the coded video data generated by the source apparatus 12. The destination apparatus 14 may access the stored video data from the storage apparatus 24 through streaming transmission or downloading. The file server may be any type of server capable of storing the coded video data and transmitting the coded video data to the destination apparatus 14. In a feasible implementation, the file server includes a website server, a file transfer protocol server, a network-attached storage apparatus, or a local disk drive. The destination apparatus 14 may access the coded video data through any standard data connection including an internet connection. The data connection may include a wireless channel (for example, a Wi-Fi connection), a wired connection (for example, a cable modem), or a combination thereof that is applicable for accessing the coded video data stored in the file server. Transmission of the coded video data from the storage apparatus 24 may be streaming transmission, downloading transmission, or a combination thereof.

Techniques in this application are not necessarily limited to wireless applications or settings. The techniques can be applied to video decoding, to support any one of a plurality of multimedia applications, for example, over-the-air television broadcasting, cable television transmission, satellite television transmission, streaming video transmission (for example, through the internet), digital video coding for storage on a data storage medium, decoding of a digital video stored on a data storage medium, or another application. In some feasible implementations, the system may be configured to support unidirectional or bidirectional video transmission, to support applications such as streaming video transmission, video playing, video broadcasting, and/or videotelephony.

In a feasible implementation of FIG. 1, the source apparatus 12 includes a video source 18, the video encoder 20, and the output interface 22. In some applications, the output interface 22 may include a modulator/demodulator (a modem) and/or a transmitter. In the source apparatus 12, the video source 18 may include, for example, the following sources: a video capturing apparatus (for example, a video camera), a video archive including a previously captured video, a video feed-in interface for receiving a video from a video content provider, and/or a computer graphics system for generating computer graphics data as a source video, or a combination thereof. In a feasible implementation, if the video source 18 is a video camera, the source apparatus 12 and the destination apparatus 14 can constitute a camera phone or a video phone. For example, the techniques described in this application may be applied to video decoding, and may be applied to wireless and/or wired applications.

The video encoder 20 may code a video that is captured, pre-captured, or generated by a computer. The coded video data may be directly transmitted to the destination apparatus 14 through the output interface 22 of the source apparatus 12. The coded video data may also (or alternatively) be stored on the storage apparatus 24 for subsequent access by the destination apparatus 14 or another apparatus for decoding and/or playing.

The destination apparatus 14 includes an input interface 28, the video decoder 30, and a display apparatus 32. In some applications, the input interface 28 may include a receiver and/or a modem. The input interface 28 of the destination apparatus 14 receives the coded video data by using the link 16. The coded video data transmitted or provided to the storage apparatus 24 by using the link 16 may include a plurality of syntax elements that are generated by the video encoder 20 and that are used by the video decoder 30 to decode the video data. These syntax elements may be included in the coded video data transmitted on the communications medium, and stored in the storage medium or stored in the file server.

The display apparatus 32 may be integrated with the destination apparatus 14 or disposed outside the destination apparatus 14. In some feasible implementations, the destination apparatus 14 may include an integrated display apparatus and also be configured to connect to an interface of an external display apparatus. In other feasible implementations, the destination apparatus 14 may be a display apparatus. Generally, the display apparatus 32 displays decoded video data to a user, and may include any one of a plurality of display apparatuses, for example, a liquid crystal display, a plasma display, an organic light-emitting diode display, or another type of display apparatus.

The video encoder 20 and the video decoder 30 may operate according to, for example, a next-generation video coding compression standard (H.266) that is currently developed, and may comply with an H.266 test model (JEM). Alternatively, the video encoder 20 and the video decoder 30 may operate according to, for example, other dedicated or industrial standards or their extensions of the ITU-TH.265 standard or the ITU-TH.264 standard. The ITU-TH.265 standard is also referred to as a high efficiency video decoding standard, and the ITU-TH.264 standard is alternatively referred to as MPEG-4 Part 10, or advanced video coding (advanced video coding, AVC). However, the techniques of this application are not limited to any specific decoding standard. Other feasible implementations of a video compression standard include MPEG-2 and ITU-TH.263.

Although not shown in FIG. 1, in some aspects, the video encoder 20 and the video decoder 30 may be respectively integrated with an audio encoder and an audio decoder, and may include an appropriate multiplexer-demultiplexer (MUX-DEMUX) unit or other hardware and software to code both audio and video in a common data stream or a separate data stream. If applicable, in some feasible implementations, the MUX-DEMUX unit may comply with an ITUH.223 multiplexer protocol or other protocols such as the user datagram protocol (UDP).

Each of the video encoder 20 and the video decoder 30 may be implemented as any of a plurality of appropriate encoder circuits, for example, one or more microprocessors, digital signal processors (DSP), application-specific integrated circuits (ASIC), field-programmable gate arrays (FPGA), discrete logic, software, hardware, firmware, or any combination thereof. When the techniques are implemented partially as software, an apparatus may store an instruction for the software in an appropriate non-transitory computer-readable medium, and execute the instruction in a form of hardware by using one or more processors, to implement the techniques of this application. Each of the video encoder 20 and the video decoder 30 may be included in one or more encoders or decoders, and any of the one or more encoders or decoders may be integrated as a part of a combined encoder/decoder (CODEC) in a corresponding apparatus.

This application may, for example, relate to another apparatus in which the video encoder 20 signals specific information to, for example, the video decoder 30. However, it should be understood that the video encoder 20 may associate specific syntax elements with coded parts of video data, to signal information. That is, the video encoder 20 may store the specific syntax elements in header information of the coded parts of the video data, to signal the data. In some applications, these syntax elements may be coded and stored (for example, stored to a storage system 34 or a file server 36) before being received and decoded by the video decoder 30. Therefore, the term "signal" may mean, for example, transmission of a syntax or other data used for decoding compressed video data, regardless of whether the transmission is performed in real time, nearly in real time, or within a time span. For example, the transmission may be performed when a syntax element is stored to a medium during coding, and then the syntax element may be retrieved by a decoding apparatus at any time after being stored to the medium.

The JCT-VC has developed the H.265 (HEVC) standard. HEVC standardization is based on an evolved model of a video decoding apparatus, and the model is referred to as an HEVC test model (HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video decoding apparatus has several additional capabilities compared with an existing algorithm of ITU-TH.264/AVC. For example, H.264 provides nine intra prediction and coding modes, whereas the HM can provide up to 35 intra prediction and coding modes.

The JVET is committed to developing the H.266 standard. An H.266 standardization process is based on an evolved model of a video decoding apparatus, and the model is referred to as an H.266 test model. H.266 algorithm descriptions are available at http://phenix.int-evry.fr/jvet, and latest algorithm descriptions are included in JVET-F1001-v2. This algorithm description document is incorporated herein by reference in its entirety. In addition, reference software for the JEM test model is available at https://jvet.hhi.fraunhofer.de/svn/svn_HMJEMSoftware/, which is also incorporated herein by reference in its entirety.

Generally, as described in an HM working model, a video frame or picture may be divided into a sequence of tree blocks or largest coding units (largest coding unit, LCU) including both luminance and chrominance samples. The LCU is also referred to as a CTU. A tree block has a function similar to a macroblock in the H.264 standard. A slice includes several consecutive tree blocks in a decoding order. A video frame or picture may be partitioned into one or more slices. Each tree block can be split into coding units based on a quadtree. For example, a tree block acting as a root node of the quadtree may be split into four child nodes, and each child node may act as a parent node and be split into four other child nodes. A final non-splittable child node acting as a leaf node of the quadtree includes a decoding node, for example, a decoded picture block. In syntactic data associated with a decoded bitstream, a maximum quantity of splittable times of a tree block and a minimum size of a decoding node may be defined.

A coding unit includes a decoding node, a prediction unit (prediction unit, PU), and a transform unit (transform unit, TU) associated with the decoding node. The CU has a size corresponding to a size of the decoding node, and needs to be in a square shape. The size of the CU may range from 8×8 pixels up to at most 64×64 pixels, or be a larger tree block size. Each CU may include one or more PUs and one or more TUs. For example, syntactic data associated with the CU may describe partitioning of one CU into one or more PUs. Partitioning patterns may vary when the CU is coded in a skip or direct mode, coded in an intra prediction mode, or coded in an inter prediction mode. The PU obtained through partitioning may be in a non-square shape. For example, the syntactic data associated with the CU may also describe partitioning of one CU into one or more TUs based on the quadtree. The TU may be in a square or non-square shape.

The HEVC standard allows TU-based transformation, and TUs may be different for different CUs. A TU size is typically set based on a size of a PU within a given CU defined for a partitioned LCU. However, this may not always be the case. The TU size is generally the same as or less than the PU size. In some feasible implementations, a quadtree structure referred to as a "residual quadtree" (residual quadtree, RQT) may be used to divide a residual sample corresponding to the CU into smaller units. A leaf node of the RQT may be referred to as a TU. A pixel difference associated with the TU may be transformed to generate a transform coefficient, and the transform coefficient may be quantized.

Generally, transform and quantization processes are used for the TU. A given CU with one or more PUs may also include one or more TUs. After prediction, the video encoder 20 may calculate a residual value corresponding to the PU. The residual value includes a pixel difference, and the pixel difference may be transformed into a transform coefficient, and the transform coefficient is quantized and undergoes TU scanning to generate a serialized transform coefficient for entropy decoding. In this application, the term "picture block" is generally used to represent the decoding node of the CU. In some specific applications, in this application, the term "picture block" may also be used to represent the tree block including the decoding node, the PU, and the TU, for example, the LCU or the CU. In this embodiment of this application, various method examples described in an adaptive inverse quantization method in video encoding or decoding are described in detail below to perform an inverse quantization process of a transform coefficient corresponding to a current picture block (namely, a current transform block), to improve coding performance.

A video sequence generally includes a series of video frames or pictures. For example, a group of pictures (group of picture, GOP) includes a series of video pictures, one video picture, or a plurality of video pictures. The GOP may include syntactic data in header information of the GOP, in header information of one or more of the pictures, or elsewhere, and the syntactic data describes a quantity of pictures included in the GOP. Each slice of a picture may include slice syntactic data describing a coding mode of the corresponding picture. The video encoder 20 usually performs an operation on picture blocks in some video slices, to code video data. A picture block may correspond to a decoding node in a CU. A size of the picture block may be fixed or changeable, and may vary with a specified decoding standard.

In a feasible implementation, the HM supports prediction for a variety of PU sizes. Assuming that a size of a given CU is 2N×2N, the HM supports intra prediction for a PU size of 2N×2N or N×N, and inter prediction for a symmetric PU size of 2N×2N, 2N×N, N×2N, or N×N. The HM also supports asymmetric partitioning of inter prediction for PU sizes of 2N×nU, 2N×nD, nL×2N, and nR×2N. In asymmetric partitioning, the CU is not partitioned in one direction, and is partitioned into two parts in the other direction, where one part occupies 25% of the CU and the other part occupies 75% of the CU. The part occupying 25% of the CU is indicated by an indicator including "n" followed by "U (Up)", "D (Down)", "L (Left)" or "R (Right)". Therefore, for example, "2N×nU" refers to a horizontally partitioned 2N×2N CU, with a 2N×0.5N PU at the top and a 2N×1.5N PU at the bottom.

In this application, "N×M" and "N multiplied by M" may be used interchangeably to indicate a pixel size of a picture block in a vertical dimension and a horizontal dimension, for example, 16×8 pixels or 16 multiplied by 8 pixels. Generally, a 16×8 block has 16 pixels in a horizontal direction and has 8 pixels in a vertical direction. In other words, a width of the picture block is 16 pixels and a height of the picture block is 8 pixels.

After intra or inter predictive decoding of a PU in a CU, the video encoder 20 may calculate residual data of a TU in the CU. The PU may include pixel data in a spatial domain (also referred to as a pixel domain). The TU may include a coefficient in a transform domain after transform (for example, discrete cosine transform (discrete cosine transform, DCT), integer transform, wavelet transform, or other conceptually similar transform) is performed on residual video data. The residual data may correspond to differences between pixel values of an uncoded picture and predicted pixel values corresponding to the PU. The video encoder 20 may generate a TU containing residual data of the CU, and then transform the TU to generate a CU transform coefficient.

In this embodiment of this application, various method examples of an inter prediction process in video encoding or decoding are described in detail below to obtain a sampling value of a sampling point of an optimal forward reference block of a current picture block and a sampling value of a sampling point of an optimal backward reference block of the current picture block, to further predict a sampling value of a sampling point of the current picture block. A picture block is a two-dimensional sampling point array, and may be a square array, or may be a rectangular array. For example, a picture block of a 4×4 size may be considered as a square sampling point array formed by a total of 4×4=16 sampling points. A signal in the picture block is a sampling value of a sampling point in the picture block. In addition, the sampling point may also be referred to as a sample or a pixel, and is to be used without distinction in this specification of the present invention. Correspondingly, a value of the sampling point may also be referred to as a pixel value, and is to be used without distinction in this application. A picture may also be represented as a two-dimensional sampling point array, and is denoted by using a method similar to a method used for the picture block.

After performing any transform to generate a transform coefficient, the video encoder 20 may quantize the transform coefficient. Quantization means, for example, a process of quantizing a coefficient, to reduce an amount of data used for representing the coefficient and implement further compression. The quantization process can reduce a bit depth associated with some or all coefficients. For example, during quantization, an n-bit value may be reduced to an m-bit value, where n is greater than m.

The JEM model further improves a video picture coding structure. Specifically, a block coding structure referred to as a "quadtree plus binary tree" (QTBT) is introduced. Without using such concepts as CU, PU, and TU in HEVC, the QTBT structure supports a more flexible CU partitioning shape. One CU may be in a square or rectangular shape. Quadtree partitioning is first performed on a CTU, and binary tree partitioning is further performed on a leaf node of the quadtree. In addition, there are two binary tree partitioning modes: symmetric horizontal partitioning and symmetric vertical partitioning. A leaf node of a binary tree is referred to as a CU. A CU in the JEM cannot be further partitioned during prediction and transform. In other words, a CU, a PU, and a TU in the JEM have a same block size. In the existing JEM, a maximum CTU size is 256×256 luminance pixels.

In some feasible implementations, the video encoder 20 may scan a quantized transform coefficient in a predefined scanning order to generate a serialized vector that can be entropy coded. In other feasible implementations, the video encoder 20 may perform adaptive scanning. After scanning the quantized transform coefficient to form a one-dimensional vector, the video encoder 20 may perform entropy decoding on the one-dimensional vector by using context-based adaptive variable length coding (CAVLC), context-based adaptive binary arithmetic coding (CABAC), syntax-based context-adaptive binary arithmetic coding (SBAC), probability interval partitioning entropy (PIPE) decoding, or another entropy decoding method. The video encoder 20 may further perform entropy coding on a syntax element associated with the coded video data, for the video decoder 30 to decode the video data.

Figure 2A:
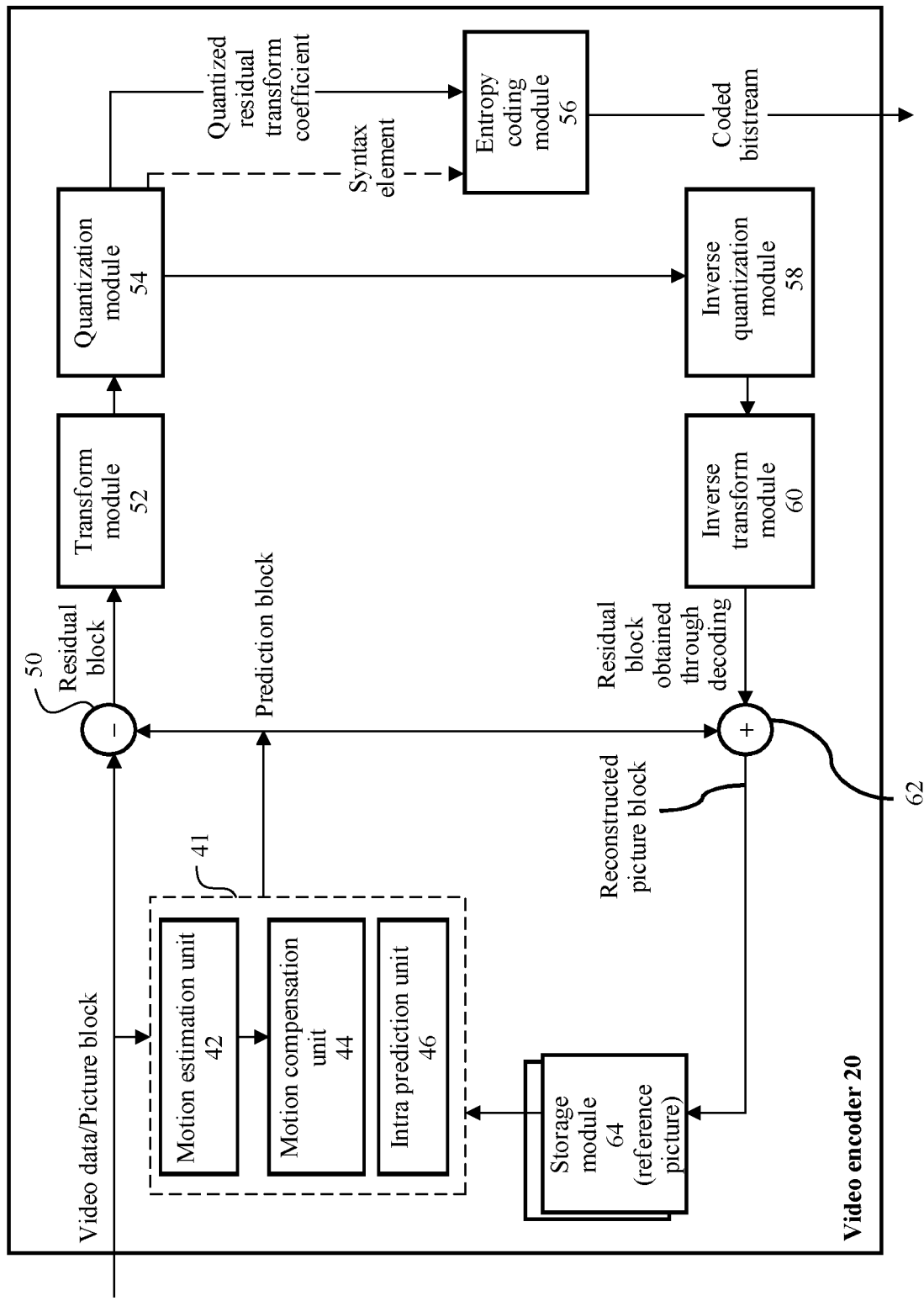
FIG. 2A is a schematic block diagram of a video encoder according to an embodiment of this application.

FIG. 2A is a schematic block diagram of a video encoder 20 according to an embodiment of this application. Also referring to FIG. 3, the video encoder 20 may perform a picture prediction process, and in particular, a motion compensation unit 44 in the video encoder 20 may perform the picture prediction process.

As shown in FIG. 2A, the video encoder 20 may include a prediction module 41, a summator 50, a transform module 52, a quantization module 54, and an entropy coding module 56. In an example, the prediction module 41 may include a motion estimation unit 42, the motion compensation unit 44, and an intra prediction unit 46. An internal structure of the prediction module 41 is not limited in this embodiment of this application. Optionally, for a video encoder with a hybrid architecture, the video encoder 20 may further include an inverse quantization module 58, an inverse transform module 60, and a summator 62.

In a feasible implementation of FIG. 2A, the video encoder 20 may further include a partitioning unit (not shown) and a reference picture memory 64. It should be understood that the partitioning unit and the reference picture memory 64 may alternatively be disposed outside the video encoder 20.

In another feasible implementation, the video encoder 20 may further include a filter (not shown) to filter a block boundary, to remove a block effect artifact from a reconstructed video. When necessary, the filter usually performs filtering on an output of the summator 62.

As shown in FIG. 2A, the video encoder 20 receives video data, and the partitioning unit partitions the data into picture blocks. Such partitioning may further include partitioning into slices, picture blocks, or other larger units, for example, picture block partitioning based on quadtree structures of an LCU and a CU. Generally, a slice may be divided into a plurality of picture blocks.

The prediction module 41 is configured to generate a prediction block of a current coded picture block. The prediction module 41 may select one of a plurality of possible decoding modes of the current picture block, for example, one of a plurality of intra decoding modes or one of a plurality of inter decoding modes, based on coding quality and a cost calculation result (for example, a rate-distortion cost, RDcost). The prediction module 41 may provide an intra-decoded or inter-decoded block to the summator 50 to generate residual block data, and provide the intra-decoded or inter-decoded block to the summator 62 to reconstruct the coded block and use a reconstructed block as a reference picture.

The motion estimation unit 42 and the motion compensation unit 44 in the prediction module 41 perform inter prediction decoding on the current picture block relative to one or more prediction blocks in one or more reference pictures, to provide temporal compression. The motion estimation unit 42 is configured to determine an inter prediction mode for a video slice based on a preset mode of a video sequence. In the preset mode, the video slice in the sequence may be specified as a P slice, a B slice, or a GPB slice. The motion estimation unit 42 and the motion compensation unit 44 may be highly integrated, but are described separately to explain concepts. Motion estimation performed by the motion estimation unit 42 is a process of generating a motion vector for estimating a picture block. For example, the motion vector may indicate a displacement of a PU of a picture block in a current video frame or picture relative to a prediction block in the reference picture.

The prediction block is a block in a PU that is found, based on a pixel difference, to be closely matched with a to-be-decoded picture block, and the pixel difference may be determined based on a sum of absolute differences (SAD), a sum of squared differences (SSD), or another difference metric. In some feasible implementations, the video encoder 20 may calculate a value of a sub-integer (sub-integer) pixel position of the reference picture stored in the reference picture memory 64.

By comparing a position of the PU and a position of the prediction block of the reference picture, the motion estimation unit 42 calculates a motion vector of a PU of a picture block in an inter-decoded slice. The reference picture may be selected from a first reference picture list (a list 0) or a second reference picture list (a list 1). Each item in the list identifies one or more reference pictures stored in the reference picture memory 64. The motion estimation unit 42 sends the calculated motion vector to the entropy coding unit 56 and the motion compensation unit 44.

Motion compensation performed by the motion compensation unit 44 may include abstracting or generating a prediction block based on the motion vector determined through motion estimation, and interpolation at a sub-pixel level may be performed. After receiving the motion vector of the PU of the current picture block, the motion compensation unit 44 may locate a prediction block pointed to by the motion vector in one of the reference picture lists. The video encoder 20 subtracts a pixel value of the prediction block from a pixel value of the current picture block being decoded, to obtain a residual picture block, and obtain a pixel difference. The pixel difference forms residual data of a block, and may include a luminance difference component and a chroma difference component. The summator 50 is one or more components performing the subtraction operation. The motion compensation unit 44 may further generate a syntax element associated with a picture block and a video slice, for a video decoder 30 to decode the picture block of the video slice. The following describes in detail a picture prediction process in the embodiments of this application with reference to FIG. 3, FIG. 10 to FIG. 12, and FIG. 14 to FIG. 17. Details are not described herein.

The intra prediction unit 46 in the prediction module 41 may perform intra predictive decoding on the current picture block relative to one or more neighboring blocks in a picture or slice that is the same as the current to-be-decoded block, to provide spatial compression. Therefore, as an alternative of inter prediction (as described above) performed by the motion estimation unit 42 and the motion compensation unit 44, the intra prediction unit 46 may perform intra prediction on the current block. To be specific, the intra prediction unit 46 may determine an intra prediction mode for coding the current block. In some feasible implementations, the intra prediction unit 46 may (for example) use various intra prediction modes to code the current block during separate coding traversal, and the intra prediction unit 46 (or in some feasible implementations, a mode selection unit 40) may select, from tested modes, an appropriate intra prediction mode.

After the prediction module 41 generates the prediction block of the current picture block by performing inter prediction or intra prediction, the video encoder 20 generates the residual picture block by subtracting the prediction block from the current picture block. Residual video data in the residual block may be included in one or more TUs, and applied to the transform module 52. The transform module 52 is configured to transform a residual between an original block of the current coded picture block and the prediction block of the current picture block. The transform module 52 transforms the residual data into a residual transform coefficient by performing, for example, discrete cosine transform (DCT) or conceptually similar transform (for example, discrete sine transform DST). The transform module 52 may transform the residual video data from pixel domain data to transform domain (for example, frequency domain) data.

The transform module 52 may send the obtained transform coefficient to the quantization module 54. The quantization module 54 quantizes the transform coefficient to further reduce a bit rate. In some feasible implementations, the quantization module 54 may continue to scan a matrix containing the quantized transform coefficient. Alternatively, the entropy coding module 56 may perform the scanning.

After quantization, the entropy coding module 56 may perform entropy coding on the quantized transform coefficient. For example, the entropy coding module 56 may perform context-based adaptive variable length decoding (CAVLC), context-based adaptive binary arithmetic decoding (CABAC), syntax-based context-adaptive binary arithmetic decoding (SBAC), probability interval partitioning entropy (PIPE) decoding, or another entropy coding method or technique. The entropy coding module 56 may also perform entropy coding on a motion vector and another syntax element that are of a current video slice that is being coded. After the entropy coding module 56 performs entropy coding, a coded bitstream may be transmitted to the video decoder 30, or stored for subsequent transmission or search by the video decoder 30.

The inverse quantization module 58 and the inverse transform module 60 perform inverse quantization and inverse transform respectively, to reconstruct the residual block in a pixel domain as a reference block of the reference picture. The summator 62 adds a reconstructed residual block to the prediction block generated by the prediction module 41, to generate the reconstructed block, and uses the reconstructed block as the reference block for storage in the reference picture memory 64. The reference block may be used by the motion estimation unit 42 and the motion compensation unit 44 as a reference block for performing inter prediction on a block in a subsequent video frame or picture.

It should be understood that another structural variant of the video encoder 20 can be used to code a video stream. For example, for some picture blocks or picture frames, a residual signal may be quantized directly by the video encoder 20 without being processed by the transform module 52, and correspondingly the residual signal does not need to be processed by the inverse transform module 58. Alternatively, for some picture blocks or picture frames, the video encoder 20 does not generate residual data, and correspondingly no processing needs to be performed by the transform module 52, the quantization module 54, the inverse quantization module 58, and the inverse transform module 60. Alternatively, a reconstructed picture block may be directly stored as a reference block by the video encoder 20 without being processed by a filter unit. Alternatively, the quantization module 54 and the inverse quantization module 58 in the video encoder 20 may be integrated. Alternatively, the transform module 52 and the inverse transform module 60 in the video encoder 20 may be integrated. Alternatively, the summator 50 and the summator 62 may be integrated.

Figure 2B:
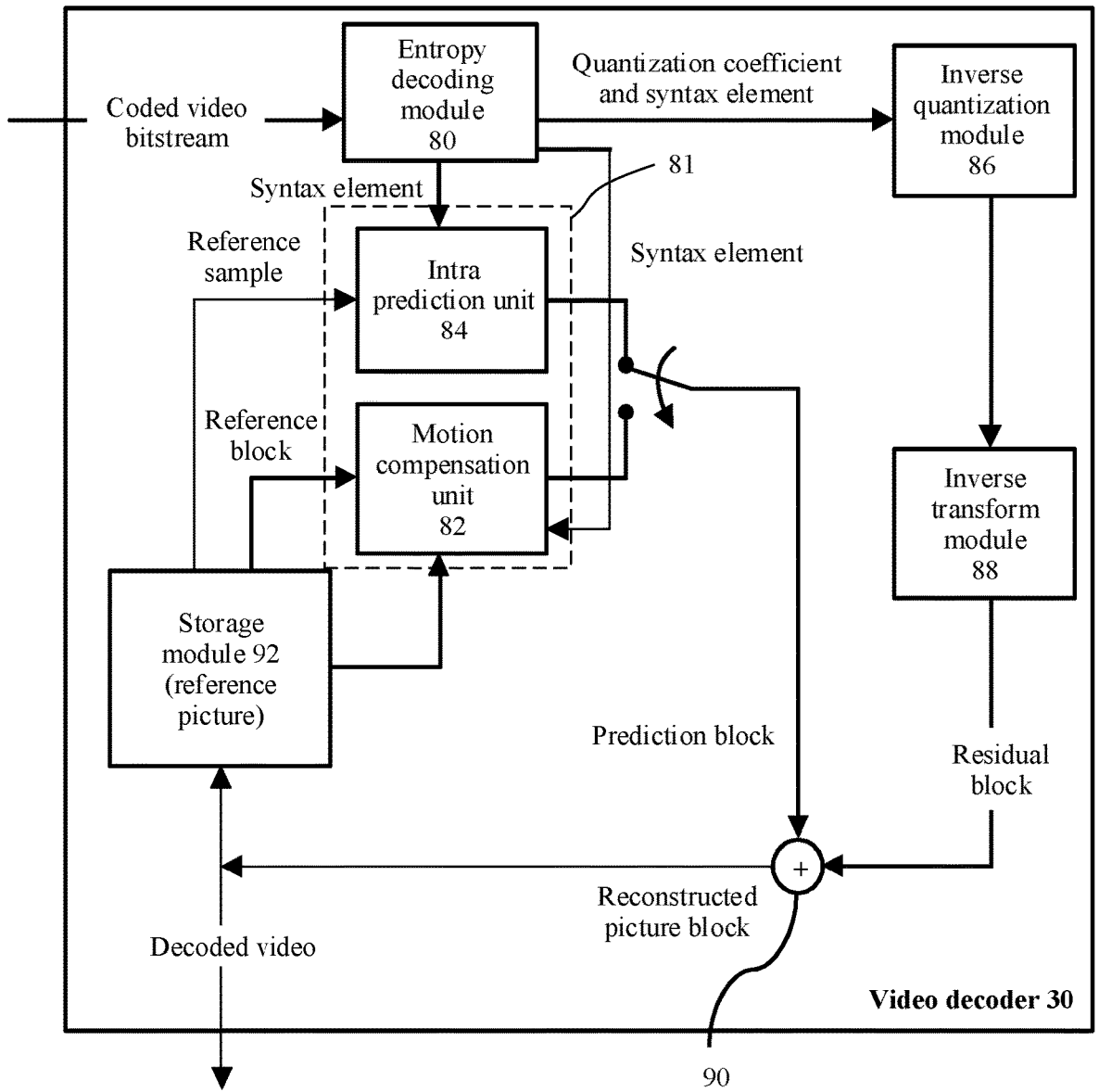
FIG. 2B is a schematic block diagram of a video decoder according to an embodiment of this application.

FIG. 2B is a schematic block diagram of a video decoder 30 according to an embodiment of this application. Also referring to FIG. 3, FIG. 10 to FIG. 12, and FIG. 14 to FIG. 17, the video decoder 30 may perform a picture prediction process, and in particular, a motion compensation unit 82 in the video decoder 30 may perform the picture prediction process.

As shown in FIG. 2B, the video decoder 30 may include an entropy decoding module 80, a prediction processing module 81, an inverse quantization module 86, an inverse transform module 88, and a reconstruction module 90. In an example, the prediction module 81 may include a motion compensation unit 82 and an intra prediction unit 84. This is not limited in this embodiment of this application.

In a feasible implementation, the video decoder 30 may further include a reference picture memory 92. It should be understood that the reference picture memory 92 may alternatively be disposed outside the video decoder 30. In some feasible implementations, the video decoder 30 may perform an example decoding process inverse to the encoding process described in the video encoder 20 in FIG. 2A.

During decoding, the video decoder 30 receives, from the video encoder 20, a coded video bitstream that represents a picture block of a coded video slice and an associated syntax element. The video decoder 30 may receive the syntax element at a video slice level and/or a picture block level. The entropy decoding module 80 of the video decoder 30 performs entropy decoding on the bitstream to generate a quantized coefficient and some syntax elements. The entropy decoding module 80 forwards the syntax element to the prediction module 81. In this application, in an example, the syntax element herein may include inter prediction data related to the current picture block, and the inter prediction data may include an index identifier block based index, to indicate which motion information (also referred to as initial motion information of the current picture block) is used by the current picture block. Optionally, the inter prediction data may further include a switch flag block based enable flag, to indicate whether to perform picture prediction on the current picture block by using FIG. 3 or FIG. 14 (in other words, to indicate whether to perform inter prediction on the current picture block by using an MVD mirror constraint proposed in this application), or whether to perform picture prediction on the current picture block by using FIG. 12 or FIG. 16 (in other words, to indicate whether to perform inter prediction on the current picture block by using a proportional relationship that is based on a time domain distance and that is proposed in this application).

When the video slice is decoded into an intra-decoded (I) slice, the intra prediction unit 84 of the prediction module 81 may generate a prediction block of the picture block of the current video slice based on an intra prediction mode notified by sending a signal and data of a previously decoded block that is from a current frame or picture. When the video slice is decoded into an inter-decoded (namely, B or P) slice, the motion compensation unit 82 of the prediction module 81 may determine, based on the syntax element received from the entropy decoding module 80, an inter prediction mode used to decode the current picture block of the current video slice, and decode (for example, perform inter prediction on) the current picture block based on the determined inter prediction mode. Specifically, the motion compensation unit 82 may determine which picture prediction method is used to predict the current picture block of the current video slice, for example, the syntax element indicates that a picture prediction method based on the MVD mirror constraint is to be used to predict the current picture block. The motion information of the current picture block of the current video slice is predicted or refined, to obtain or generate, by using a motion compensation process, the prediction block of the current picture block by using the predicted motion information of the current picture block. The motion information herein may include reference picture information and a motion vector. The reference picture information may include but is not limited to unidirectional/bidirectional prediction information, a reference picture list number, and a reference picture index corresponding to a reference picture list. For inter prediction, the prediction block may be generated from one of reference pictures in one of reference picture lists. The video decoder 30 may construct the reference picture lists, namely a list 0 and a list 1, based on the reference pictures stored in the reference picture memory 92. A reference frame index of the current picture may be included in one of or both a reference frame list 0 and a reference frame list 1. In some instances, the video encoder 20 may send a signal to indicate which new picture prediction method is used.

In this embodiment, the prediction module 81 is configured to generate a prediction block of a current coding picture block. Specifically, when the video slice is decoded into the intra-decoded (I) slice, the intra prediction unit 84 of the prediction module 81 may generate the prediction block of the picture block of the current video slice based on the signaled intra prediction mode sent and the data of the previously decoded picture block that is from the current frame or picture. When a video picture is decoded into an inter-decoded (for example, B, P, or GPB) slice, the motion compensation unit 82 of the prediction module 81 generates a prediction block of a picture block of the current video picture based on the motion vector and other syntax elements that are received from the entropy decoding unit 80.

The inverse quantization module 86 performs inverse quantization on, namely, dequantizes, a quantized transform coefficient provided in the bitstream obtained by the entropy decoding module 80 through decoding. The inverse quantization process may include: determining a to-be-applied quantization degree by using a quantization parameter calculated by the video encoder 20 for each picture block in the video slice, and similarly determining a to-be-applied inverse quantization degree. The inverse transform module 88 performs inverse transform, for example, inverse DCT, inverse integer transform, or a conceptually similar inverse transform process, to the transform coefficient, to generate a pixel-domain residual block.

After the motion compensation unit 82 generates the prediction block for the current picture block, the video decoder 30 sums the residual block from the inverse transform module 88 and the corresponding prediction block generated by the motion compensation unit 82, to obtain a reconstructed block, namely, a decoded picture block. A summator 90 represents a component that performs the summation operation. When necessary, a loop filter (in a decoding loop or after a decoding loop) may be further used to make pixel transform smooth, or video quality may be improved in another manner. A filter unit (not shown) may represent one or more loop filters, for example, a deblocking filter, an adaptive loop filter (ALF), and a sample adaptive offset (SAO) filter. In addition, a decoded picture block in a given frame or picture may be further stored in a decoded picture buffer 92, and the decoded picture buffer 92 stores a reference picture used for subsequent motion compensation. The decoded picture buffer 92 may be a part of a memory, and may further store a decoded video for subsequent presentation on a display apparatus (for example, the display apparatus 32 in FIG. 1). Alternatively, the decoded picture buffer 9 may be separated from such a memory.

It should be understood that another structural variant of the video decoder 30 can be used to decode the coded video bitstream. For example, the video decoder 30 may generate an output video stream without processing by the filter unit. Alternatively, for some picture blocks or picture frames, the entropy decoding module 80 of the video decoder 30 does not obtain a quantized coefficient through decoding, and correspondingly processing by the inverse quantization module 86 and the inverse transformer 88 is not required. For example, the inverse quantization module 86 and the inverse transform module 88 in the video decoder 30 may be integrated.

Figure 3:
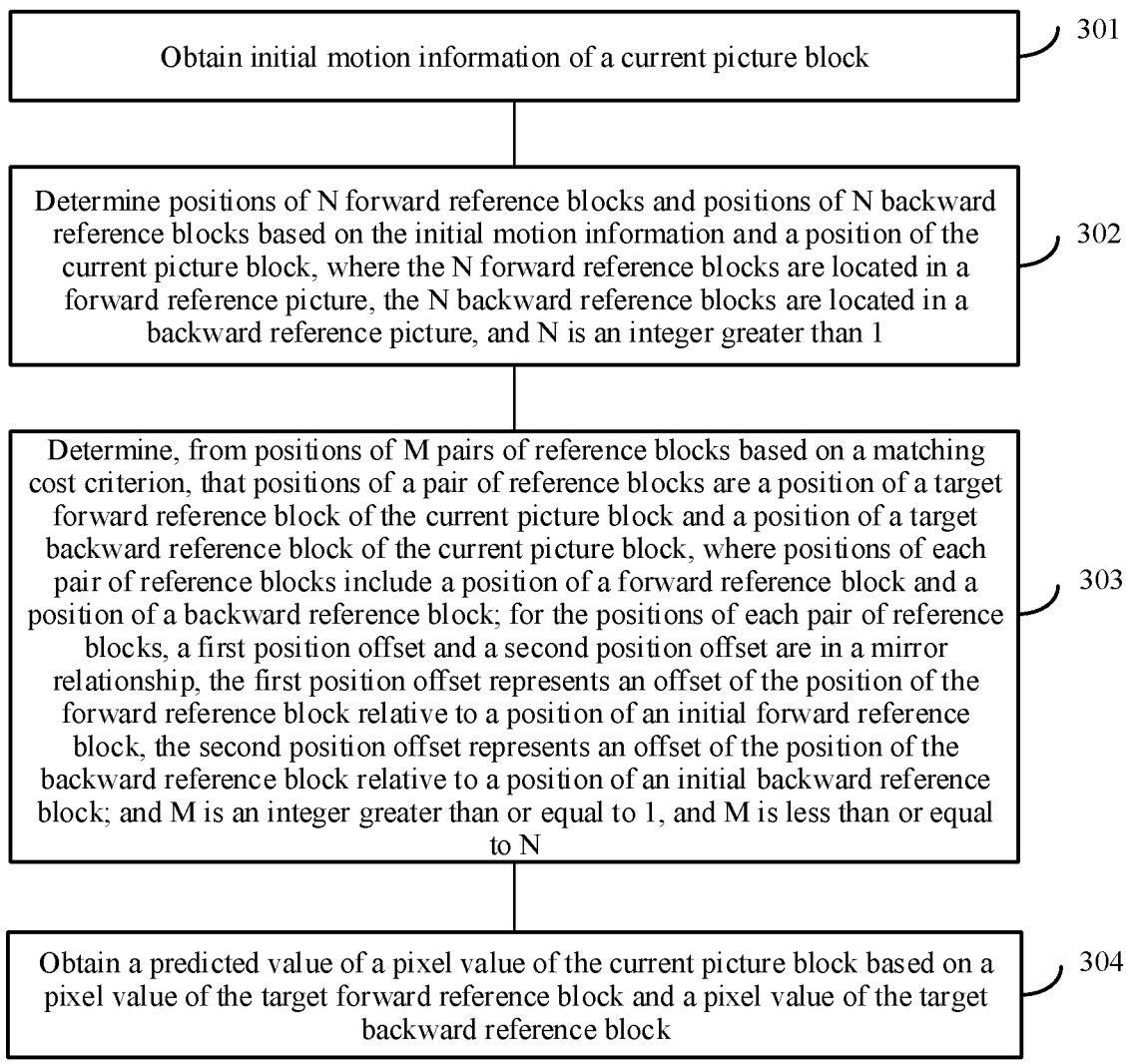
FIG. 3 is a schematic flowchart of a picture prediction method according to an embodiment of this application.

FIG. 3 is a schematic flowchart of a picture prediction method according to an embodiment of this application. The method shown in FIG. 3 may be performed by a video coding apparatus, a video codec, a video coding system, or another device having a video coding function. The method shown in FIG. 3 may be used in a coding process or a decoding process. More specifically, the method shown in FIG. 3 may be used in an inter prediction process during encoding or decoding. A process 300 may be performed by a video encoder 20 or a video decoder 30, and specifically may be performed by a motion compensation unit of the video encoder 20 or the video decoder 30. It is assumed that, for a video data stream with a plurality of video frames, the video encoder or the video decoder is being used to perform the process 300 including the following steps, to predict a predicted value of a pixel value of a current picture block of a current video frame.

The method shown in FIG. 3 includes step 301 to step 304, and step 301 to step 304 are described in detail below.

301: Obtain initial motion information of a current picture block.

The picture block herein may be a picture block in a to-be-processed picture or a sub-picture in a to-be-processed picture. In addition, the picture block herein may be a to-be-coded picture block in the coding process or a to-be-decoded picture block in the decoding process.

Moreover, the initial motion information may include indication information of a prediction direction (which is usually bidirectional prediction), a motion vector pointing to a reference picture block (which is usually a motion vector of a neighboring block), and information of a picture in which the reference picture block is located (which is usually understood as reference picture information). The motion vector includes a forward motion vector and a backward motion vector, and the reference picture information includes reference frame index information of a forward prediction reference picture block and a backward prediction reference picture block.

The initial motion information of the picture block may be obtained in a plurality of manners. For example, the initial motion information of the picture block may be obtained in the following manner 1 and manner 2.

Figure 4:
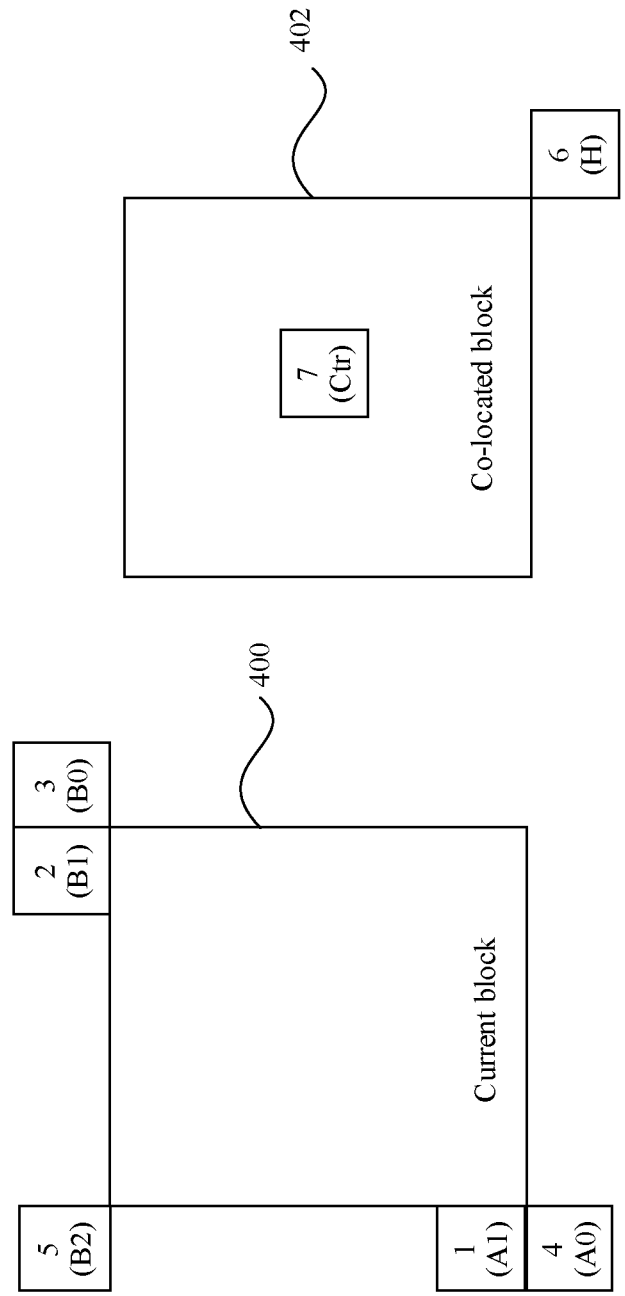
FIG. 4 is a schematic diagram of obtaining initial motion information by an encoder side in a merge mode of inter prediction.
Figures 5, 6:
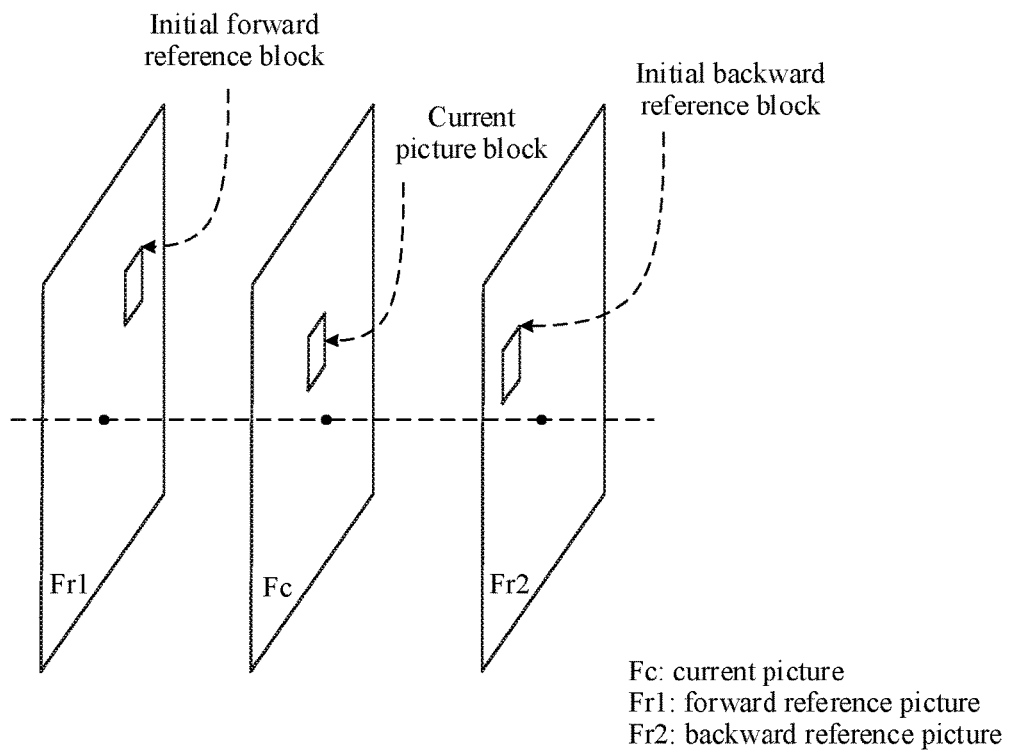
FIG. 5 is a schematic diagram of obtaining initial motion information by a decoder side in a merge mode of inter prediction.
FIG. 6 is a schematic diagram of an initial reference block of a current picture block.

Manner 1:

Referring to FIG. 4 and FIG. 5, in a merge mode of inter prediction, a candidate motion information list is constructed based on motion information of a neighboring block of the current picture block, and a piece of candidate motion information is selected from the candidate motion information list as the initial motion information of the current picture block. The candidate motion information list includes a motion vector, reference frame index information, and the like. For example, motion information of a neighboring block A0 (referring to candidate motion information whose index is 0 in FIG. 5) is selected as the initial motion information of the current picture block. Specifically, a forward motion vector of A0 is used as a forward prediction motion vector of the current block, and a backward motion vector of A0 is used as a backward prediction motion vector of the current block.

Manner 2:

In a non-merge mode of inter prediction, a motion vector predicted value list is constructed based on motion information of a neighboring block of the current picture block, and a motion vector is selected from the motion vector predicted value list as a motion vector predicted value of the current picture block. In this case, a motion vector of the current picture block may be a motion vector value of the neighboring block or a sum of differences between motion vectors of selected neighboring blocks and the motion vector of the current picture block. The motion vector difference is a difference between the motion vector obtained by performing motion estimation on the current picture block and the motion vector of the selected neighboring block. For example, motion vectors, corresponding to indexes 1 and 2, in the motion vector predicted value list are selected as a forward motion vector and a backward motion vector of the current picture block.

It should be understood that the foregoing manner 1 and manner 2 are merely two specific manners of obtaining the initial motion information of the picture block. In this application, a manner of obtaining the initial motion information of the picture block is not limited, and any manner in which the initial motion information of the picture block can be obtained shall fall within the protection scope of this application.

302: Determine positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1.

Referring to FIG. 6, a current picture to which the current picture block in this embodiment of this application belongs has two reference pictures: the forward reference picture and the backward reference picture.

In an example, the initial motion information includes a first motion vector and a first reference picture index in a forward prediction direction, and a second motion vector and a second reference picture index in a backward prediction direction.

Figures 7, 8:
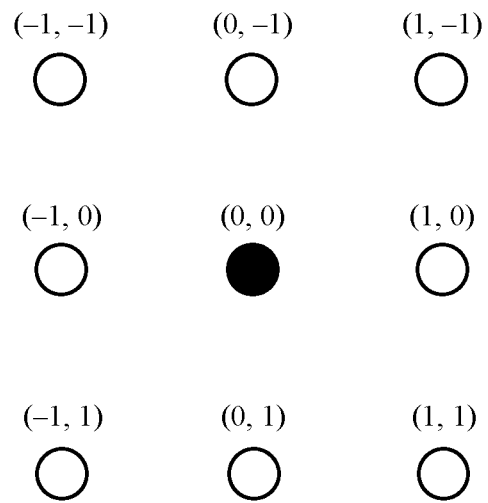
FIG. 7 is a schematic diagram of a pixel at an integer pixel position and a pixel at a fractional pixel position.
FIG. 8 is a schematic diagram of a search start point.

Correspondingly, step 302 may include:

determining, based on the first motion vector and the position of the current picture block, a position of an initial forward reference block of the current picture block in the forward reference picture corresponding to the first reference picture index, using the position of the initial forward reference block as a first search start point (indicated by (0, 0) in FIG. 8), and determining positions of (N−1) candidate forward reference blocks in the forward reference picture; and determining, based on the second motion vector and the position of the current picture block, a position of an initial backward reference block of the current picture block in the backward reference picture corresponding to the second reference picture index, using the position of the initial backward reference block as a second search start point, and determining positions of (N−1) candidate backward reference blocks in the backward reference picture.

In an example, referring to FIG. 7, the positions of the N forward reference blocks include the position (indicated by (0, 0)) of the initial forward reference block and the positions (indicated by (0, −1), (−1, −1), (−1, 1), (1, −1), (1, 1), and the like) of the (N−1) candidate forward reference blocks, and an offset of a position of each candidate forward reference block relative to the position of the initial forward reference block is an integer pixel distance (as shown in FIG. 8) or a fractional pixel distance, where N=9; or the positions of the N backward reference blocks include the position of the initial backward reference block and the positions of the (N−1) candidate backward reference blocks, and an offset of a position of each candidate backward reference block relative to the position of the initial backward reference block is an integer pixel distance or a fractional pixel distance, where N=9.

Referring to FIG. 8, in a motion estimation or motion compensation process, MV precision may be fractional pixel precision (for example, ½ pixel precision or ¼ pixel precision). If a picture has only a pixel value of an integer pixel, and current MV precision is fractional pixel precision, interpolation needs to be performed by using an interpolation filter and by using a pixel value of an integer pixel position of a reference picture, to obtain a pixel value of a fractional pixel position, and the obtained pixel value is used as a value of a prediction block of a current block. A specific interpolation process is related to an interpolation filter that is used. Generally, a pixel value of an integer sample around a reference sample may be linearly weighted to obtain a value of the reference sample. Common interpolation filters include 4-tap, 6-tap, and 8-tap interpolation filters, and the like.

As shown FIG. 7, Ai,j is a sample at an integer pixel position, and a bit width thereof is bitDepth. a0,0, b0,0, c0,0, d0,0, h0,0, n0,0, e0,0, i0,0, p0,0, f0,0, j0,0, q0,0, g0,0, k0,0, and r0,0 are samples at fractional pixel positions. If an 8-tap interpolation filter is used, a0,0 can be obtained through calculation by using the following formula:

$$a0,0=(C_0*A_{-3,0}+C_1*A_{-2,0}+C_2*A_{-1,0}+C_3*A_{0,0}+C_4*A_{1,0}\pm C_5*A_{2,0}\pm C_6*A_{3,0}\pm C_7*A_{4,0})\text{>>shift1}$$

In the foregoing formula, $C_k$ is a coefficient of the interpolation filter, and k=0, 1, . . . , 7. If a sum of the coefficients of the interpolation filter is 2 to the power of N, a gain of the interpolation filter is N. For example, N being 6 indicates that the gain of the interpolation filter is 6 bits. shift1 is a quantity of bits of a right shift, and shift1 may be set to bitDepth−8, where bitDepth is a target bit width. In this way, based on the foregoing formula, a finally obtained bit width of a pixel value of a prediction block is bitDepth+6−shift1=14 bits.

303: Determine, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to the position of the initial forward reference block, and the second position offset represents an offset of the position of the backward reference block relative to the position of the initial backward reference block; and M is an integer greater than or equal to 1, and M is less than or equal to N.

Figure 9:
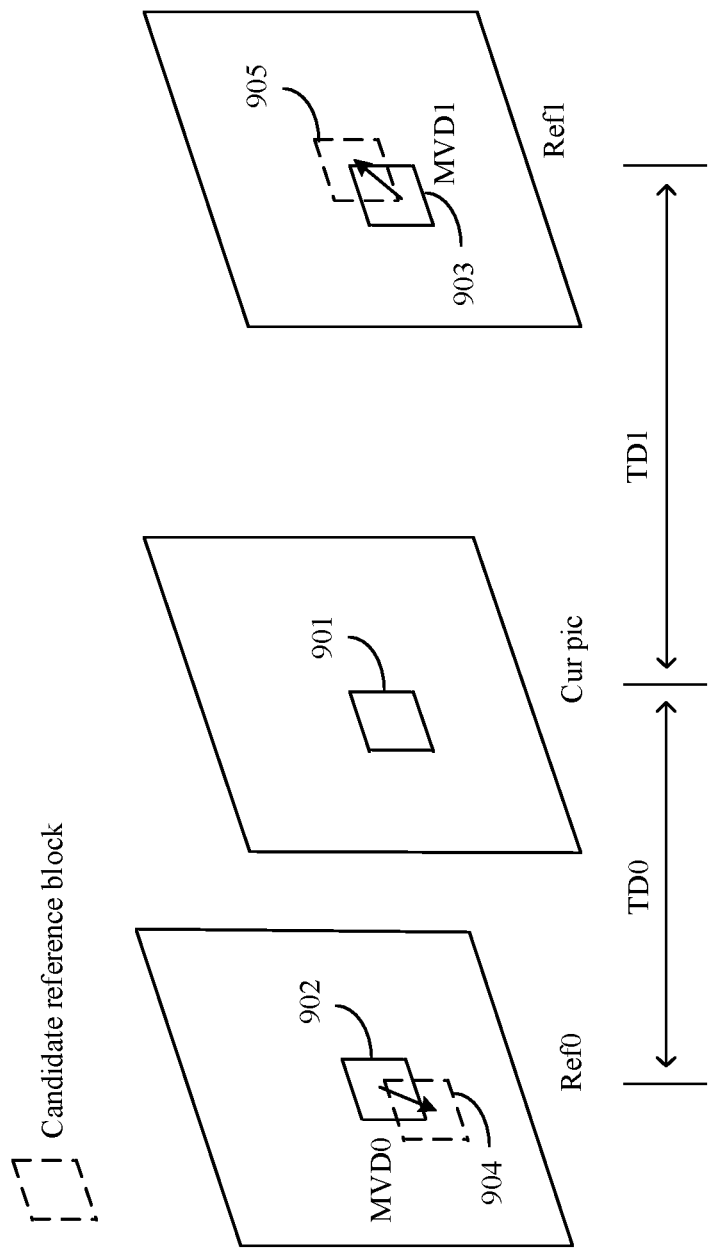
FIG. 9 is a schematic block diagram of a first position offset and a second position offset that are in a mirror relationship according to an embodiment of this application.

Referring to FIG. 9, an offset of a position of a candidate forward reference block 904 in a forward reference picture Ref0 relative to a position of an initial forward reference block 902 (namely, a forward search base point) is MVD0 (delta0x, delta0y). An offset of a position of a candidate backward reference block 905 in a backward reference picture Ref1 relative to a position of an initial backward reference block 903 (namely, a backward search base point) is MVD1 (delta1x, delta1y).

MVD0=−MVD1, to be specific:

delta0x=−delta1x; and delta0y=−delta1y.

In a different example, step 303 may include:
determining, from the positions of the M pairs of reference blocks (one forward reference block and one backward reference block), that positions of a pair of reference blocks with a minimum matching error are the position of the target forward reference block of the current picture block and the position of the target backward reference block of the current picture block; or determining, from the positions of the M pairs of reference blocks, that positions of a pair of reference blocks with a matching error less than or equal to a matching error threshold are the position of the target forward reference block of the current picture block and the position of the target backward reference block of the current picture block, where M is less than or equal to N. In addition, a difference between a pixel value of a forward reference block and a pixel value of a backward reference block may be measured by using a sum of absolute differences (Sum of absolute differences, SAD), a sum of absolute transformation differences (Sum of absolute transformation differences, SATD), a sum of absolute square differences, or the like.

304: Obtain a predicted value of a pixel value of the current picture block based on a pixel value of the target forward reference block and a pixel value of the target backward reference block.

In an example, in step 304, weighted processing is performed on the pixel value of the target forward reference block and the pixel value of the target backward reference block, to obtain the predicted value of the pixel value of the current picture block.

Optionally, in an embodiment, the method shown in FIG. 3 further includes: obtaining updated motion information of the current picture block, where the updated motion information includes an updated forward motion vector and an updated backward motion vector, the updated forward motion vector points to the position of the target forward reference block, and the updated backward motion vector points to the position of the target backward reference block. The updated motion information of the current picture block may be obtained based on the position of the target forward reference block, the position of the target backward reference block, and the position of the current picture block; or may be obtained based on a first position offset and a second position offset that are corresponding to the positions of the determined pair of reference blocks.

A motion vector of a picture block is updated. In this way, another picture block can be effectively predicted based on the picture block during next picture prediction.

It can be learned that, in this embodiment of this application, the positions of the N forward reference blocks in the forward reference picture and the positions of the N backward reference blocks in the backward reference picture form positions of N pairs of reference block. The mirror relationship exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity.

Figure 10:
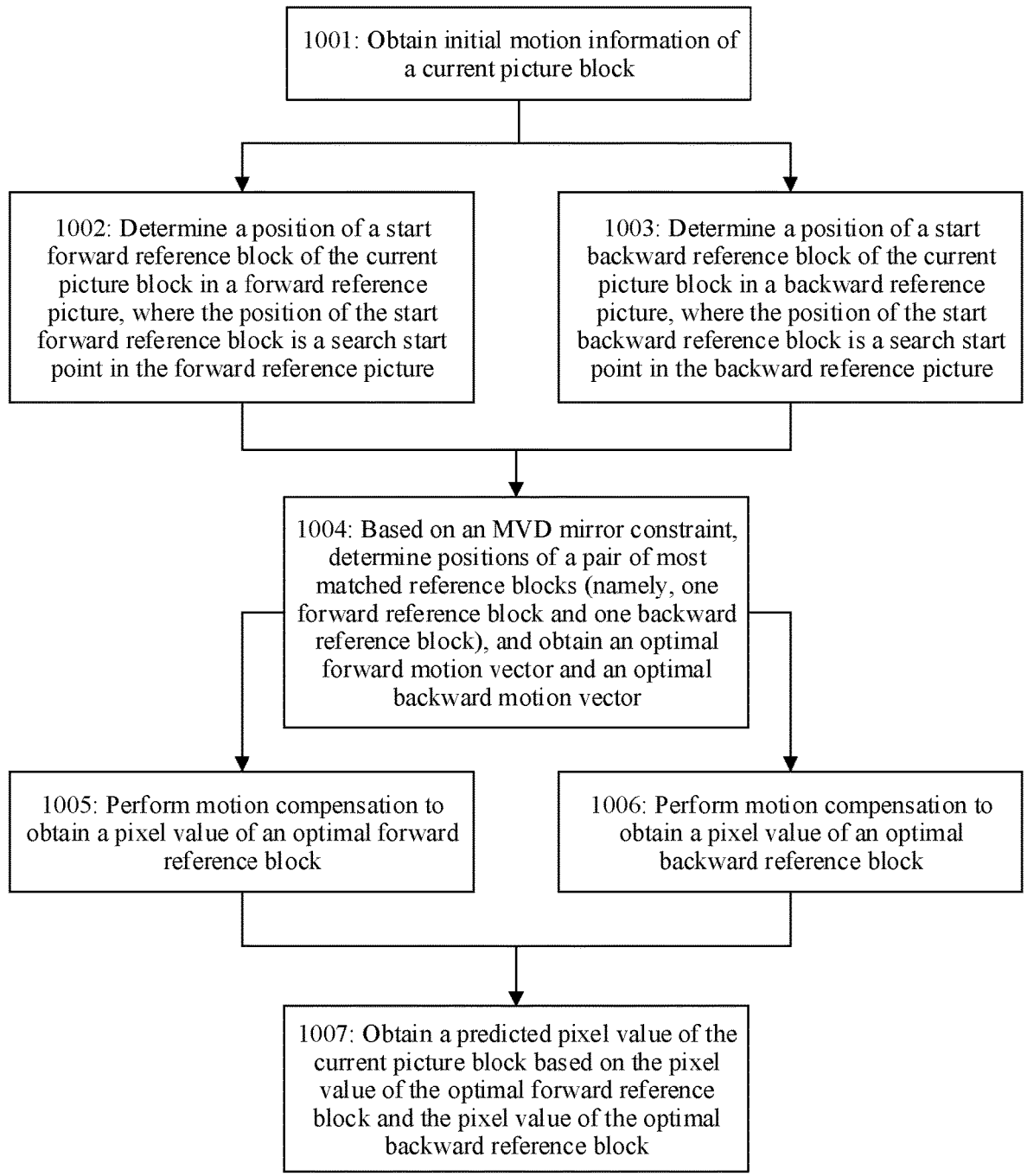
FIG. 10 is a schematic flowchart of another picture prediction method according to an embodiment of this application.

The following describes in detail a picture prediction method in the embodiments of this application with reference to FIG. 10.

FIG. 10 is a schematic flowchart of a picture prediction method according to an embodiment of this application. The method shown in FIG. 10 may be performed by a video coding apparatus, a video codec, a video coding system, or another device having a video coding function. The method shown in FIG. 10 may be used in a coding process or a decoding process. More specifically, the method shown in FIG. 10 may be used in an inter prediction process during encoding or decoding.

The method shown in FIG. 10 includes step 1001 to step 1007, and step 1001 to step 1007 are described in detail below.

1001: Obtain initial motion information of a current block.

For example, for a picture block whose inter prediction/coding mode is merge, a group of motion information is obtained from a merge candidate list based on a merge index, and the motion information is initial motion information of the current block. For example, for a picture block whose inter prediction/coding mode is AMVP, an MVP is obtained from an MVP candidate list based on an index of the AMVP mode, and an MV of the current block is obtained by obtaining a sum of the MVP and an MVD included in a bitstream. The initial motion information includes reference picture indication information and a motion vector. A forward reference picture and a backward reference picture are determined by using the reference picture indication information. A position of a forward reference block and a position of a backward reference block are determined by using the motion vector.

1002: Determine a position of a start forward reference block of the current picture block in the forward reference picture, where the position of the start forward reference block is a search start point (also referred to as a search base point) in the forward reference picture.

Specifically, the search base point (referred to as a first search base point below) in the forward reference picture is obtained based on a forward MV and position information of the current block. For example, forward MV information is (MV0x, MV0y). The position information of the current block is (B0x, B0y). The first search base point in the forward reference picture is (MV0x+B0x, MV0y+B0y).

1003: Determine a position of a start backward reference block of the current picture block in the backward reference picture, where the position of the start backward reference block is a search start point in the backward reference picture.

Specifically, the search base point (referred to as a second search base point below) in the backward reference picture is obtained based on a backward MV and the position information of the current block. For example, the backward MV is (MV1x, MV1y). The position information of the current block is (B0x, B0y). The second search base point in the backward reference picture is (MV1x+B0x, MV1y+B0y).

1004: Based on an MVD mirror constraint, determine positions of a pair of most matched reference blocks (namely, one forward reference block and one backward reference block), and obtain an optimal forward motion vector and an optimal backward motion vector.

The MVD mirror constraint herein may be explained as follows: An offset of a block position in the forward reference picture relative to a forward search base point is MVD0 (delta0x, delta1y). An offset of a block position in the backward reference picture relative to a backward search base point is MVD1 (delta1x, delta1y). The following relationship is met:

MVD0=−MVD1, to be specific:

delta0x=−delta1x; and delta0y=−delta1y.

Referring to FIG. 7, in the forward reference picture, motion search of an integer pixel step is performed by using a search base point (indicated by (0, 0)) as a start point. The integer pixel step means that an offset of a position of a candidate reference block relative to the search base point is an integer pixel distance. It should be noted that, regardless of whether the search base point is an integer sample (the start point may be an integer pixel or a sub-pixel, for example, ½, ¼, ⅛, or 1/16), the motion search of the integer pixel step may be performed first, to obtain the position of the forward reference block of the current picture block. It should be understood that when search is performed by using the integer pixel step, the search start point may be an integer pixel or may be a fractional pixel, for example, an integer pixel, a ½ pixel, a ¼ pixel, a ⅛ pixel, or a 1/16 pixel.

As shown in FIG. 7, the point (0, 0) is used as the search base point, and eight search points of an integer pixel step around the search base point are searched to obtain a position of a corresponding candidate reference block. FIG. 7 shows eight candidate reference blocks. If an offset of a position of a forward candidate reference block in the forward reference picture relative to a position of the forward search base point is (−1, −1), an offset of a position of a corresponding backward candidate reference block in the backward reference picture relative to a position of the backward search base point is (1, 1). Therefore, positions of paired forward and backward candidate reference blocks are obtained. For the obtained positions of the pair of reference blocks, a matching cost between two corresponding candidate reference blocks is calculated. A forward reference block and a backward reference block that have a minimum matching cost are selected as an optimal forward reference block and an optimal backward reference block, and the optimal forward motion vector and the optimal backward motion vector are obtained.

1005 and 1006: Perform a motion compensation process by using the optimal forward motion vector obtained in step 1004, to obtain a pixel value of the optimal forward reference block; and perform a motion compensation process by using the optimal backward motion vector obtained in step 1004, to obtain a pixel value of the optimal backward reference block.

1007: Perform weighted processing on the obtained pixel value of the optimal forward reference block and the obtained pixel value of the optimal backward reference block, to obtain a predicted value of a pixel value of the current picture block.

Specifically, the predicted value of the pixel value of the current picture block may be obtained based on a formula (2):

$$predSamples'[x][y]=(predSamplesL0'[x][y]+predSamplesL1'[x][y]+1)>>1 \quad (2)$$

In the foregoing formula, predSamplesL0' is the optimal forward reference block, predSamplesL1' is the optimal backward reference block, predSamples' is a prediction block of the current picture block, predSamplesL0[x][y] is a pixel value of the optimal forward reference block at a sample (x, y), predSamplesL1'[x][y] is a pixel value of the optimal backward reference block at the sample (x, y), and predSamples'[x][y] is a final pixel value of the prediction block at the sample (x, y).

It should be noted that, in this embodiment of this application, a search method to be used is not limited, and any search method may be used. For each forward candidate block obtained through search, a difference between the forward candidate block and a corresponding backward candidate block is calculated, and a forward candidate block and a backward candidate block that have a minimum SAD, a forward motion vector corresponding to the forward candidate block, and a backward motion vector corresponding to the backward candidate block are respectively selected as the optimal forward reference block, the optimal backward reference block, the optimal forward motion vector corresponding to the optimal forward reference block, and the optimal backward motion vector corresponding to the optimal backward reference block. Alternatively, for each backward candidate block obtained through search, a difference between the backward candidate block and a corresponding forward candidate block in step 4 is calculated, and a backward candidate block and a forward candidate block that have a minimum SAD, a backward motion vector corresponding to the backward candidate block, and a forward motion vector corresponding to the forward candidate block are respectively selected as the optimal backward reference block, the optimal forward reference block, the optimal backward motion vector corresponding to the optimal backward reference block, and the optimal forward motion vector corresponding to the optimal forward reference block.

It should be noted that only an example of the search method based on the integer pixel step is provided in step 1004. Actually, in addition to search by using the integer pixel step, search by using a fractional pixel step can also be used. For example, in step 1004, after the search by using the integer pixel step, the search by using the fractional pixel step is performed. Alternatively, the search by using the fractional pixel step is directly performed. A specific search method is not limited herein.

It should be noted that, in this embodiment of this application, a method for calculating the matching cost is not limited. For example, an SAD criterion, an MR-SAD criterion, or another criterion may be used. In addition, the matching cost may be calculated by using only a luminance component or by using both a luminance component and a chrominance component.

It should be noted that, in a search process, if the matching cost is 0 or reaches a preset threshold, a traversal operation or a search operation may be terminated in advance. An early termination condition of the search method is not limited herein.

It should be understood that a sequence of step 1005 and step 1006 is not limited, and they may be performed at the same time or may be performed in sequence.

It can be learned that, in an existing method, a template matching block needs to be calculated first, and forward search and backward search are separately performed by using the template matching block; but in this embodiment of this application, in a process of searching for a matching block, the matching cost is directly calculated by using the candidate block in the forward reference picture and the candidate block in the backward reference picture, to determine two blocks with the minimum matching cost. This simplifies a picture prediction process, improves picture prediction accuracy, and reduces complexity.

Figure 11:
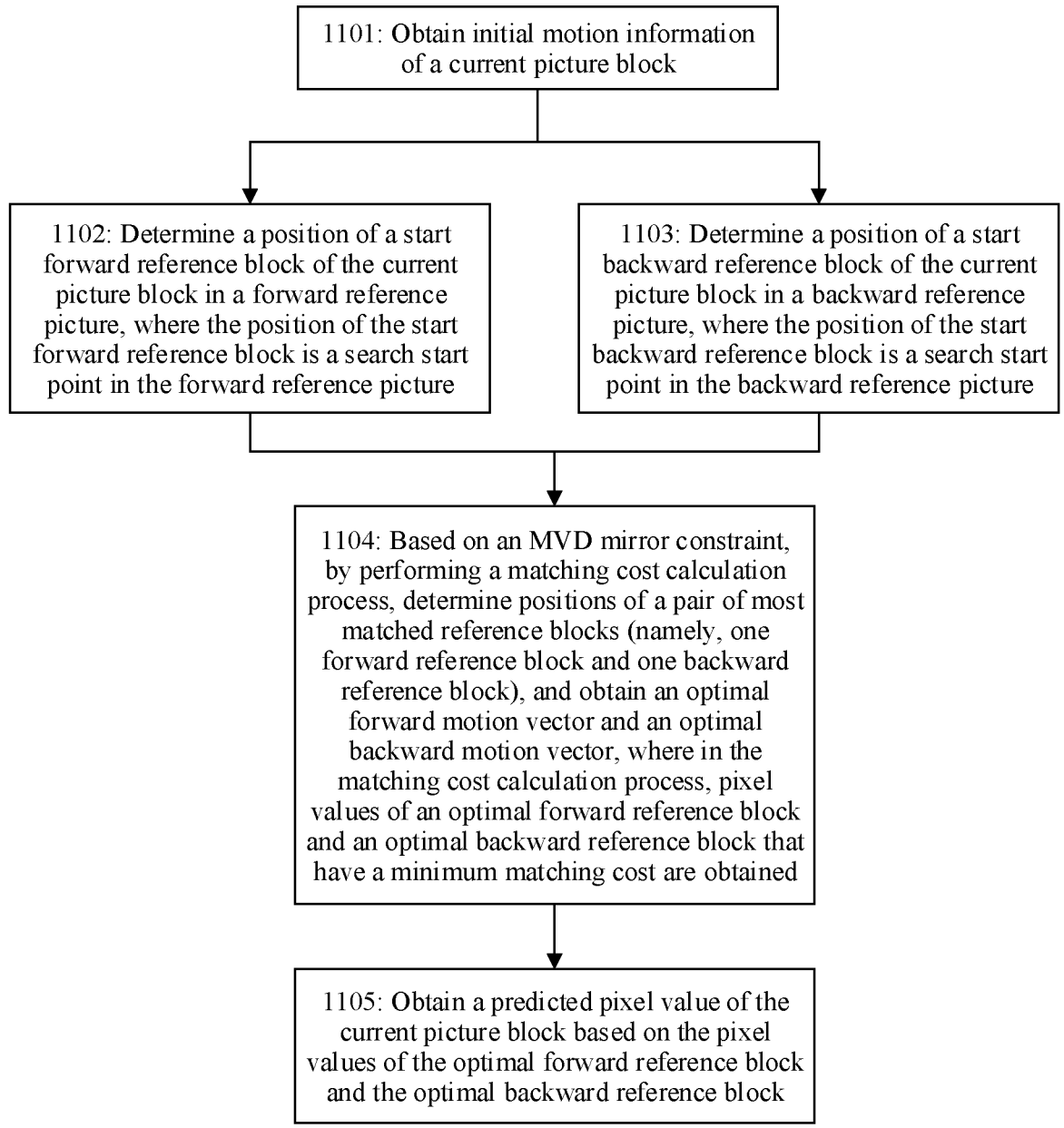
FIG. 11 is a schematic flowchart of another picture prediction method according to an embodiment of this application.

FIG. 11 is a schematic flowchart of a picture prediction method according to an embodiment of this application. The method shown in FIG. 11 may be performed by a video coding apparatus, a video codec, a video coding system, or another device having a video coding function. The method shown in FIG. 11 includes step 1101 to step 1105. For step 1101 to step 1103 and step 1105, refer to descriptions of step 1001 to step 1003 and step 1007 in FIG. 10. Details are not described herein again.

A difference between this embodiment of this application and the embodiment shown in FIG. 10 lies in that pixel values of current optimal forward and backward reference blocks are retained and updated in a search process. After the search is completed, the predicted value of the pixel value of the current picture block can be calculated by using the pixel values of the current optimal forward and backward reference blocks.

For example, positions of N pairs of reference blocks need to be traversed. Costi is an $i^{th}$ matching cost, and MinCost indicates a current minimum matching cost. Bfi is a pixel value of a forward reference block, and Bbi is a pixel value of a backward reference block, where the pixel values are obtained for an $i^{th}$ time. BestBf is a value of the current optimal forward reference block and BestBb is a value of the current optimal backward reference block. CalCost(M, N) represents a matching cost of a block M and a block N.

When search starts (i=1), MinCost=Cost0=CalCost(Bf0, Bb0), BestBf=Bf0, and BestBb=Bb0.

When other pairs of reference blocks are subsequently traversed, BestBf and BestBb are updated in real time. For example, when an $i^{th}$ (i>1) round of search is performed, if Costi<MinCost, BestBf=Bfi and BestBb=Bbi; otherwise, no update is performed.

When the search ends, BestBf and BestBb are used to obtain the predicted value of the pixel value of the current block.

Figure 12:
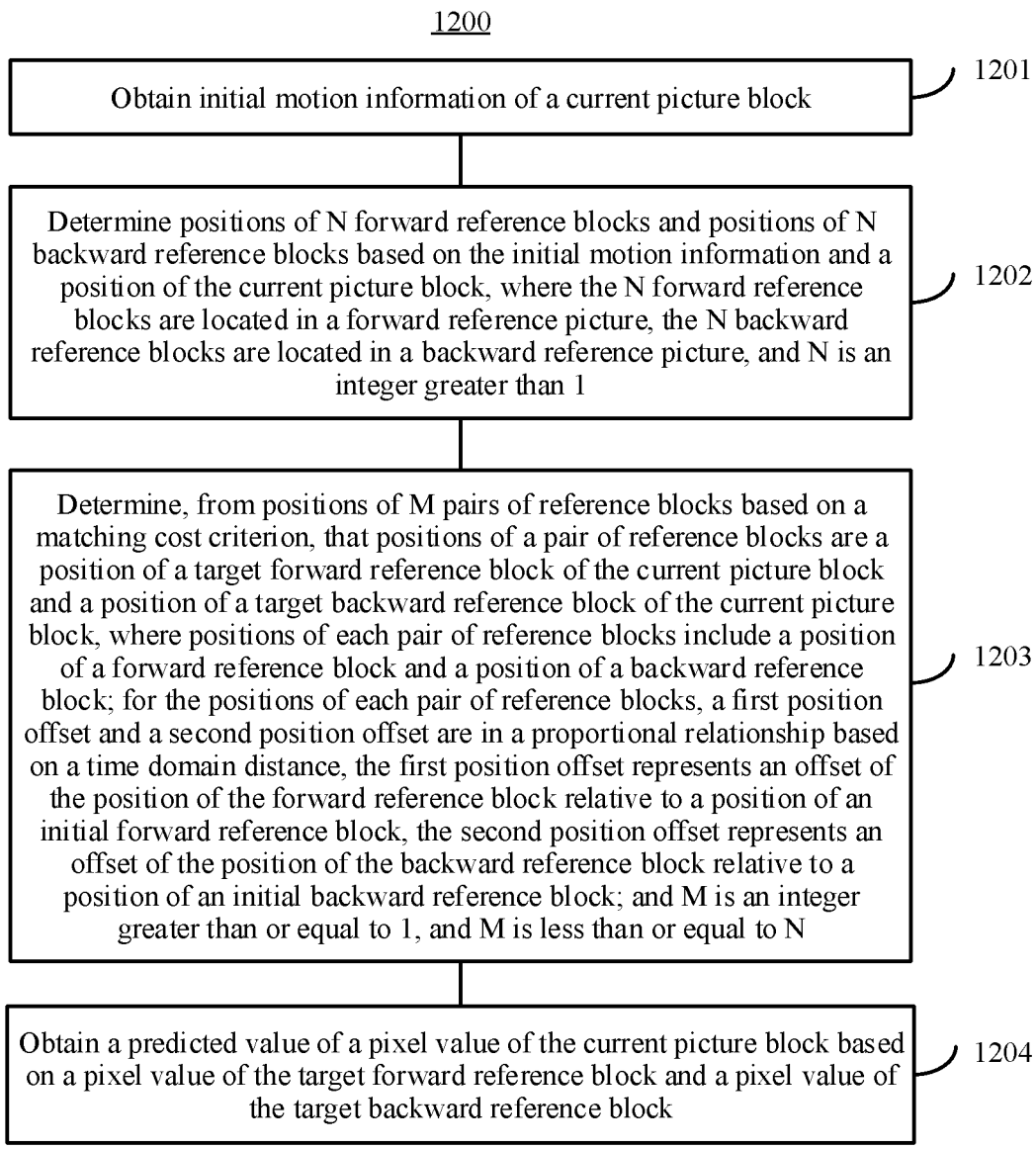
FIG. 12 is a schematic flowchart of another picture prediction method according to an embodiment of this application.

FIG. 12 is a schematic flowchart of a picture prediction method according to an embodiment of this application. The method shown in FIG. 12 may be performed by a video coding apparatus, a video codec, a video coding system, or another device having a video coding function. The method shown in FIG. 12 may be used in a coding process or a decoding process. More specifically, the method shown in FIG. 12 may be used in an inter prediction process during encoding or decoding. A process 1200 may be performed by a video encoder 20 or a video decoder 30, and specifically may be performed by a motion compensation unit of the video encoder 20 or the video decoder 30. It is assumed that for a video data stream with a plurality of video frames, the video encoder or the video decoder is being used to perform the process 1200 including the following steps, to obtain a predicted value of a pixel value of a current picture block of a current video frame.

The method shown in FIG. 12 includes step 1201 to step 1204. For step 1201, step 1202, and step 1204, refer to descriptions of step 301, step 302, and step 304 in FIG. 3. Details are not described herein again.

A difference between this embodiment of this application and the embodiment shown in FIG. 3 is: In step 1203, from positions of M pairs of reference blocks based on a matching cost criterion, positions of a pair of reference blocks are determined as a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N.

Figure 13:
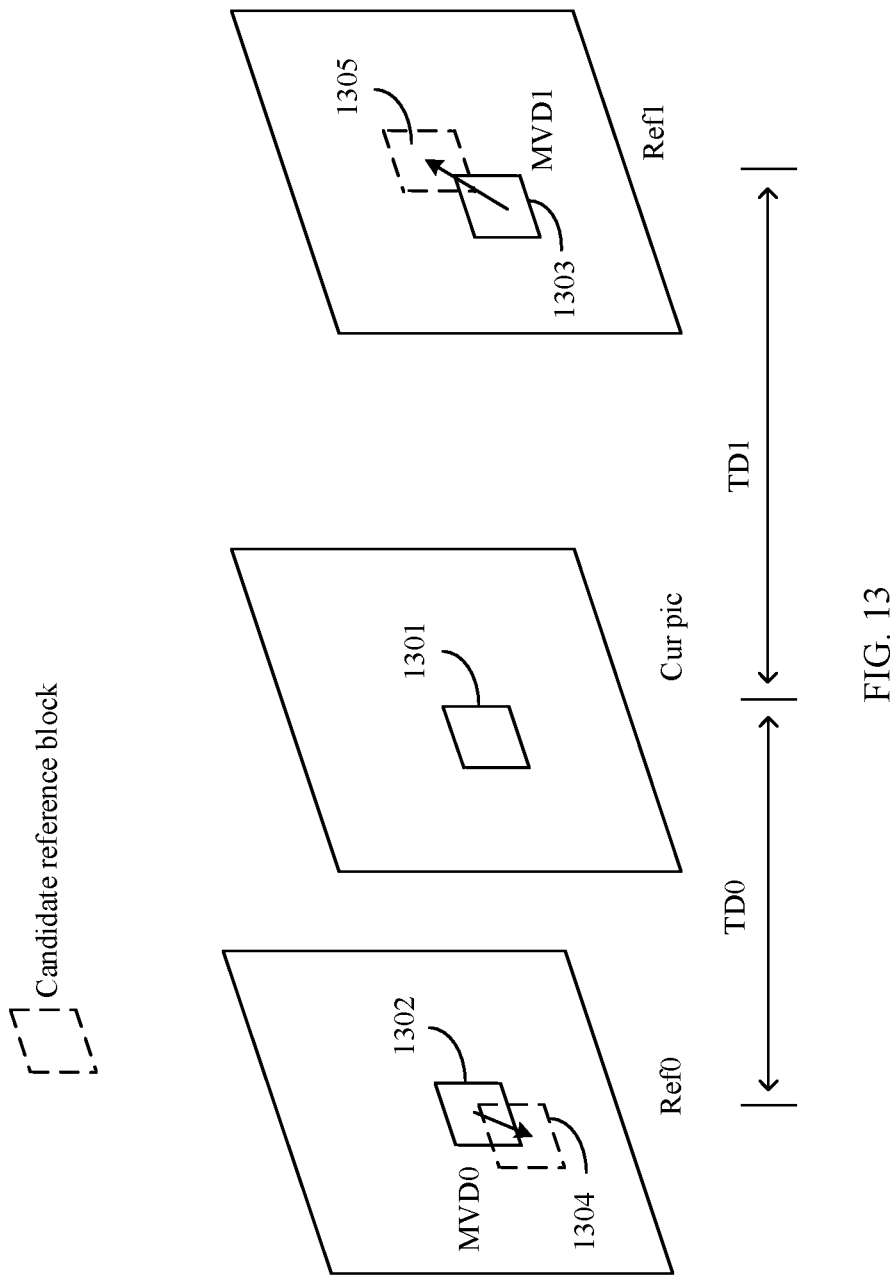
FIG. 13 is a schematic block diagram of a first position offset and a second position offset that are in a proportional relationship based on a time domain distance according to an embodiment of this application.

Referring to FIG. 13, an offset of a position of a candidate forward reference block 1304 in a forward reference picture Ref0 relative to a position of an initial forward reference block 1302 (namely, a forward search base point) is MVD0 (delta0x, delta0y). An offset of a position of a candidate backward reference block 1305 in a backward reference picture Ref1 relative to a position of an initial backward reference block 1303 (namely, a backward search base point) is MVD1 (delta1x, delta1y).

In a search process, position offsetoffsets of two matching blocks meet a mirror relationship, and a time domain interval needs to be considered in the mirror relationship. Herein, TC, T0, and T1 respectively represent a moment of a current frame, a moment of the forward reference picture, and a moment of the backward reference picture. TD0 and TD1 indicate time intervals between two moments.

$$TD0=TC-T0; \text{ and}$$

$$TD1=TC-T1.$$

In a specific coding process, TD0 and TD1 may be calculated by using a picture order count (picture order count, POC). For example:

$$TD0=POCc-POC0 \text{ and}$$

$$TD1=POCc-POC1.$$

Herein, POCc, POC0, and POC1 respectively represent a POC of a current picture, a POC of the forward reference picture, and a POC of the backward reference picture. TD0 represents a picture order count (picture order count, POC) distance between the current picture and the forward reference picture, and TD1 represents a POC distance between the current picture and the backward reference picture.

$$delta0=(delta0x, delta0y); \text{ and}$$

$$delta1=(delta1x, delta1y).$$

The mirror relationship considering the time domain interval is described as follows:

$$delta0x=(TD0/TD1)*delta1x; \text{ and}$$

$$delta0y=(TD0/TD1)*delta1y; \text{ or}$$

$$delta0x/delta1x=(TD0/TD1); \text{ and}$$

$$delta0y/delta1y=(TD0/TD1).$$

It can be learned that, in this embodiment of this application, the positions of the N forward reference blocks in the forward reference picture and the positions of the N backward reference blocks in the backward reference picture form positions of N pairs of reference blocks. The proportional relationship based on the time domain distance exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity.

In the foregoing embodiment, the search process is performed once. In addition, a plurality of rounds of search may be performed by using an iteration method. Specifically, after a forward reference block and a backward reference block are obtained in each round of search, one or more rounds of search may be performed based on a current refined MV.

A process of a picture prediction method in an embodiment of this application is described in detail below with reference to FIG. 14. Similar to the method shown in FIG. 3, the method shown in FIG. 14 may also be performed by a video coding apparatus, a video codec, a video coding system, or another device having a video coding function. The method shown in FIG. 14 may be used in a coding process or a decoding process. Specifically, the method shown in FIG. 14 may be used in an inter prediction process during encoding or decoding.

Figure 14:
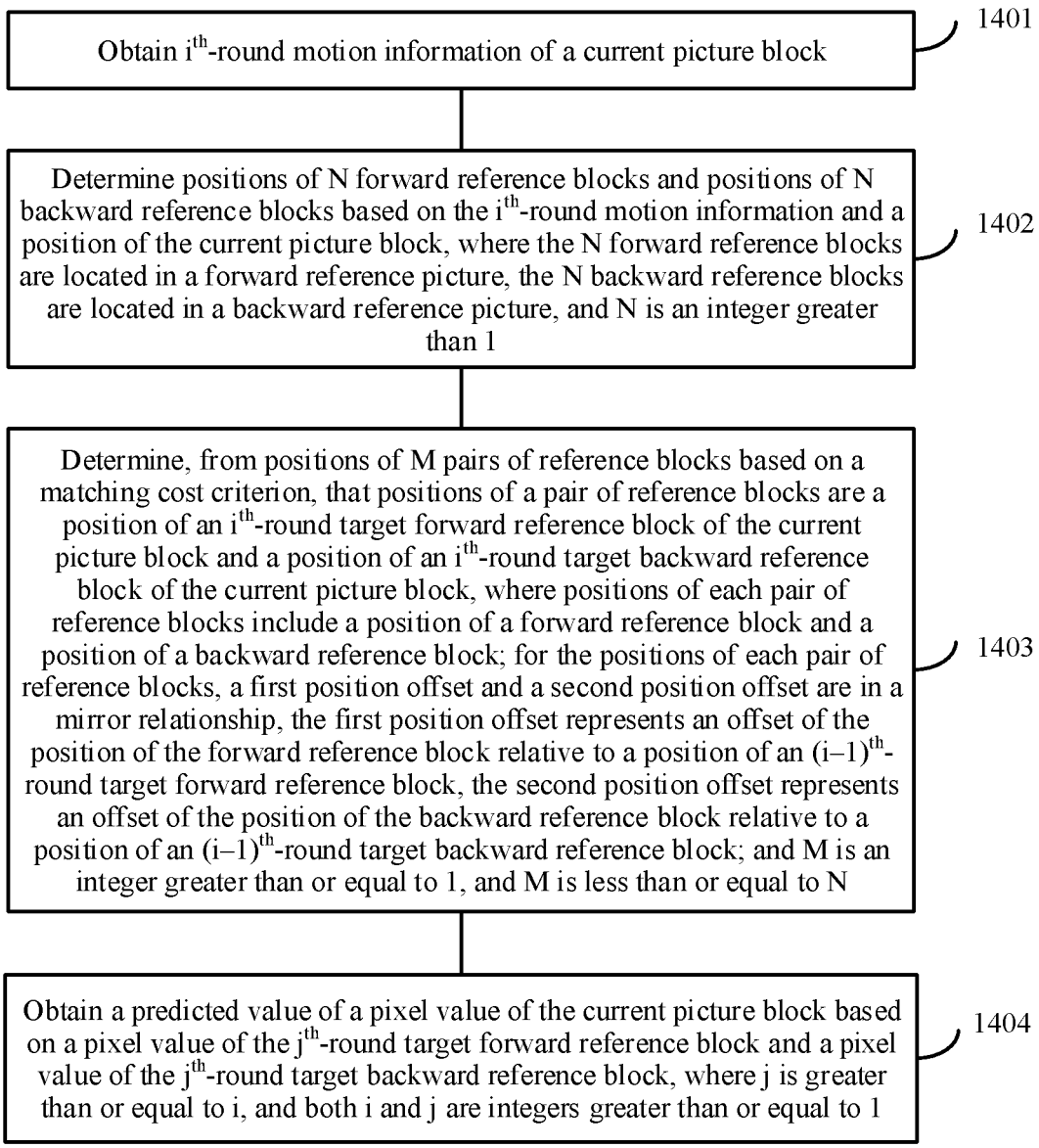
FIG. 14 is a schematic flowchart of another picture prediction method 1400 according to an embodiment of this application.

The method shown in FIG. 14 specifically includes the following step 1401 to step 1404.

1401: Obtain $i^{th}$-round motion information of a current picture block.

The picture block herein may be a picture block in a to-be-processed picture or a sub-picture in a to-be-processed picture. In addition, the picture block herein may be a to-be-coded picture block in the coding process or a to-be-decoded picture block in the decoding process.

If i=1, the $i^{th}$-round motion information is initial motion information of the current picture block.

If i>1, the $i^{th}$-round motion information includes a forward motion vector pointing to a position of an $(i-1)^{th}$-round target forward reference block and a backward motion vector pointing to a position of an $(i-1)^{th}$-round target backward reference block.

Moreover, the initial motion information may include indication information of a prediction direction (which usually is bidirectional prediction), a motion vector pointing to a reference picture block (which usually is a motion vector of a neighboring block), and information of a picture in which the reference picture block is located (which is usually understood as reference picture information). The motion vector includes a forward motion vector and a backward motion vector, and the reference picture information includes reference frame index information of a forward prediction reference picture block and a backward prediction reference picture block.

The initial motion information of the picture block may be obtained in a plurality of manners. For example, the initial motion information of the picture block may be obtained in the following manner 1 and manner 2.

Manner 1:

Referring to FIG. 4 and FIG. 5, in a merge mode of inter prediction, a candidate motion information list is constructed based on motion information of a neighboring block of the current picture block, and a piece of candidate motion information is selected from the candidate motion information list as the initial motion information of the current picture block. The candidate motion information list includes a motion vector, reference frame index information, and the like. For example, motion information of a neighboring block A0 (referring to candidate motion information whose index is 0 in FIG. 5) is selected as the initial motion information of the current picture block. Specifically, a forward motion vector of A0 is used as a forward prediction motion vector of the current block, and a backward motion vector of A0 is used as a backward prediction motion vector of the current block.

Manner 2:

In a non-merge mode of inter prediction, a motion vector predicted value list is constructed based on motion information of a neighboring block of the current picture block, and a motion vector is selected from the motion vector predicted value list as a motion vector predicted value of the current picture block. In this case, a motion vector of the current picture block may be a motion vector value of the neighboring block or a sum of differences between motion vectors of selected neighboring blocks and the motion vector of the current picture block. The motion vector difference is a difference between the motion vector obtained by performing motion estimation on the current picture block and the motion vector of the selected neighboring block. For example, motion vectors, corresponding to indexes 1 and 2, in the motion vector predicted value list are selected as a forward motion vector and a backward motion vector of the current picture block.

It should be understood that the foregoing manner 1 and manner 2 are merely two specific manners of obtaining the initial motion information of the picture block. In this application, a manner of obtaining motion information of a prediction block is not limited, and any manner in which the initial motion information of the picture block can be obtained shall fall within the protection scope of this application.

1402: Determine positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1.

In an example, the $i^{th}$-round motion information includes a forward motion vector, a forward reference picture index, a backward motion vector, and a backward reference picture index.

Correspondingly, step 1402 may include:

determining, based on the forward motion vector and the position of the current picture block, the position of the $(i-1)^{th}$-round target forward reference block of the current picture block in the forward reference picture corresponding to the forward reference picture index, using the position of the $(i-1)^{th}$-round target forward reference block as an $i_f^{th}$ search start point, and determining positions of (N−1) candidate forward reference blocks in the forward reference picture; and determining, based on the backward motion vector and the position of the current picture block, the position of the $(i-1)^{th}$-round target backward reference block of the current picture block in the backward reference picture corresponding to the backward reference picture index, using the position of the $(i-1)^{th}$-round target backward reference block as an $i_b^{th}$ search start point, and determining positions of (N−1) candidate backward reference blocks in the backward reference picture.

In an example, referring to FIG. 7, the positions of the N forward reference blocks include the position (indicated by (0,0)) of the $i^{th}$-round target forward reference block and the positions (indicated by (0,−1), (−1,−1), (−1,1), (1,−1), (1,1), and the like) of the (N−1) candidate forward reference blocks, and an offset of a position of each candidate forward reference block relative to the position of the $i^{th}$-round target forward reference block is an integer pixel distance (as shown in FIG. 8) or a fractional pixel distance, where N=9; or the positions of the N backward reference blocks include the position of the $i^{th}$-round target backward reference block and the positions of the (N−1) candidate backward reference blocks, and an offset of a position of each candidate backward reference block relative to the position of the $i^{th}$-round target backward reference block is an integer pixel distance or a fractional pixel distance, where N=9.

1403: Determine, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to the position of the $(i-1)^{th}$-round target forward reference block, and the second position offset represents an offset of the position of the backward reference block relative to the position of the (i−1)$^{th}$-round target backward reference block; and M is an integer greater than or equal to 1, and M is less than or equal to N.

That a first position offset and a second position offset are in a mirror relationship may be understood as: A direction of the first position offset is opposite to a direction of the second position offset, and an amplitude value of the first position offset is the same as an amplitude value of the second position offset.

Referring to FIG. 9, an offset of a position of a candidate forward reference block 904 in a forward reference picture Ref0 relative to a position of an (i−1)$^{th}$-round target forward reference block 902 (namely, a forward search base point) is MVD0 (delta0x, delta0y). An offset of a position of a candidate backward reference block 905 in a backward reference picture Ref1 relative to a position of an (i−1)$^{th}$-round target backward reference block 903 (namely, a backward search base point) is MVD1 (delta1x, delta1y).

$$MVD0 = -MVD1, \text{ to be specific:}$$

$$\text{delta0}x = -\text{delta1}x; \text{ and}$$

$$\text{delta0}y = -\text{delta1}y.$$

In a different example, step 1403 may include:

determining, from the positions of the M pairs of reference blocks (one forward reference block and one backward reference block), that positions of a pair of reference blocks with a minimum matching error are the position of the i$^{th}$-round target forward reference block of the current picture block and the position of the i$^{th}$-round target backward reference block of the current picture block; or determining, from the positions of the M pairs of reference blocks, that positions of a pair of reference blocks with a matching error less than or equal to a matching error threshold are the position of the i$^{th}$-round target forward reference block of the current picture block and the position of the i$^{th}$-round target backward reference block of the current picture block, where M is less than or equal to N. In addition, a difference between a pixel value of a forward reference block and a pixel value of a backward reference block may be measured by using a sum of absolute differences (Sum of absolute differences, SAD), a sum of absolute transformation differences (Sum of absolute transformation differences, SATD), a sum of absolute square differences, or the like.

1404: Obtain a predicted value of a pixel value of the current picture block based on a pixel value of the target forward reference block and a pixel value of the target backward reference block.

In an example, in step 1404, weighted processing is performed on the pixel value of the target forward reference block and the pixel value of the target backward reference block, to obtain the predicted value of the pixel value of the current picture block. In addition, in this application, the predicted value of the pixel value of the current picture block may alternatively be obtained by using another method. This is not limited in this application.

A motion vector of a picture block is updated. For example, initial motion information is updated to second-round motion information, and the second-round motion information includes a forward motion vector pointing to a position of a first-round target forward reference block and a backward motion vector pointing to a first-round target backward reference block. In this way, another picture block can be effectively predicted based on the picture block during next picture prediction.

It can be learned that, in this embodiment of this application, the positions of the N forward reference blocks in the forward reference picture and the positions of the N backward reference blocks in the backward reference picture form positions of N pairs of reference block. The mirror relationship exists between a first position offset of the forward reference block relative to an initial forward reference block, and a second position offset of the backward reference block relative to an initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity. In addition, accuracy of refining an MV can be further improved by increasing a quantity of iterations, to further improve coding performance.

A process of a picture prediction method in an embodiment of this application is described in detail below with reference to FIG. 15. The method shown in FIG. 15 may also be performed by a video coding apparatus, a video codec, a video coding system, or another device having a video coding function. The method shown in FIG. 15 may be used in a coding process or a decoding process. Specifically, the method shown in FIG. 15 may be used in an inter prediction process during encoding or decoding.

The method shown in FIG. 15 specifically includes step 1501 to step 1508, and step 1501 to step 1508 are described in detail below.

1501: Obtain initial motion information of a current picture block.

For example, for a first round of search, the initial motion information of the current block is used. For example, for a picture block whose coding mode is merge, motion information is obtained from a merge candidate list based on an index of the merge mode, and the motion information is initial motion information of the current block. For example, for a picture block whose coding mode is AMVP, an MVP is obtained from an MVP candidate list based on an index of the AMVP mode, and an MV of the current block is obtained by obtaining a sum of the MVP and an MVD included in a bitstream. For a non-first round of search, MV information updated in a previous round of search is used. Motion information includes reference picture indication information and motion vector information. A forward reference picture and a backward reference picture are determined by using the reference picture indication information. A position of a forward reference block and a position of a backward reference block are determined by using the motion vector information.

1502: Determine a search base point in the forward reference picture.

The search base point in the forward reference picture is determined based on forward MV information and position information of the current block. A specific process is similar to the process in the embodiment in FIG. 10 or FIG. 11. For example, if the forward MV information is (MV0x, MV0y) and the position information of the current block is (B0x, B0y), the search base point in the forward reference picture is (MV0x+B0x, MV0y+B0y).

1503: Determine a search base point in the backward reference picture.

The search base point in the backward reference picture is determined based on backward MV information and the position information of the current block. A specific process is similar to the process in the embodiment in FIG. 10 or FIG. 11. For example, if the backward MV information is (MV1x, MV1y) and the position information of the current block is (B0x, B0y), the search base point in the backward reference picture is (MV1x+B0x, MV1y+B0y).

1504: In the forward reference picture and the backward reference picture, based on an MVD mirror constraint, determine positions of a pair of most matched reference blocks (namely, one forward reference block and one backward reference block), and obtain a refined forward motion vector and a refined backward motion vector of the current picture block.

A specific search process is similar to the process in the embodiment in FIG. 10 or FIG. 11. Details are not described herein again.

1505: Determine whether an iteration termination condition is met, and if the iteration termination condition is not met, perform steps 1502 and 1503. If the iteration termination condition is met, steps 1506 and 1507 are performed.

A design of a termination condition of iterative search is not limited herein. For example, traversal may be performed based on a specified quantity L of iterations, or another iteration termination condition is met. For example, after a result of a current iteration operation is obtained, if MVD0 is close to or equal to 0 and MVD1 is close to or equal to 0, for example, MVD0=(0, 0) and MVD1=(0, 0), the iteration operation may be terminated.

L is a preset value and is an integer greater than 1. L may be a numeral value that has been preset before a picture is predicted; a numeral value of L may be set based on precision of picture prediction and complexity in searching for a prediction block; L may be set based on a historical empirical value; or L may be determined based on verification on a result of an intermediate search process.

For example, in this embodiment, two rounds of search are performed in total by using an integer pixel step. During a first round of search, a position of an initial forward reference block may be used as a search base point, and positions of (N−1) candidate forward reference blocks are determined in the forward reference picture (also referred to as a forward reference region). A position of an initial backward reference block is used as a search base point, and positions of (N−1) candidate backward reference blocks are determined in the backward reference picture (also referred to as a backward reference region). For one or more pairs of reference block positions in positions of N pairs of reference blocks, a matching cost of two corresponding reference blocks is calculated, for example, a matching cost of the initial forward reference block and the initial backward reference block is calculated, and a matching cost of a candidate forward reference block and a candidate backward reference block that meet the MVD mirror constraint is calculated. In this way, a position of a first-round target forward reference block and a position of a first-round target backward reference block in the first round of search are obtained, and updated motion information is further obtained. The updated motion information includes a forward motion vector indicating that a position of the current picture block points to the position of the first-round target forward reference block, and a backward motion vector indicating that the position of the current picture block points to the position of the first-round target backward reference block. It should be understood that the updated motion information and the initial motion information include a same reference frame index and the like. Next, a second round of search is performed. The position of the first-round target forward reference block is used as a search base point, and positions of (N−1) candidate forward reference blocks are determined in the forward reference picture (also referred to as the forward reference region). The position of the first-round target backward reference block is used as a search base point, and positions of (N−1) candidate backward reference blocks are determined in the backward reference picture (also referred to as the backward reference region). For one or more pairs of reference block positions in positions of N pairs of reference blocks, a matching cost of two corresponding reference blocks is calculated, for example, a matching cost of the first-round target forward reference block and the first-round target backward reference block is calculated, and a matching cost of a candidate forward reference block and a candidate backward reference block that meet the MVD mirror constraint is calculated. In this way, a position of a second-round target forward reference block and a position of a second-round target backward reference block in the second round of search are obtained, and updated motion information is further obtained. The updated motion information includes a forward motion vector indicating that the position of the current picture block points to the position of the second-round target forward reference block, and a backward motion vector indicating that the position of the current picture block points to the position of the second-round target backward reference block. It should be understood that the updated motion information and the initial motion information include other same information such as the reference frame index. When the preset quantity L of iterations is 2, in the second search process herein, the second-round target forward reference block and the second-round target backward reference block are a finally obtained target forward reference block and target backward reference block (also referred to as an optimal forward reference block and an optimal backward reference block).

1506 and 1507: Perform a motion compensation process by using the optimal forward motion vector obtained in step 1504, to obtain a pixel value of the optimal forward reference block; and perform a motion compensation process by using the optimal backward motion vector obtained in step 1504, to obtain a pixel value of the optimal backward reference block.

1508: Obtain a predicted value of a pixel value of the current picture block based on the pixel value of the optimal forward reference block and the pixel value of the optimal backward reference block that are obtained in steps 1506 and 1507.

In step 1504, search (alternatively referred to as motion search) may be performed in the forward reference picture or the backward reference picture by using the integer pixel step, to obtain a position of at least one forward reference block and a position of at least one backward reference block. When the search is performed by using the integer pixel step, a search start point may be an integer pixel or may be a fractional pixel, for example, an integer pixel, a ½ pixel, a ¼ pixel, a ⅛ pixel, or a ¹⁄₁₆ pixel.

In addition, in step 1504, a fractional pixel step may also be directly used to search for the position of the at least one forward reference block and the position of the at least one backward reference block, or both the search by using the integer pixel step and the search by using the fractional pixel step are performed. A search method is not limited in this application.

In step 1504, for postions of each pair of reference blocks, when a difference between a pixel value of a forward reference block and a pixel value of a corresponding backward reference block is calculated, a difference between a pixel value of each forward reference block and a pixel value of a corresponding backward reference block may be measured by using an SAD, an SATD, a sum of absolute square differences, or the like. However, this application is not limited thereto.

When the predicted value of the pixel value of the current picture block is determined based on the optimal forward predicted block and the optimal backward predicted block, weighted processing may be performed on the pixel value of the optimal forward reference block and the pixel value of the optimal backward reference block that are obtained in step 1506 and step 1507, and a pixel value obtained after the weighted processing is used as the predicted value of the pixel value of the current picture block.

Specifically, the predicted value of the pixel value of the current picture block may be obtained based on a formula (8):

$$\text{predSamples'}[x][y]=(\text{predSamples}L0'[x][y]+\text{predSamples}L1'[x][y]+1)>>1 \quad (8)$$

In the foregoing formula, predSamplesL0'[x][y] is a pixel value of the optimal forward reference block at a sample (x, y), predSamplesL1'[x][y] is a pixel value of the optimal backward reference block at the sample (x, y), and predSamples'[x] [y] is a pixel predicted value of the current picture block at the sample (x, y).

Referring to FIG. 11, pixel values of a current optimal forward reference block and a current optimal backward reference block may further be retained and updated in an iterative search process in this embodiment of this application. After the search is completed, the predicted value of the pixel value of the current picture block is calculated directly by using the pixel values of the current optimal forward and backward reference blocks. In this implementation, steps 1506 and 1507 are optional steps.

For example, the positions of the N pairs of reference blocks need to be traversed. Costi is an $i^{th}$ matching cost, and MinCost indicates a current minimum matching cost. Bfi is a pixel value of a forward reference block, and Bbi is a pixel value of a backward reference block, where the pixel values are obtained for an $i^{th}$ time. BestBf is the pixel value of the current optimal forward reference block and BestBb is the pixel value of the current optimal backward reference block. CalCost(M, N) represents a matching cost of a block M and a block N.

When search starts (i=1), MinCost=Cost0=CalCost(Bf0, Bb0), BestBf=Bf0, and BestBb=Bb0.

When other pairs of reference blocks are subsequently traversed, update is performed in real time. For example, when an $i^{th}$ (i>1) round of search is performed, if Costi<MinCost, BestBf=Bfi and BestBb=Bbi; otherwise, no update is performed.

When the search ends, BestBf and BestBb are used to obtain the predicted value of the pixel value of the current block.

In the foregoing embodiment shown in FIG. 12, the search process is performed once. In addition, a plurality of rounds of search may be performed by using an iteration method. Specifically, after a forward reference block and a backward reference block are obtained in each round of search, one or more rounds of search may be performed based on a current refined MV.

A process of a picture prediction method 1600 in an embodiment of this application is described in detail below with reference to FIG. 16. The method shown in FIG. 16 may also be performed by a video coding apparatus, a video codec, a video coding system, or another device having a video coding function. The method shown in FIG. 16 may be used in a coding process or a decoding process. Specifically, the method shown in FIG. 16 may be used in an inter prediction process during encoding or decoding.

Figure 16:
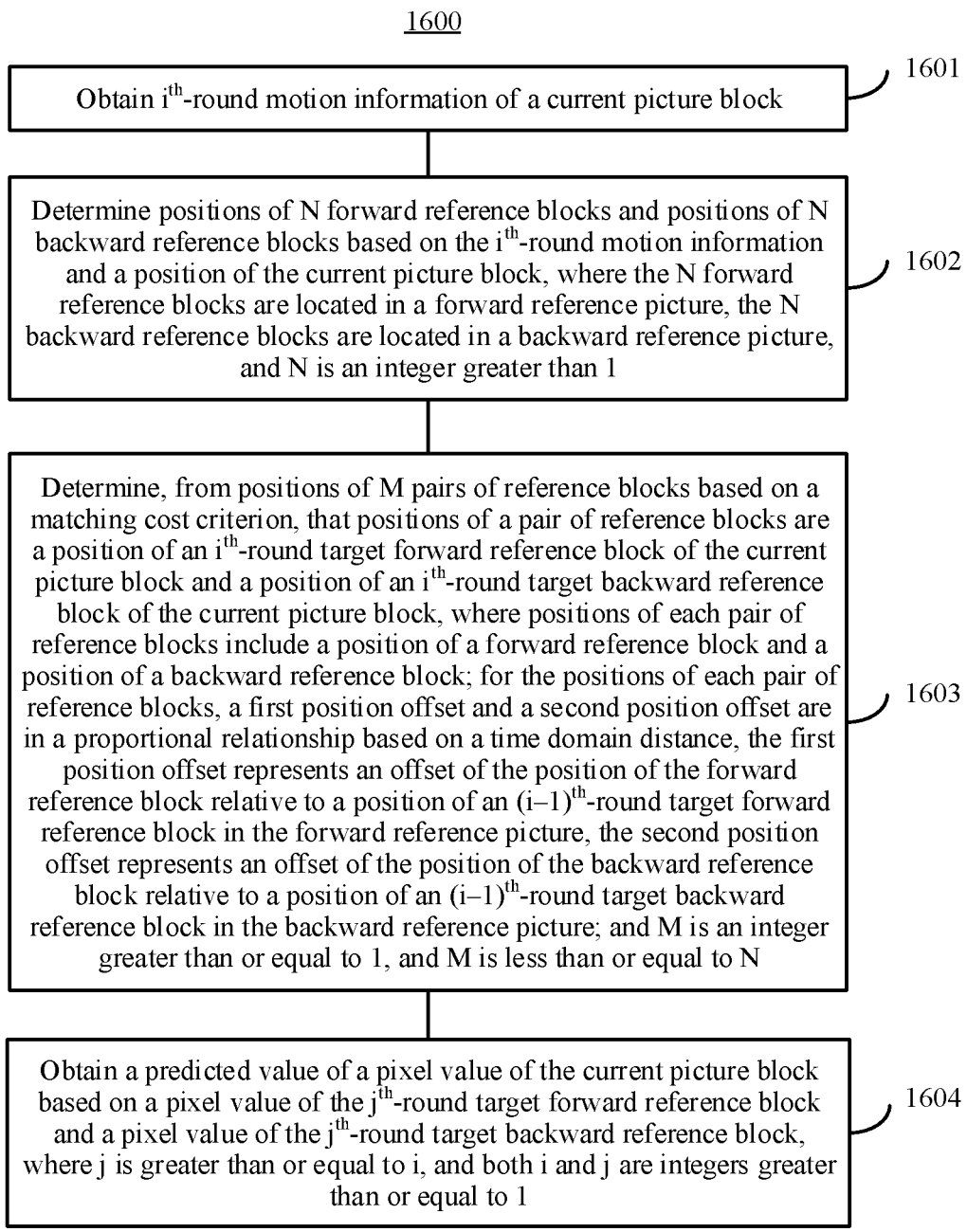
FIG. 16 is a schematic flowchart of another picture prediction method 1600 according to an embodiment of this application.

The method 1600 shown in FIG. 16 includes step 1601 to step 1604. For step 1601, step 1602, and step 1604, refer to descriptions of step 1401, step 1402, and step 1404 in FIG. 14. Details are not described herein again.

A difference between this embodiment of this application and the embodiment shown in FIG. 14 is: In step 1603, from positions of M pairs of reference blocks based on a matching cost criterion, positions of a pair of reference blocks are determined as a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N.

Referring to FIG. 13, an offset of a position of a candidate forward reference block 1304 in a forward reference picture Ref0 relative to a position of an initial forward reference block 1302 (namely, a forward search base point) is MVD0 (delta0x, delta0y). An offset of a position of a candidate backward reference block 1305 in a backward reference picture Ref1 relative to a position of an initial backward reference block 1303 (namely, a backward search base point) is MVD1 (delta1x, delta1y).

In a search process, position offsetoffsets of two matching blocks meet a mirror relationship, and a time domain interval needs to be considered in the mirror relationship. Herein, TC, T0, and T1 respectively represent a moment of a current frame, a moment of the forward reference picture, and a moment of the backward reference picture. TD0 and TD1 indicate time intervals between two moments.

$TD0=TC-T0$; and $TD1=TC-T1$.

In a specific coding process, TD0 and TD1 may be calculated by using a picture order count (picture order count, POC). For example:

$TD0=POCc-POC0$; and $TD1=POCc-POC1$.

Herein, POCc, POC0, and POC1 respectively represent a POC of a current picture, a POC of the forward reference picture, and a POC of the backward reference picture. TD0 represents a picture order count (picture order count, POC) distance between the current picture and the forward reference picture, and TD1 represents a POC distance between the current picture and the backward reference picture.

delta0=(delta0$x$,delta0$y$); and delta1=(delta1$x$,delta1$y$).

The mirror relationship considering the time domain interval is described as follows:

delta0$x$=(*TD*0/*TD*1)*delta1$x$; and delta0$y$=(*TD*0/*TD*1)*delta1$y$; or delta0$x$/delta1$x$=(*TD*0/*TD*1); and delta0$y$/delta1$y$=(*TD*0/*TD*1).

In a different example, step 1603 may include:

determining, from the positions of the M pairs of reference blocks (one forward reference block and one backward reference block), that positions of a pair of reference blocks with a minimum matching error are the position of the $i^{th}$-round target forward reference block of the current picture block and the position of the $i^{th}$-round target backward reference block of the current picture block; or determining, from the positions of the M pairs of reference blocks, that positions of a pair of reference blocks with a matching error less than or equal to a matching error threshold are the position of the $i^{th}$-round target forward reference block of the current picture block and the position of the $i^{th}$-round target backward reference block of the current picture block, where M is less than or equal to N. In addition, a difference between a pixel value of a forward reference block and a pixel value of a backward reference block may be measured by using a sum of absolute differences (Sum of absolute differences, SAD), a sum of absolute transformation differences (Sum of absolute transformation differences, SATD), a sum of absolute square differences, or the like.

It can be learned that, in this embodiment of this application, the positions of the N forward reference blocks in the forward reference picture and the positions of the N backward reference blocks in the backward reference picture form positions of N pairs of reference blocks. For positions of each pair of reference blocks in the positions of the N pairs of reference blocks, the proportional relationship based on the time domain distance exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity. In addition, accuracy of refining an MV can be further improved by increasing a quantity of iterations, to further improve coding performance.

A process of a picture prediction method in an embodiment of this application is described in detail below with reference to FIG. 17. The method shown in FIG. 17 may also be performed by a video coding apparatus, a video codec, a video coding system, or another device having a video coding function. The method shown in FIG. 17 may be used in a coding process or a decoding process. Specifically, the method shown in FIG. 17 may be used in an inter prediction process during encoding or decoding.

Figure 17:
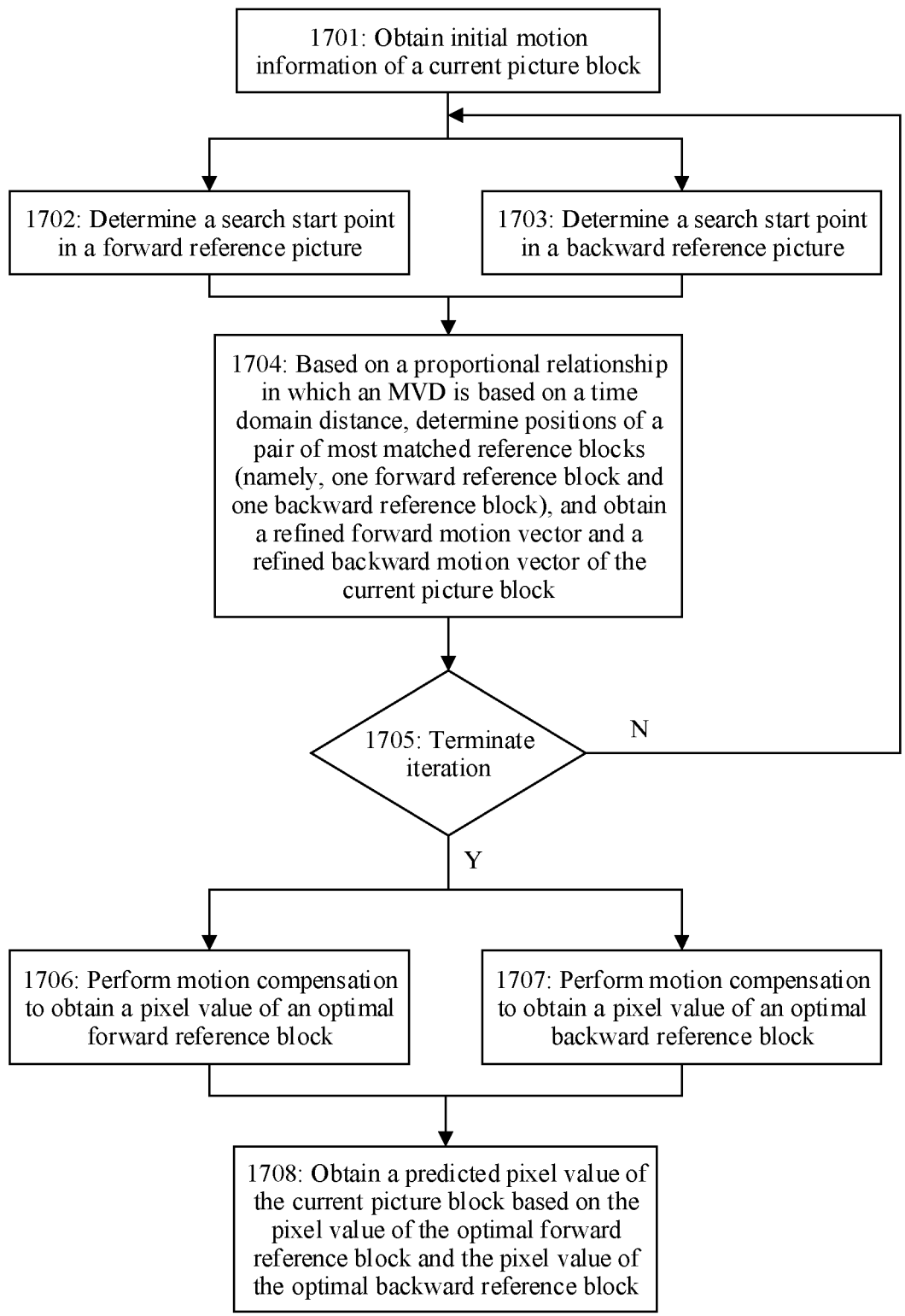
FIG. 17 is a schematic flowchart of another picture prediction method according to an embodiment of this application.

The method shown in FIG. 17 includes step 1701 to step 1708. For step 1701 to step 1703 and step 1705 to step 1708, refer to descriptions of step 1501 to step 1503 and step 1505 to step 1508 in FIG. 15. Details are not described herein again.

Figure 15:
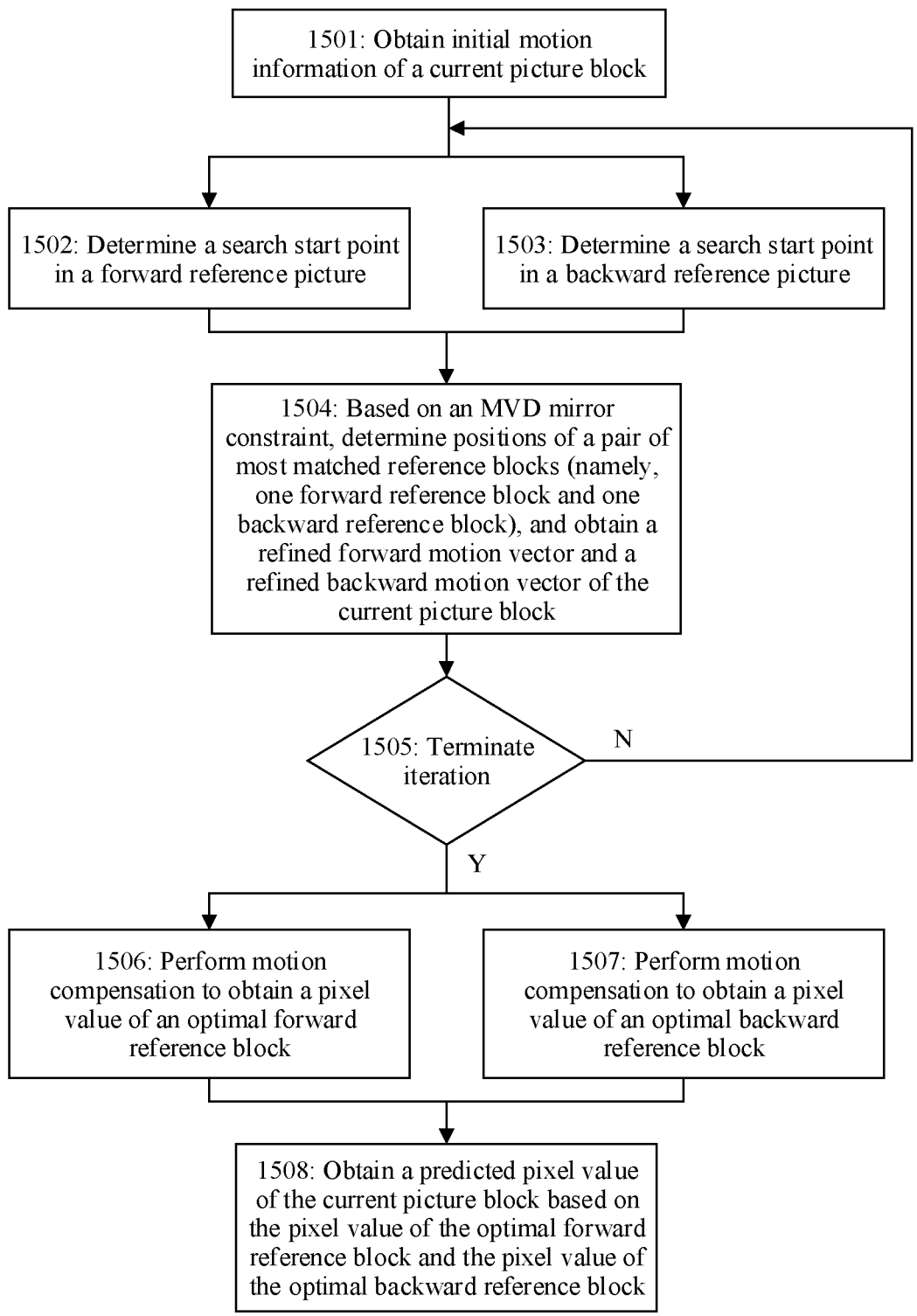
FIG. 15 is a schematic flowchart of another picture prediction method according to an embodiment of this application.

A difference between this embodiment of this application and the embodiment shown in FIG. 15 lies in:

1704: Based on an MVD mirror constraint which considers a time domain distance, determine positions of a pair of most matched reference blocks (namely, one forward reference block and one backward reference block), and obtain a refined forward motion vector and a refined backward motion vector of the current picture block.

The mirror constraint in which the MVD is based on the time domain distance herein may be explained as follows: A position offset MVD0 (delta0x, delta1y) of a block position in the forward reference picture relative to a forward search base point and a position offset MVD1 (delta1x, delta1y) of a block position in the backward reference picture relative to a backward search base point meet the following relationship:

Position offsetoffsets of two matching blocks meet a mirror relationship based on the time domain distance. Herein, TC, T0, and T1 respectively represent a moment of a current frame, a moment of the forward reference picture, and a moment of the backward reference picture. TD0 and TD1 indicate time intervals between two moments.

*TD*0=*TC*-*T*0; and

*TD*1=*TC*-*T*1.

In a specific coding process, TD0 and TD1 may be calculated by using a picture order count (picture order count, POC). For example:

*TD*0=*POCc*-*POC*0; and

*TD*1=*POCc*-*POC*1.

Herein, POCc, POC0, and POC1 respectively represent a POC of the current picture, a POC of the forward reference picture, and a POC of the backward reference picture. TD0 represents a picture order count (picture order count, POC) distance between the current picture and the forward reference picture, and TD1 represents a POC distance between the current picture and the backward reference picture.

delta0=(delta0$x$,delta0$y$); and delta1=(delta1$x$,delta1$y$).

The mirror relationship considering the time domain distance (also referred to as a time domain interval) is described as follows:

delta0x=(TD0/TD1)*delta1x; and delta0y=(TD0/TD1)*delta1y; or delta0x/delta1x=(TD0/TD1); and delta0y/delta1y=(TD0/TD1).

A specific search process is similar to the process in the embodiment in FIG. 10 or FIG. 11. Details are not described herein again.

It should be understood that, in this embodiment of this application, the time domain interval is or not considered in the mirror relationship. In actual use, whether the time domain interval is considered in the mirror relationship when motion vector refinement is performed on a current frame or a current block may be adaptively selected.

For example, indication information may be added to sequence-level header information (SPS), picture-level header information (PPS), a slice header (slice header), or block bitstream information to indicate whether a time interval is considered in a mirror relationship used for a current sequence, a current picture, a current slice (Slice), or a current block.

Alternatively, based on the POC of the forward reference picture and the POC of the backward reference picture, a current block adaptively determines whether the time interval is considered in a mirror relationship used for the current block.

For example, if |POCc−POC0|−|POCc−POC1|>T, an interval needs to be considered for the mirror relationship that is used; otherwise, no time interval is considered for the mirror relationship that is used. T herein is a preset threshold. For example, T=2, or T=3. A specific value of T is not limited herein.

For another example, it is assumed that a ratio of a larger value of |POCc−POC0| and |POCc−POC1| to a smaller value of |POCc−POC1| and |POCc−POC1| is greater than a threshold R, in other words, (Max(|POCc−POC0|,|POCc−POC1|)/Min(|POCc−POC0|,|POCc−POC1|))>R.

Max(A,B) indicates a larger value of A and B, and Min(A,B) indicates a smaller value of A and B.

In this case, an interval needs to be considered for the mirror relationship that is used. If the ratio of the larger value of |POCc−POC0| and |POCc−POC1| to the smaller value of |POCc−POC0| and |POCc−POC1| is not greater than the threshold R, no time interval is considered for the mirror relationship that is used. R herein is a preset threshold. For example, R=2, or R=3. A specific value of R is not limited herein.

It should be understood that the picture prediction method in this embodiment of this application may be specifically performed by a motion compensation module in an encoder (for example, an encoder 20) or a decoder (for example, a decoder 30). In addition, the picture prediction method in this embodiment of this application may be performed in any electronic device or apparatus that needs to code and/or decode a video picture.

The following describes in detail a picture prediction apparatus in the embodiments of this application with reference to FIG. 18 to FIG. 21.

Figure 18:
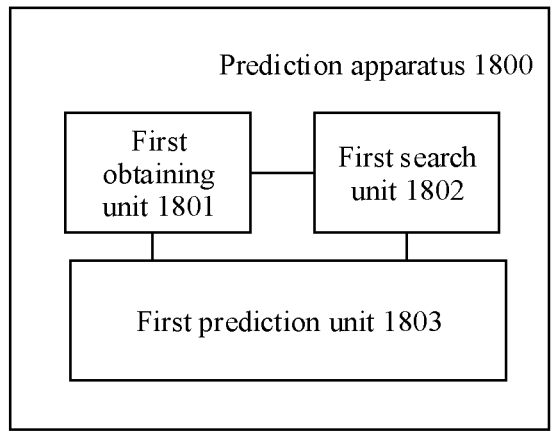
FIG. 18 is a schematic block diagram of a picture prediction apparatus according to an embodiment of this application.

FIG. 18 is a schematic block diagram of a picture prediction apparatus 1800 according to an embodiment of this application. It should be noted that the prediction apparatus 1800 is applicable to both inter prediction for decoding a video picture and inter prediction for coding a video picture.

It should be understood that the prediction apparatus 1800 herein may correspond to the motion compensation unit 44 in FIG. 2A, or may correspond to the motion compensation unit 82 in FIG. 2B. The prediction apparatus 1800 may include:

a first obtaining unit 1801, configured to obtain initial motion information of a current picture block;

a first search unit 1802, configured to: determine positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1; and determine, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N; and a first prediction unit 1803, configured to obtain a predicted value of a pixel value of the current picture block based on a pixel value of the target forward reference block and a pixel value of the target backward reference block.

That a first position offset and a second position offset are in a mirror relationship may be understood as that a first position offset value is the same as a second position cf. For example, a direction of the first position offset is opposite to a direction of the second position offset, and an amplitude value of the first position offset is the same as an amplitude value of the second position offset.

Preferably, in the apparatus 1800 in this embodiment of this application, the first prediction unit 1803 is further configured to obtain updated motion information of the current picture block, where the updated motion information includes an updated forward motion vector and an updated backward motion vector, the updated forward motion vector points to the position of the target forward reference block, and the updated backward motion vector points to the position of the target backward reference block.

It can be learned that a motion vector of a picture block is updated. In this way, another picture block can be effectively predicted based on the picture block during next picture prediction.

In the apparatus 1800 in this embodiment of this application, the positions of the N forward reference blocks include a position of one initial forward reference block and positions of (N−1) candidate forward reference blocks, and an offset of a position of each candidate forward reference block relative to the position of the initial forward reference block is an integer pixel distance or a fractional pixel distance; or the positions of the N backward reference blocks include a position of one initial backward reference block and positions of (N−1) candidate backward reference blocks, and an offset of a position of each candidate backward reference block relative to the position of the initial backward reference block is an integer pixel distance or a fractional pixel distance.

In the apparatus 1800 in this embodiment of this application, the initial motion information includes a first motion vector and a first reference picture index in a forward prediction direction, and a second motion vector and a second reference picture index in a backward prediction direction.

In the aspect of determining positions of N forward reference blocks and positions of N backward reference blocks based on the initial motion information and a position of the current picture block, the first search unit is specifically configured to:

determine, based on the first motion vector and the position of the current picture block, the position of the initial forward reference block of the current picture block in the forward reference picture corresponding to the first reference picture index, use the position of the initial forward reference block as a first search start point, and determine the positions of the (N−1) candidate forward reference blocks in the forward reference picture, where the positions of the N forward reference blocks include the position of the initial forward reference block and the positions of the (N−1) candidate forward reference blocks; and determine, based on the second motion vector and the position of the current picture block, the position of the initial backward reference block of the current picture block in the backward reference picture corresponding to the second reference picture index, use the position of the initial backward reference block as a second search start point, and determine the positions of the (N−1) candidate backward reference blocks in the backward reference picture, where the positions of the N backward reference blocks include the position of the initial backward reference block and the positions of the (N−1) candidate backward reference blocks.

In the apparatus 1800 in this embodiment of this application, in the aspect of determining, from positions of M pairs of reference blocks based on a matching cost criterion, that positions of a pair of reference blocks are a position of a target forward reference block of the current picture block and a position of a target backward reference block of the current picture block, the first search unit 1802 is specifically configured to:

determine, from the positions of the M pairs of reference blocks, that positions of a pair of reference blocks with a minimum matching error are the position of the target forward reference block of the current picture block and the position of the target backward reference block of the current picture block; or determine, from the positions of the M pairs of reference blocks, that positions of a pair of reference blocks with a matching error less than or equal to a matching error threshold are the position of the target forward reference block of the current picture block and the position of the target backward reference block of the current picture block, where M is less than or equal to N.

It should be understood that the apparatus 1800 may perform the methods shown in FIG. 3, FIG. 10, and FIG. 11, and the apparatus 1800 may be specifically a video coding apparatus, a video decoding apparatus, a video coding system, or another device having a video coding function. The apparatus 1800 not only can be configured to perform picture prediction in a coding process, but also can be configured to perform picture prediction in a decoding process.

For details, refer to descriptions of the picture prediction method in this specification. For brevity, details are not described herein again.

It can be learned that, according to the prediction apparatus in this embodiment of this application, the positions of the N forward reference blocks in the forward reference picture and the positions of the N backward reference blocks in the backward reference picture form positions of N pairs of reference block. For positions of each pair of reference blocks in the positions of the N pairs of reference blocks, the mirror relationship exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity.

Figure 19:
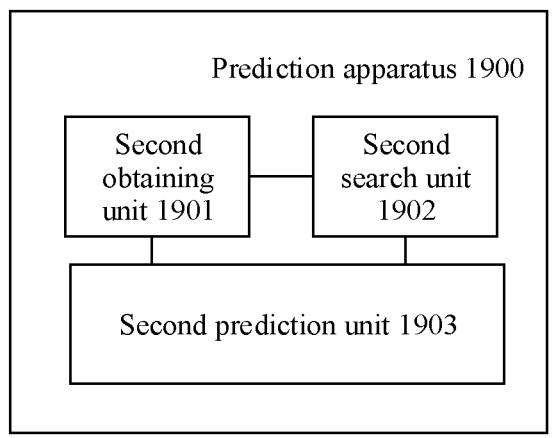
FIG. 19 is a schematic block diagram of another picture prediction apparatus according to an embodiment of this application.

FIG. 19 is a schematic block diagram of another picture prediction apparatus according to an embodiment of this application. It should be noted that the prediction apparatus 1900 is applicable to both inter prediction for decoding a video picture and inter prediction for coding a video picture. It should be understood that the prediction apparatus 1900 herein may correspond to the motion compensation unit 44 in FIG. 2A, or may correspond to the motion compensation unit 82 in FIG. 2B. The prediction apparatus 1900 may include:

a second obtaining unit 1901, configured to obtain initial motion information of a current picture block;

a second search unit 1902, configured to: determine positions of N forward reference blocks and positions of N backward reference blocks based on the initial motion information and a position of the current picture block, where the N forward reference blocks are located in a forward reference picture, the N backward reference blocks are located in a backward reference picture, and N is an integer greater than 1; and determine, from positions of M pairs of reference blocks based on a matching cost criterion, that positions of a pair of reference blocks are a position of a target forward reference block of the current picture block and a position of a target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an initial forward reference block, and the second position offset represents an offset of the position of the backward reference block relative to a position of an initial backward reference block; and M is an integer greater than or equal to 1, and M is less than or equal to N; and a second prediction unit 1903, configured to obtain a predicted value of a pixel value of the current picture block based on a pixel value of the target forward reference block and a pixel value of the target backward reference block.

For each pair of reference blocks, that a first position offset and a second position offset are in a proportional relationship based on a time domain distance may be understood as:

for each pair of reference blocks, the proportional relationship between the first position offset and the second position offset is determined based on a proportional relationship between a first time domain distance and a second time domain distance, where the first time domain distance represents a time domain distance between a current picture to which the current picture block belongs and the forward reference picture, and the second time domain distance represents a time domain distance between the current picture and the backward reference picture.

In an implementation, that a first position offset and a second position offset are in a proportional relationship based on a time domain distance may include:

if the first time domain distance is the same as the second time domain distance, a direction of the first position offset is opposite to a direction of the second position offset, and an amplitude value of the first position offset is the same as an amplitude value of the second position offset; or if the first time domain distance is different from the second time domain distance, a direction of the first position offset is opposite to a direction of the second position offset, and a proportional relationship between an amplitude value of the first position offset and an amplitude value of the second position offset is based on the proportional relationship between the first time domain distance and the second time domain distance.

The first time domain distance represents the time domain distance between the current picture to which the current picture block belongs and the forward reference picture, and the second time domain distance represents the time domain distance between the current picture and the backward reference picture.

Optimally, in the apparatus in this embodiment, the second prediction unit 1903 is further configured to obtain updated motion information of the current picture block, where the updated motion information includes an updated forward motion vector and an updated backward motion vector, the updated forward motion vector points to the position of the target forward reference block, and the updated backward motion vector points to the position of the target backward reference block.

It can be learned that the refined motion information of the current picture block can be obtained in this embodiment of this application. This improves accuracy of the motion information of the current picture block, and also facilitates prediction of another picture block, for example, improves prediction accuracy of motion information of the another picture block.

In an implementation, the positions of the N forward reference blocks include a position of one initial forward reference block and positions of (N−1) candidate forward reference blocks, and an offset of a position of each candidate forward reference block relative to the position of the initial forward reference block is an integer pixel distance or a fractional pixel distance; or the positions of the N backward reference blocks include a position of one initial backward reference block and positions of (N−1) candidate backward reference blocks, and an offset of a position of each candidate backward reference block relative to the position of the initial backward reference block is an integer pixel distance or a fractional pixel distance.

In an implementation, the initial motion information includes forward prediction motion information and backward prediction motion information; and in the aspect of determining positions of N forward reference blocks and positions of N backward reference blocks based on the initial motion information and a position of the current picture block, the second search unit 1902 is specifically configured to:

determine the positions of the N forward reference blocks in the forward reference picture based on the forward prediction motion information and the position of the current picture block, where the positions of the N forward reference blocks include the position of the initial forward reference block and the positions of the (N−1) candidate forward reference blocks, and an offset of a position of each candidate forward reference block relative to the position of the initial forward reference block is an integer pixel distance or a fractional pixel distance; and determine the positions of the N backward reference blocks in the backward reference picture based on the backward prediction motion information and the position of the current picture block, where the positions of the N backward reference blocks include the position of the initial backward reference block and the positions of the (N−1) candidate backward reference blocks, and an offset of a position of each candidate backward reference block relative to the position of the initial backward reference block is an integer pixel distance or a fractional pixel distance.

In another implementation, the initial motion information includes a first motion vector and a first reference picture index in a forward prediction direction, and a second motion vector and a second reference picture index in a backward prediction direction; and in the aspect of determining positions of N forward reference blocks and positions of N backward reference blocks based on the initial motion information and a position of the current picture block, the second search unit is specifically configured to:

determine, based on the first motion vector and the position of the current picture block, the position of the initial forward reference block of the current picture block in the forward reference picture corresponding to the first reference picture index, use the position of the initial forward reference block as a first search start point, and determine the positions of the (N−1) candidate forward reference blocks in the forward reference picture, where the positions of the N forward reference blocks include the position of the initial forward reference block and the positions of the (N−1) candidate forward reference blocks; and determine, based on the second motion vector and the position of the current picture block, the position of the initial backward reference block of the current picture block in the backward reference picture corresponding to the second reference picture index, use the position of the initial backward reference block as a second search start point, and determine the positions of the (N−1) candidate backward reference blocks in the backward reference picture, where the positions of the N backward reference blocks include the position of the initial backward reference block and the positions of the (N−1) candidate backward reference blocks.

In an implementation, in the aspect of determining, from positions of M pairs of reference blocks based on a matching cost criterion, that positions of a pair of reference blocks are a position of a target forward reference block of the current picture block and a position of a target backward reference block of the current picture block, the second search unit 1902 is specifically configured to:

determine, from the positions of the M pairs of reference blocks, that positions of a pair of reference blocks with a minimum matching error are the position of the target forward reference block of the current picture block and the position of the target backward reference block of the current picture block; or determine, from the positions of the M pairs of reference blocks, that positions of a pair of reference blocks with a matching error less than or equal to a matching error threshold are the position of the target forward reference block of the current picture block and the position of the target backward reference block of the current picture block, where M is less than or equal to N.

In an example, the matching cost criterion is a matching cost minimization criterion. For example, for the positions of the M pairs of reference blocks, a difference between a pixel value of a forward reference block and a pixel value of a backward reference block is calculated for each pair of reference blocks; and from the positions of the M pairs of reference blocks, positions of a pair of reference blocks whose pixel values are of a minimum difference are determined as the position of the forward target reference block of the current picture block and the position of the backward target reference block of the current picture block.

In another example, the matching cost criterion is a matching cost minimization and early termination criterion. For example, for positions of an $n^{th}$ pair of reference blocks (one forward reference block and one backward reference block), a difference between a pixel value of the forward reference block and a pixel value of the backward reference block is calculated, where n is an integer greater than or equal to 1 and less than or equal to N; and when the pixel value difference is less than or equal to the matching error threshold, the positions of the $n^{th}$ pair of reference blocks (one forward reference block and one backward reference block) are determined as the position of the forward target reference block of the current picture block and the position of the backward target reference block of the current picture block.

In an implementation, the second obtaining unit 1901 is configured to obtain the initial motion information from a candidate motion information list of the current picture block, or obtain the initial motion information based on indication information, where the indication information is used to indicate the initial motion information of the current picture block. It should be understood that the initial motion information is relative to the refined motion information.

It should be understood that the apparatus 1900 may perform the method shown in FIG. 12, and the apparatus 1900 may be a video coding apparatus, a video decoding apparatus, a video coding system, or another device having a video coding function. The apparatus 1900 not only can be configured to perform picture prediction in a coding process, but also can be configured to perform picture prediction in a decoding process.

For details, refer to descriptions of the picture prediction method in this specification. For brevity, details are not described herein again.

It can be learned that, according to the prediction apparatus in this embodiment of this application, the positions of the N forward reference blocks in the forward reference picture and the positions of the N backward reference blocks in the backward reference picture form positions of N pairs of reference blocks. For positions of each pair of reference blocks in the positions of the N pairs of reference blocks, the proportional relationship based on the time domain distance exists between the first position offset of the forward reference block relative to the initial forward reference block, and the second position offset of the backward reference block relative to the initial backward reference block. On such a basis, positions of a pair of reference blocks (for example, a pair of reference blocks with a minimum matching cost) are determined from the positions of the N pairs of reference blocks as the position of the target forward reference block (namely, an optimal forward reference block/forward prediction block) of the current picture block and the position of the target backward reference block (namely, an optimal backward reference block/backward prediction block) of the current picture block, to obtain the predicted value of the pixel value of the current picture block based on the pixel value of the target forward reference block and the pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity.

Figure 20:
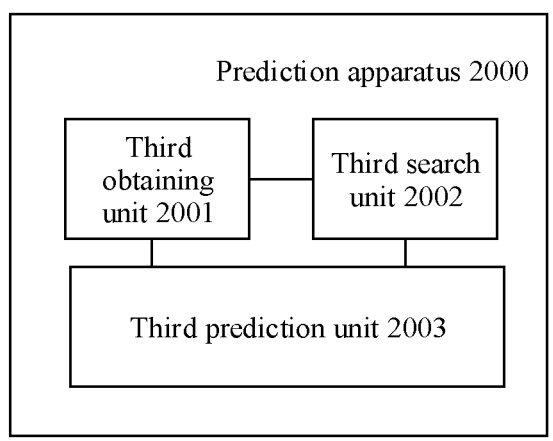
FIG. 20 is a schematic block diagram of another picture prediction apparatus according to an embodiment of this application.

FIG. 20 is a schematic block diagram of another picture prediction apparatus according to an embodiment of this application. It should be noted that the prediction apparatus 2000 is applicable to both inter prediction for decoding a video picture and inter prediction for coding a video picture. It should be understood that the prediction apparatus 2000 herein may correspond to the motion compensation unit 44 in FIG. 2A, or may correspond to the motion compensation unit 82 in FIG. 2B. The prediction apparatus 2000 may include:

a third obtaining unit 2001, configured to obtain $i^{th}$-round motion information of a current picture block;

a third search unit 2002, configured to: determine positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1; and determine, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, where positions of each pair of reference blocks include a position of a forward reference block and a position of a backward reference block; for the positions of each pair of reference blocks, a first position offset and a second position offset are in a mirror relationship, the first position offset represents an offset of the position of the forward reference block relative to a position of an $(i-1)^{th}$-round target forward reference block, and the second position offset represents an offset of the position of the backward reference block relative to a position of an $(i-1)^{th}$-round target backward reference block; and M is an integer greater than or equal to 1, and M is less than or equal to N; and a third prediction unit 2003, configured to obtain a predicted value of a pixel value of the current picture block based on a pixel value of the $j^{th}$-round target forward reference block and a pixel value of the $j^{th}$-round target backward reference block, where j is greater than or equal to i, and both i and j are integers greater than or equal to 1.

It should be noted that, if i=1, the $i^{th}$-round motion information is initial motion information of the current picture block; and correspondingly the positions of the N forward reference blocks include a position of one initial forward reference block and positions of (N−1) candidate forward reference blocks, and an offset of a position of each candidate forward reference block relative to the position of the initial forward reference block is an integer pixel distance or a fractional pixel distance; or the positions of the N backward reference blocks include a position of one initial backward reference block and positions of (N−1) candidate backward reference blocks, and an offset of a position of each candidate backward reference block relative to the position of the initial backward reference block is an integer pixel distance or a fractional pixel distance.

If i>1, the $i^{th}$-round motion information includes a forward motion vector pointing to the position of the $(i−1)^{th}$-round target forward reference block and a backward motion vector pointing to the position of the $(i−1)^{th}$-round target backward reference block; and correspondingly, the positions of the N forward reference blocks include a position of one $(i−1)^{th}$-round target forward reference block and positions of (N−1) candidate forward reference blocks, and an offset of a position of each candidate forward reference block relative to the position of the $(i−1)^{th}$-round target forward reference block is an integer pixel distance or a fractional pixel distance; or the positions of the N backward reference blocks include a position of one $(i−1)^{th}$-round target backward reference block and positions of (N−1) candidate backward reference blocks, and an offset of a position of each candidate backward reference block relative to the position of the $(i−1)^{th}$-round target backward reference block is an integer pixel distance or a fractional pixel distance.

In this embodiment of this application, the third prediction unit 2003 is specifically configured to: when an iteration termination condition is met, obtain the predicted value of the pixel value of the picture block based on the pixel value of the $j^{th}$-round target forward reference block and the pixel value of the $j^{th}$-round target backward reference block, where j is greater than or equal to i, and both i and j are integers greater than or equal to 1. For a description of the iteration termination condition, refer to other embodiments. Details are not described herein again.

In the apparatus in this embodiment of this application, that a first position offset and a second position offset are in a mirror relationship may be understood as that a first position offset value is the same as a second position offset value. For example, a direction of the first position offset is opposite to a direction of the second position offset, and an amplitude value of the first position offset is the same as an amplitude value of the second position offset.

In an implementation, the $i^{th}$-round motion information includes a forward motion vector, a forward reference picture index, a backward motion vector, and a backward reference picture index; and in the aspect of determining positions of N forward reference blocks and positions of N backward reference blocks based on the $i^{th}$-round motion information and a position of the current picture block, the third search unit 2002 is specifically configured to:

determine, based on the forward motion vector and the position of the current picture block, the position of the $(i−1)^{th}$-round target forward reference block of the current picture block in the forward reference picture corresponding to the forward reference picture index, use the position of the $(i−1)^{th}$-round target forward reference block as an $i_f^{th}$ search start point, and determine the positions of the (N−1) candidate forward reference blocks in the forward reference picture, where the positions of the N forward reference blocks include the position of the $(i−1)^{th}$-round target forward reference block and the positions of the (N−1) candidate forward reference blocks; and determine, based on the backward motion vector and the position of the current picture block, the position of the $(i−1)^{th}$-round target backward reference block of the current picture block in the backward reference picture corresponding to the backward reference picture index, use the position of the $(i−1)^{th}$-round target backward reference block as an $i_b^{th}$ search start point, and determine the positions of the (N−1) candidate backward reference blocks in the backward reference picture, where the positions of the N backward reference blocks include the position of the $(i−1)^{th}$-round target backward reference block and the positions of the (N−1) candidate backward reference blocks.

In an implementation, in the aspect of determining, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, the third search unit 2002 is specifically configured to:

determine, from the positions of the M pairs of reference blocks, that positions of a pair of reference blocks with a minimum matching error are the position of the $i^{th}$-round target forward reference block of the current picture block and the position of the $i^{th}$-round target backward reference block of the current picture block; or determine, from the positions of the M pairs of reference blocks, that positions of a pair of reference blocks with a matching error less than or equal to a matching error threshold are the position of the $i^{th}$-round target forward reference block of the current picture block and the position of the $i^{th}$-round target backward reference block of the current picture block, where M is less than or equal to N.

It should be understood that the apparatus 2000 may perform the methods shown in FIG. FIG. 14 and FIG. 15, and the apparatus 2000 may be specifically a video coding apparatus, a video decoding apparatus, a video coding system, or another device having a video coding function. The apparatus 2000 not only can be configured to perform picture prediction in a coding process, but also can be configured to perform picture prediction in a decoding process.

For details, refer to descriptions of the picture prediction method in this specification. For brevity, details are not described herein again.

It can be learned that, according to the prediction apparatus in this embodiment of this application, the positions of the N forward reference blocks in the forward reference picture and the positions of the N backward reference blocks in the backward reference picture form positions of N pairs of reference block. For the positions of each pair of reference blocks in the positions of the N pairs of reference blocks, the mirror relationship exists between a first position offset of the forward reference block relative to the initial forward reference block, and a second position offset of the position of the backward reference block relative to the position of the initial backward reference block. On such a basis, positions of a pair of reference blocks (for example, a pair of reference blocks with a minimum matching cost) are determined from the positions of the N pairs of reference blocks as a position of a target forward reference block (namely, an optimal forward reference block/forward prediction block) of the current picture block and a position of a target backward reference block (namely, an optimal backward reference block/backward prediction block) of the current picture block, to obtain the predicted value of the pixel value of the current picture block based on a pixel value of the target forward reference block and a pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity. In addition, accuracy of refining an MV can be further improved by increasing a quantity of iterations, to further improve coding performance.

Figure 21:
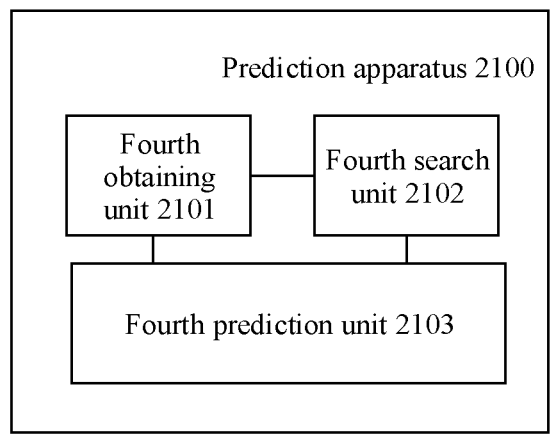
FIG. 21 is a schematic block diagram of another picture prediction apparatus according to an embodiment of this application.

FIG. 21 is a schematic block diagram of another picture prediction apparatus according to an embodiment of this application. It should be noted that the prediction apparatus 2100 is applicable to both inter prediction for decoding a video picture and inter prediction for coding a video picture. It should be understood that the prediction apparatus 2100 herein may correspond to the motion compensation unit 44 in FIG. 2A, or may correspond to the motion compensation unit 82 in FIG. 2B. The prediction apparatus 2100 may include:

a fourth obtaining unit 2101, configured to obtain $i^{th}$-round motion information of a current picture block;

a fourth search unit 2102, configured to: determine positions of N forward reference blocks and positions of N backward reference blocks based on the $i^{th}$-round motion information and a position of the current picture block, where the N forward reference blocks are located in a forward reference picture, the N backward reference blocks are located in a backward reference picture, and N is an integer greater than 1; and determine, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, where positions of each pair of reference blocks include a position of a forward reference block and a position of a backward reference block; for the positions of each pair of reference blocks, a first position offset and a second position offset are in a proportional relationship based on a time domain distance, the first position offset represents an offset of the position of the forward reference block relative to a position of an $(i-1)^{th}$-round target forward reference block in the forward reference picture, and the second position offset represents an offset of the position of the backward reference block relative to a position of an $(i-1)^{th}$-round target backward reference block in the backward reference picture; and M is an integer greater than or equal to 1, and M is less than or equal to N; and a fourth prediction unit 2103, configured to obtain a predicted value of a pixel value of the current picture block based on a pixel value of the $j^{th}$-round target forward reference block and a pixel value of the $j^{th}$-round target backward reference block, where j is greater than or equal to i, and both i and j are integers greater than or equal to 1.

In an iterative search process, if i=1, the $i^{th}$-round motion information is initial motion information of the current picture block.

If i>1, the $i^{th}$-round motion information includes a forward motion vector pointing to the position of the $(i-1)^{th}$-round target forward reference block and a backward motion vector pointing to the position of the $(i-1)^{th}$-round target backward reference block.

In an implementation, the fourth prediction unit 2103 is specifically configured to: when an iteration termination condition is met, obtain the predicted value of the pixel value of the picture block based on the pixel value of the $j^{th}$-round target forward reference block and the pixel value of the $j^{th}$-round target backward reference block, where j is greater than or equal to i, and both i and j are integers greater than or equal to 1.

In the apparatus in this embodiment, that a first position offset and a second position offset are in a proportional relationship based on a time domain distance may be understood as:

if a first time domain distance is the same as a second time domain distance, a direction of the first position offset is opposite to a direction of the second position offset, and an amplitude value of the first position offset is the same as an amplitude value of the second position offset; or if a first time domain distance is different from a second time domain distance, a direction of the first position offset is opposite to a direction of the second position offset, and a proportional relationship between an amplitude value of the first position offset and an amplitude value of the second position offset is based on a proportional relationship between the first time domain distance and the second time domain distance.

The first time domain distance represents a time domain distance between a current picture to which the current picture block belongs and the forward reference picture, and the second time domain distance represents a time domain distance between the current picture and the backward reference picture.

In an implementation, the $i^{th}$-round motion information includes a forward motion vector, a forward reference picture index, a backward motion vector, and a backward reference picture index; and correspondingly, in the aspect of determining positions of N forward reference blocks and positions of N backward reference blocks based on the $i^{th}$-round motion information and a position of the current picture block, the fourth search unit 2102 is specifically configured to:

determine, based on the forward motion vector and the position of the current picture block, the position of the $(i-1)^{th}$-round target forward reference block of the current picture block in the forward reference picture corresponding to the forward reference picture index, use the position of the $(i-1)^{th}$-round target forward reference block as an $i_f^{th}$ search start point, and determine positions of (N-1) candidate forward reference blocks in the forward reference picture, where the positions of the N forward reference blocks include the position of the $(i-1)^{th}$-round target forward reference block and the positions of the (N-1) candidate forward reference blocks; and determine, based on the backward motion vector and the position of the current picture block, the position of the $(i-1)^{th}$-round target backward reference block of the current picture block in the backward reference picture corresponding to the backward reference picture index, use the position of the $(i-1)^{th}$-round target backward reference block as an $i_b{}^{th}$ search start point, and determine positions of (N−1) candidate backward reference blocks in the backward reference picture, where the positions of the N backward reference blocks include the position of the $(i-1)^{th}$-round target backward reference block and the positions of the (N−1) candidate backward reference blocks.

In an implementation, in the aspect of determining, from positions of M pairs of reference blocks based on a matching cost criterion, that positions of a pair of reference blocks are a position of an $i^{th}$-round target forward reference block of the current picture block and a position of an $i^{th}$-round target backward reference block of the current picture block, the fourth search unit 2102 is specifically configured to:

determine, from the positions of the M pairs of reference blocks, that positions of a pair of reference blocks with a minimum matching error are the position of the $i^{th}$-round target forward reference block of the current picture block and the position of the $i^{th}$-round target backward reference block of the current picture block; or determine, from the positions of the M pairs of reference blocks, that positions of a pair of reference blocks with a matching error less than or equal to a matching error threshold are the position of the $i^{th}$-round target forward reference block of the current picture block and the position of the $i^{th}$-round target backward reference block of the current picture block, where M is less than or equal to N.

It should be understood that the apparatus 2100 may perform the method shown in FIG. 16 or FIG. 17, and the apparatus 2100 may be a video coding apparatus, a video decoding apparatus, a video coding system, or another device having a video coding function. The apparatus 2100 not only can be configured to perform picture prediction in a coding process, but also can be configured to perform picture prediction in a decoding process.

For details, refer to descriptions of the picture prediction method in this specification. For brevity, details are not described herein again.

It can be learned that, according to the prediction apparatus in this embodiment of this application, the positions of the N forward reference blocks in the forward reference picture and the positions of the N backward reference blocks in the backward reference picture form positions of N pairs of reference blocks. For positions of each pair of reference blocks in the positions of the N pairs of reference blocks, the proportional relationship based on the time domain distance exists between a first position offset of the forward reference block relative to an initial forward reference block, and a second position offset of the backward reference block relative to an initial backward reference block. On such a basis, positions of a pair of reference blocks (for example, a pair of reference blocks with a minimum matching cost) are determined from the positions of the N pairs of reference blocks as a position of a target forward reference block (namely, an optimal forward reference block/forward prediction block) of the current picture block and a position of a target backward reference block (namely, an optimal backward reference block/backward prediction block) of the current picture block, to obtain the predicted value of the pixel value of the current picture block based on a pixel value of the target forward reference block and a pixel value of the target backward reference block. Compared with the prior art, the method in this embodiment of this application avoids a process of pre-calculating a template matching block and a process of performing forward search matching and backward search matching by using the template matching block, and simplifies a picture prediction process. This improves picture prediction accuracy and reduces picture prediction complexity. In addition, accuracy of refining an MV can be further improved by increasing a quantity of iterations, to further improve coding performance.

Figure 22:
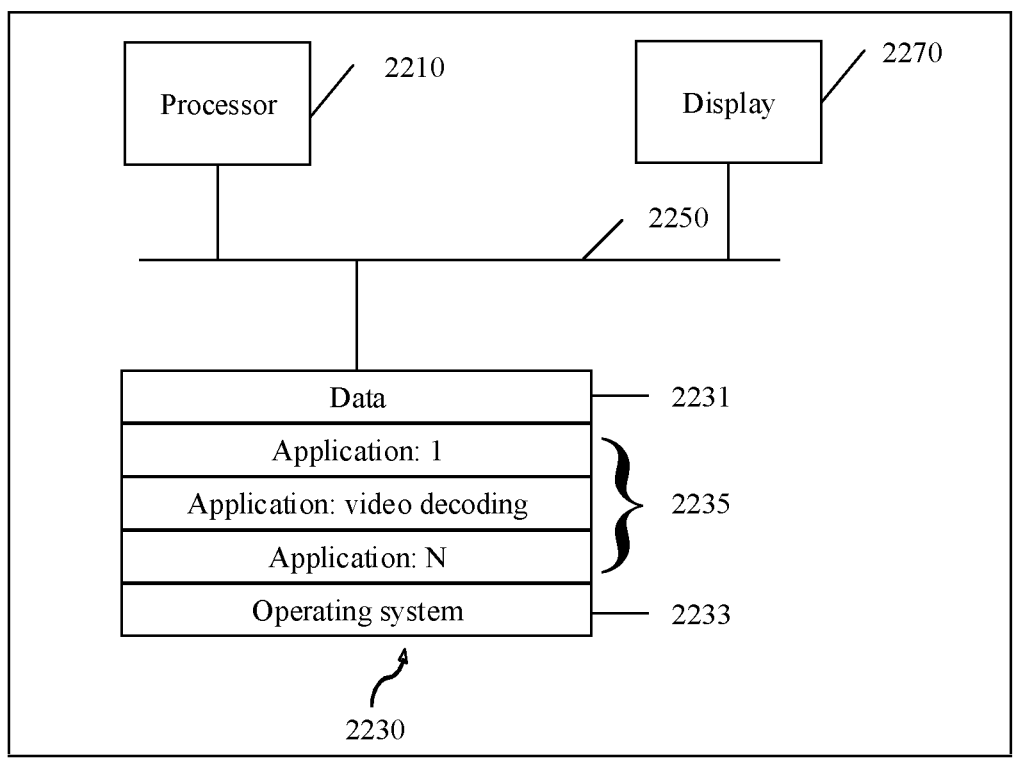
FIG. 22 is a schematic block diagram of a coding device or a decoding device according to an embodiment of this application.

FIG. 22 is a schematic block diagram of an implementation of a video coding device or a video decoding device (decoding device 2200 for short) according to an embodiment of this application. The decoding device 2200 may include a processor 2210, a memory 2230, and a bus system 2250. The processor and the memory are connected by using the bus system. The memory is configured to store an instruction. The processor is configured to execute the instruction stored in the memory. A memory of a coding device stores program code. A processor may invoke the program code stored in the memory, to perform the video encoding or decoding methods described in this application, particularly video encoding or decoding methods in various inter prediction modes or intra prediction modes, and motion information prediction methods in various inter prediction modes or intra prediction modes. Details are not described herein again to avoid repetition.

In this embodiment of this application, the processor 2210 may be a central processing unit (Central Processing Unit, "CPU" for short), or the processor 2210 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor or the like.

The memory 2230 may include a read-only memory (ROM) device or a random access memory (RAM) device. Any other appropriate type of storage device may also be used as the memory 2230. The memory 2230 may include code and data 2231 that are accessed by the processor 2210 by using the bus system 2250. The memory 2230 may further include an operating system 2233 and an application program 2235. The application program 2235 includes at least one program that allows the processor 2210 to perform the video encoding or decoding methods described in this application (in particular, the picture prediction methods described in this application). For example, the application program 2235 may include applications 1 to N, and further includes a video encoding or decoding application (video decoding application for short) that performs the video encoding or decoding methods described in this application.

In addition to a data bus, the bus system 2250 may further include a power bus, a control bus, a status signal bus, and the like. However, for clear description, various types of buses in the figure are marked as the bus system 2250.

Optionally, the decoding device 2200 may further include one or more output devices, for example, a display 2270. In an example, the display 2270 may be a touch display or a touchscreen that combines a display and a touch unit that operably senses touch input. The display 2270 may be connected to the processor 2210 by using the bus 2250.

It should be noted that explanations and limitations of a same step or a same term are also applicable to different embodiments. For brevity, repeated descriptions are appropriately omitted in this specification.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communications protocol). In this manner, the computer-readable medium generally may correspond to (1) a non-transitory tangible computer-readable storage medium or (2) a communications medium such as a signal or a carrier. The data storage medium may be any available medium that can be accessed by one or more computers or one or more processors to retrieve instructions, code, and/or data structures for implementing the technologies described in this application. A computer program product may include the computer-readable medium.

By way of example and not by way of limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, a server, or another remote source through a coaxial cable, an optical fiber, a twisted pair, a digital subscriber line (DSL), or wireless technologies such as infrared, radio, and microwave, the coaxial cable, fiber optic cable, twisted pair, DSL, or wireless technologies such as infrared, radio, and microwave are included in a definition of a medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

A corresponding function may be executed by one or more processors such as one or more digital signal processors (DSP), general-purpose microprocessors, application-specific integrated circuits (ASIC), field-programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for coding, or may be incorporated into a combined codec. In addition, the technologies may be fully implemented in one or more circuits or logic elements. In an example, various illustrative logical blocks, units, and modules in the video encoder 20 and the video decoder 30 can be understood as corresponding circuit devices or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be integrated, in combination with proper software and/or firmware, into a codec hardware unit, or be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A picture prediction method, comprising:
   obtaining initial motion information of a current picture block;
   when an early termination condition is not met, determining, from positions of N forward reference blocks and N backward reference blocks, based on a matching cost criterion, positions of a target forward reference block and a target backward reference block of the current picture block, wherein the positions of N forward and N backward reference blocks are based on the initial motion information, the N forward reference blocks comprising an initial forward reference block, the N backward reference blocks comprising an initial backward reference block, and N is an integer greater than 1,
   wherein for positions of n-th forward and n-th backward reference blocks of the N forward and N backward reference blocks, a first position offset and a second position offset are in a mirror relationship, the first position offset representing an offset of the position of the n-th forward reference block relative to a position of the initial forward reference block, and the second position offset representing an offset of the position of the n-th backward reference block relative to a position of the initial backward reference block; wherein n is an integer and $1 \le n \le N$; and
   obtaining a predicted value of a pixel value of the current picture block based on a pixel value of the target forward reference block and a pixel value of the target backward reference block;
   wherein the positions of the N forward reference blocks comprise a position of the initial forward reference block and positions of (N−1) candidate forward reference blocks, and an offset of a position of each candidate forward reference block relative to the position of the initial forward reference block is an integer pixel distance; and
   the positions of the N backward reference blocks comprise a position of the initial backward reference block and positions of (N−1) candidate backward reference blocks, and an offset of a position of each candidate backward reference block relative to the position of the initial backward reference block is an integer pixel distance.

2. The method according to claim 1, wherein the position of the target forward reference block is associated with (delta0x', delta0y') representing an offset of the position of the target forward reference block relative to the position of the initial forward reference block, the position of the target backward reference block is associated with (delta1x', delta1y') representing an offset of the position of the target backward reference block relative to the position of the initial backward reference block, and wherein delta0x'=−delta1x', and delta0y'=−delta1y'.

3. The method according to claim 1, wherein the positions of the N forward reference blocks comprise a position of the initial forward reference block and positions of (N−1) candidate forward reference blocks; or the positions of the N backward reference blocks comprise a position of the initial backward reference block and positions of (N−1) candidate backward reference blocks, for positions of n-th candidate forwad and n-th candidate backward reference blocks of the (N−1) candidate forward and (N−1) candidate backward reference blocks, a first position offset and a second position offset are in a mirror relationship, the first position offset representing an offset of the position of the n-th candidate forward reference block relative to a position of the initial forward reference block, and the second position offset representing an offset of the position of the n-th candidate backward reference block relative to a position of the initial backward reference block n is an integer and 0<n≤N−1.

4. The method according to claim 1, wherein a direction of the first position offset is opposite to a direction of the second position offset, and an amplitude of the first position offset is the same as an amplitude of the second position offset.

5. The method according to claim 1, wherein the first position offset is represented by (delta0x, delta0y) and the second position offset is represented by (delta1x, delta1y), wherein delta0x=−delta1x, and delta0y=−delta1y.

6. The method according to claim 1, further comprising:

obtaining updated motion information of the current picture block, wherein the updated motion information comprises an updated forward motion vector and an updated backward motion vector, wherein the updated forward motion vector points to the position of the target forward reference block, and the updated backward motion vector points to the position of the target backward reference block, or wherein the updated forward motion vector indicates an offset of the position of the target forward reference block relative to the position of the current picture block, and the updated backward motion vector indicates an offset of the position of the target backward reference block relative to the position of the current picture block.

7. The method according to claim 1, wherein the pixel value of the target forward reference block is determined based on the position of the target forward reference block, and the pixel value of the target backward reference block is determined based on the position of the target backward reference block.

8. The method according to claim 1, wherein the initial motion information comprises a first motion vector and a first reference picture index corresponding to a first list (L0), and a second motion vector and a second reference picture index corresponding to a second list (L1); and wherein the determining positions of N forward and N backward reference blocks comprises:

determining, based on the first motion vector and the position of the current picture block, the position of the initial forward reference block of the current picture block in a forward reference picture corresponding to the first reference picture index, using the position of the initial forward reference block as a first search start point, and determining the positions of the (N−1) candidate forward reference blocks in the forward reference picture, wherein the positions of the N forward reference blocks comprise the position of the initial forward reference block and the positions of the (N−1) candidate forward reference blocks; and determining, based on the second motion vector and the position of the current picture block, the position of the initial backward reference block of the current picture block in a backward reference picture corresponding to the second reference picture index, using the position of the initial backward reference block as a second search start point, and determining the positions of the (N−1) candidate backward reference blocks in the backward reference picture, wherein the positions of the N backward reference blocks comprise the position of the initial backward reference block and the positions of the (N−1) candidate backward reference blocks.

9. The method according to claim 1, wherein the determining, from the positions of the N forward and N backward reference blocks based on a matching cost criterion, positions of a target forward reference block and a target backward reference block of the current picture block, comprises:

determining, from the positions of the N forward and N backward reference blocks, the positions of the target forward and target backward reference blocks of the current picture block, wherein the target forward and target backward reference blocks have a minimum matching error among N matching errors of the N forward and N backward reference blocks; or determining, from the positions of the N forward and N backward reference blocks, the positions of the target forward and target backward reference blocks of the current picture block, wherein the target forward and target backward reference blocks have a matching error less than or equal to a matching error threshold.

10. The method according to claim 1, wherein the method is used for encoding the current picture block; and the obtaining initial motion information of a current picture block comprises: obtaining the initial motion information from a candidate motion information list of the current picture block; or the method is used for decoding the current picture block; and before the obtaining initial motion information of a current picture block, the method further comprises: obtaining indication information from a bitstream of the current picture block, wherein the indication information indicates the initial motion information of the current picture block.

11. The method according to claim 1, wherein the matching cost criterion is an sum of absolute difference (SAD) criterion, the target forward and target backward reference blocks have a minimum SAD value among N SAD values of the N forward and N backward reference blocks.

12. The method according to claim 1, wherein the N forward reference blocks are located in a forward reference picture, and the N backward reference blocks are located in a backward reference picture; and wherein the N forward and N backward reference blocks have the same size with the current picture block.

13. The method according to claim 1, further comprising:
obtaining initial motion information of another picture block;
when an early termination condition is met, determining positions of an initial forward reference block and an initial backward reference block of the another picture block as positions of a target forward reference block and a target backward reference block of the another picture block, wherein the positions of the initial forward and backward reference blocks of the another picture block are based on the initial motion information of the another picture block; and
obtaining a predicted value of a pixel value of the another picture block based on a pixel value of the target forward reference block and a pixel value of the target backward reference block of the another picture block.

14. The method according to claim 1, wherein when the early termination condition is not met, the determining, from positions of N forward reference blocks and N backward reference blocks, based on a matching cost criterion, positions of a target forward reference block and a target backward reference block of the current picture block comprises:
when a difference between a pixel value of the initial forward reference block and a pixel value of the initial backward reference block is greater than a matching error threshold, determining, from positions of N forward reference blocks and N backward reference blocks, based on the matching cost criterion, positions of a target forward reference block and a target backward reference block of the current picture block.

15. A picture prediction apparatus, comprising:
a memory storage comprising instructions; and
one or more processors in communication with the memory, wherein the one or more processors are configured to execute the instructions to:
obtain initial motion information of a current picture block;
when an early termination condition is not met, determine, from positions of N forward reference blocks and N backward reference blocks, based on a matching cost criterion, positions of a target forward reference block and a target backward reference block of the current picture block, wherein the positions of N forward and N backward reference blocks are based on the initial motion information, the N forward reference blocks comprising an initial forward reference block, the N backward reference blocks comprising an initial backward reference block, and N is an integer greater than 1;
wherein for positions of n-th forward and n-th backward reference blocks of the N forward and N backward reference blocks, a first position offset and a second position offset are in a mirror relationship, the first position offset representing an offset of the position of the n-th forward reference block relative to a position of the initial forward reference block, and the second position offset representing an offset of the position of the n-th backward reference block relative to a position of the initial backward reference block; wherein is an integer and 1≤n≤N; and
obtain a predicted value of a pixel value of the current picture block based on a pixel value of the target forward reference block and a pixel value of the target backward reference block;
wherein the positions of the N forward reference blocks comprise a position of the initial forward reference block and positions of (N−1) candidate forward reference blocks, and an offset of a position of each candidate forward reference block relative to the position of the initial forward reference block is an integer pixel distance; and
the positions of the N backward reference blocks comprise a position of the initial backward reference block and positions of (N−1) candidate backward reference blocks, and an offset of a position of each candidate backward reference block relative to the position of the initial backward reference block is an integer pixel distance.

16. The apparatus according to claim 15, wherein the position of the target forward reference block is associated with (delta0x', delta0y') representing an offset of the position of the target forward reference block relative to the position of the initial forward reference block,
the position of the target backward reference block is associated with (delta1x', delta1y') representing an offset of the position of the target backward reference block relative to the position of the initial backward reference block, and
wherein delta0x'=−delta1x', and delta0y'=−delta1y'.

17. The apparatus according to claim 15, wherein the positions of the N forward reference blocks comprise a position of the initial forward reference block and positions of (N−1) candidate forward reference blocks; or
the positions of the N backward reference blocks comprise a position of the initial backward reference block and positions of (N−1) candidate backward reference blocks, for positions of n-th candidate forward and n-th candidate backward reference blocks of the (N−1) candidate forward and (N−1) candidate backward reference blocks, a first position offset and a second position offset are in a mirror relationship, the first position offset representing an offset of the position of the n-th candidate forward reference block relative to a position of the initial forward reference block, and the second position offset representing an offset of the position of the n-th candidate backward reference block relative to a position of the initial backward reference block n is an integer and 0<n≤N−1.

18. The apparatus according to claim 15, wherein a direction of the first position offset is opposite to a direction of the second position offset, and an amplitude of the first position offset is the same as an amplitude of the second position offset.

19. The apparatus according to claim 15, wherein the first position offset is represented by (delta0x, delta0y) and the second position offset is represented by (delta1x, delta1y), wherein delta0x=−delta1x, and delta0y=−delta1y.

20. The apparatus according to claim 15, wherein the one or more processors further execute the instructions to:
obtain updated motion information of the current picture block, wherein the updated motion information comprises an updated forward motion vector and an updated backward motion vector,
wherein the updated forward motion vector points to the position of the target forward reference block, and the updated backward motion vector points to the position of the target backward reference block, or
wherein the updated forward motion vector indicates an offset of the position of the target forward reference block relative to the position of the current picture block, and the updated backward motion vector indicates an offset of the position of the target backward reference block relative to the position of the current picture block.

21. The apparatus according to claim 15, wherein the pixel value of the target forward reference block is determined based on the position of the target forward reference block, and the pixel value of the target backward reference block is determined based on the position of the target backward reference block.

22. The method according to claim 15, wherein the initial motion information comprises a first motion vector and a first reference picture index corresponding to a first list (L0), and a second motion vector and a second reference picture index corresponding to a second list (L1); and wherein the one or more processors execute the instructions to:

determine, based on the first motion vector and the position of the current picture block, the position of the initial forward reference block of the current picture block in a forward reference picture corresponding to the first reference picture index, using the position of the initial forward reference block as a first search start point, and determine the positions of the (N−1) candidate forward reference blocks in the forward reference picture, wherein the positions of the N forward reference blocks comprise the position of the initial forward reference block and the positions of the (N−1) candidate forward reference blocks; and determine, based on the second motion vector and the position of the current picture block, the position of the initial backward reference block of the current picture block in a backward reference picture corresponding to the second reference picture index, using the position of the initial backward reference block as a second search start point, and determine the positions of the (N−1) candidate backward reference blocks in the backward reference picture, wherein the positions of the N backward reference blocks comprise the position of the initial backward reference block and the positions of the (N−1) candidate backward reference blocks.

23. The apparatus according to claim 15, wherein the one or more processors execute the instructions to:

determine, from the positions of the N forward and N backward reference blocks, the positions of the target forward and target backward reference blocks of the current picture block, wherein the target forward and target backward reference blocks have a minimum matching error among N matching errors of the N forward and N backward reference blocks; or determine, from the positions of the N forward and N backward reference blocks, the positions of the target forward and target backward reference blocks of the current picture block, wherein the target forward and target backward reference blocks have a matching error less than or equal to a matching error threshold.

24. The apparatus according to claim 15, wherein the apparatus is an encoding apparatus for encoding the current picture block; and the one or more processors execute the instructions to: obtain the initial motion information from a candidate motion information list of the current picture block; or the apparatus is a decoding apparatus for decoding the current picture block; and the one or more processors execute the instructions to: obtain indication information from a bitstream of the current picture block, wherein the indication information indicates the initial motion information of the current picture block.

25. The apparatus according to claim 15, wherein the matching cost criterion is a sum of absolute difference (SAD) criterion, the target forward and target backward reference blocks have a minimum SAD value among N SAD values of the N forward and N backward reference blocks.

26. The apparatus according to claim 15, wherein the N forward reference blocks are located in a forward reference picture, and the N backward reference blocks are located in a backward reference picture; and wherein the N forward and N backward reference blocks have the same size with the current picture block.

27. The apparatus according to claim 15, wherein the one or more processors further execute the instructions to:

obtain initial motion information of another picture block;

when an early termination condition is met, determine positions of an initial forward reference block and an initial backward reference block of the another picture block as positions of a target forward reference block and a target backward reference block of the another picture block, wherein the positions of the initial forward and backward reference blocks of the another picture block are based on the initial motion information of the another picture block; and, obtain a predicted value of a pixel value of the another picture block based on a pixel value of the target forward reference block and a pixel value of the target backward reference block of the another picture block.

28. The apparatus according to claim 15, wherein when the early termination condition is not met, the determining, from positions of N forward reference blocks and N backward reference blocks, based on a matching cost criterion, positions of a target forward reference block and a target backward reference block of the current picture block comprises:

when a difference between a pixel value of the initial forward reference block and a pixel value of the initial backward reference block is greater than a matching error threshold, determining, from positions of N forward reference blocks and N backward reference blocks, based on a matching cost criterion, positions of a target forward reference block and a target backward reference block of the current picture block.

29. A non-transitory computer-readable medium carrying a program code which, when executed by a computer device, causes the computer device to perform the method comprising:

obtaining initial motion information of a current picture block;

when an early termination condition is not met, determining, from positions of N forward reference blocks and N backward reference blocks, based on a matching cost criterion, positions of a target forward reference block and a target backward reference block of the current picture block, wherein the positions of N forward and N backward reference blocks are based on the initial motion information, the N forward reference blocks comprising an initial forward reference block, the N backward reference blocks comprising an initial backward reference block, and N is an integer greater than 1, wherein for positions of n-th forward and n-th backward reference blocks of the N forward and N backward reference blocks, a first position offset and a second position offset are in a mirror relationship, the first position offset representing an offset of the position of the n-th forward reference block relative to a position of the initial forward reference block, and the second position offset representing an offset of the position of the n-th backward reference block relative to a position of the initial backward reference block; wherein n is an integer and $1 \le n \le N$; and obtaining a predicted value of a pixel value of the current picture block based on a pixel value of the target forward reference block and a pixel value of the target backward reference block;

wherein the positions of the N forward reference blocks comprise a position of the initial forward reference block and positions of (N−1) candidate forward reference blocks, and an offset of a position of each candidate forward reference block relative to the position of the initial forward reference block is an integer pixel distance; and the positions of the N backward reference blocks comprise a position of the initial backward reference block and positions of (N−1) candidate backward reference blocks, and an offset of a position of each candidate backward reference block relative to the position of the initial backward reference block is an integer pixel distance.

30. The non-transitory computer-readable medium according to claim 29, wherein the program code, when executed by the computer device, further causes the computer device to perform:

obtaining initial motion information of another picture block;

when an early termination condition is met, determining positions of an initial forward reference block and an initial backward reference block of the another picture block as positions of a target forward reference block and a target backward reference block of the another picture block, wherein the positions of the initial forward and backward reference blocks of the another picture block are based on the initial motion information of the another picture block; and obtaining a predicted value of a pixel value of the another picture block based on a pixel value of the target forward reference block and a pixel value of the target backward reference block of the another picture block.

31. The non-transitory computer-readable medium according to claim 29, wherein when the early termination condition is not met, determining, from positions of N forward reference blocks and N backward reference blocks, based on a matching cost criterion, positions of a target forward reference block and a target backward reference block of the current picture block comprises:

when a difference between a pixel value of the initial forward reference block and a pixel value of the initial backward reference block is greater than a matching error threshold, determining, from positions of N forward reference blocks and N backward reference blocks, based on a matching cost criterion, positions of a target forward reference block and a target backward reference block of the current picture block.

* * * * *